US011387451B2

(12) United States Patent
Ying et al.

(10) Patent No.: US 11,387,451 B2
(45) Date of Patent: Jul. 12, 2022

(54) METHOD FOR PREPARING METAL OXIDE NANOSHEETS

(71) Applicant: Agency for Science, Technology and Research, Singapore (SG)

(72) Inventors: Jackie Y. Ying, Singapore (SG); Ayman Amin Abdelhamid, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 411 days.

(21) Appl. No.: 16/343,736

(22) PCT Filed: Oct. 20, 2017

(86) PCT No.: PCT/SG2017/050525
§ 371 (c)(1),
(2) Date: Apr. 19, 2019

(87) PCT Pub. No.: WO2018/084803
PCT Pub. Date: May 11, 2018

(65) Prior Publication Data
US 2019/0273255 A1    Sep. 5, 2019

(30) Foreign Application Priority Data

Oct. 20, 2016  (SG) .......................... 10201608827X

(51) Int. Cl.
*H01M 4/13*          (2010.01)
*H01M 4/48*          (2010.01)
(Continued)

(52) U.S. Cl.
CPC ............ *H01M 4/483* (2013.01); *C01G 19/02* (2013.01); *C01G 23/08* (2013.01); *C01G 25/02* (2013.01);
(Continued)

(58) Field of Classification Search
CPC ...... H01M 4/483; H01M 4/485; H01M 4/502; H01M 4/523; H01M 4/525;
(Continued)

(56) References Cited

U.S. PATENT DOCUMENTS

2013/0196469 A1*  8/2013  Facchetti .......... H01L 21/02172
                                                      438/104
2016/0254528 A1   9/2016  Yu et al.

FOREIGN PATENT DOCUMENTS

CN        103159256 A     6/2013
CN        103991903 A     8/2014
(Continued)

OTHER PUBLICATIONS

Abdelhamid, et al., "Generalized Synthesis of Metal Oxide Nanosheets and Their Application as Li-Ion Battery Anodes," Advanced Materials, 2017, 7 pgs., Wiley.
(Continued)

*Primary Examiner* — Jane J Rhee
(74) *Attorney, Agent, or Firm* — Womble Bond Dickinson (US) LLP

(57) ABSTRACT

The present invention generally relates to a method for preparing metal oxide nanosheets. In a preferred embodiment, graphene oxide (GO) or graphite oxide is employed as a template or structure directing agent for the formation of the metal oxide nanosheets, wherein the template is mixed with metal oxide precursor to form a metal oxide precursor-bonded template. Subsequently, the metal oxide precursor-bonded template is calcined to form the metal oxide nanosheets. The present invention also relates to a lithium-ion battery anode comprising the metal oxide nanosheets. In a further preferred embodiment, the battery anode may comprising reduced template, which is reduced graphene oxide (rGO) or reduced graphite oxide.

11 Claims, 52 Drawing Sheets

(51) Int. Cl.
    *C01G 19/02*     (2006.01)
    *C01G 23/08*     (2006.01)
    *C01G 25/02*     (2006.01)
    *C01G 33/00*     (2006.01)
    *C01G 45/02*     (2006.01)
    *C01G 49/02*     (2006.01)
    *C01G 51/04*     (2006.01)
    *C01G 51/00*     (2006.01)
    *C01G 53/04*     (2006.01)
    *C01G 53/00*     (2006.01)
    *H01M 4/485*     (2010.01)
    *H01M 4/52*      (2010.01)
    *H01M 4/525*     (2010.01)
    *H01M 10/0525*   (2010.01)
    *H01M 4/50*      (2010.01)
    *B82Y 30/00*     (2011.01)
    *B82Y 40/00*     (2011.01)
    *H01M 4/02*      (2006.01)

(52) U.S. Cl.
    CPC ............. *C01G 33/00* (2013.01); *C01G 45/02* (2013.01); *C01G 49/02* (2013.01); *C01G 51/04* (2013.01); *C01G 51/40* (2013.01); *C01G 53/04* (2013.01); *C01G 53/40* (2013.01); *H01M 4/485* (2013.01); *H01M 4/502* (2013.01); *H01M 4/523* (2013.01); *H01M 4/525* (2013.01); *H01M 10/0525* (2013.01); *B82Y 30/00* (2013.01); *B82Y 40/00* (2013.01); *C01P 2002/01* (2013.01); *C01P 2002/02* (2013.01); *C01P 2002/54* (2013.01); *C01P 2002/72* (2013.01); *C01P 2002/85* (2013.01); *C01P 2004/24* (2013.01); *C01P 2004/64* (2013.01); *C01P 2006/12* (2013.01); *C01P 2006/40* (2013.01); *H01M 2004/027* (2013.01)

(58) Field of Classification Search
    CPC ........ H01M 10/0525; H01M 2004/027; C01G 25/02; C01G 19/02; C01G 23/08; C01G 33/00; C01G 45/02; C01G 49/02; C01G 51/04; C01G 51/40; C01G 53/04; C01G 53/40; B82Y 30/00; B82Y 40/00; C01P 2002/01; C01P 2002/02; C01P 2002/54; C01P 2002/72; C01P 2002/85; C01P 2004/24; C01P 2004/64; C01P 2004/12; C01P 2004/40
    See application file for complete search history.

(56) References Cited

FOREIGN PATENT DOCUMENTS

| | | |
|---|---|---|
| CN | 104478006 A | 4/2015 |
| CN | 105576212 A | 5/2016 |

OTHER PUBLICATIONS

Cao, et al., "Two-Dimensional Porous Micro/Nano Metal Oxides Templated by Graphene Oxide," ACS Applied Materials & Interfaces, 2015, pp. 11984-11990, vol. 7, American Chemical Society, 7 pages.

Li, et al., "Facile preparation of porous Co3O4 nanosheets for high-performance lithium ion batteries and oxygen evolution reaction," Journal of Power Sources, 2016, pp. 41-46, vol. 310, Elsevier.

The International Search Report for PCT Application No. PCT/SG2017/050525 dated Jan. 24, 2018, 3 pages.

The Written Opinion of the International Searching Authority for PCT Application No. PCT/SG2017/050525 dated Jan. 24, 2018, 8 pages.

Zhao, et al., "A Generalized Strategy for the Synthesis of Large-Size Ultrathin Two-Dimensional Metal Oxide Nanosheets," Angewandte Chemie International Edition, 2017, pp. 1-6, vol. 56, Wiley.

Lele Peng et al., "Holey two-dimensional transition metal oxide nanosheets for efficient energy storage", nature communications, Accpeted Mar. 3, 2017, Published Apr. 26, 2017, DOI: 10.1038/ncomms15139, www.nature.com/naturecommunications, 10 pages.

* cited by examiner

[Fig. 1]
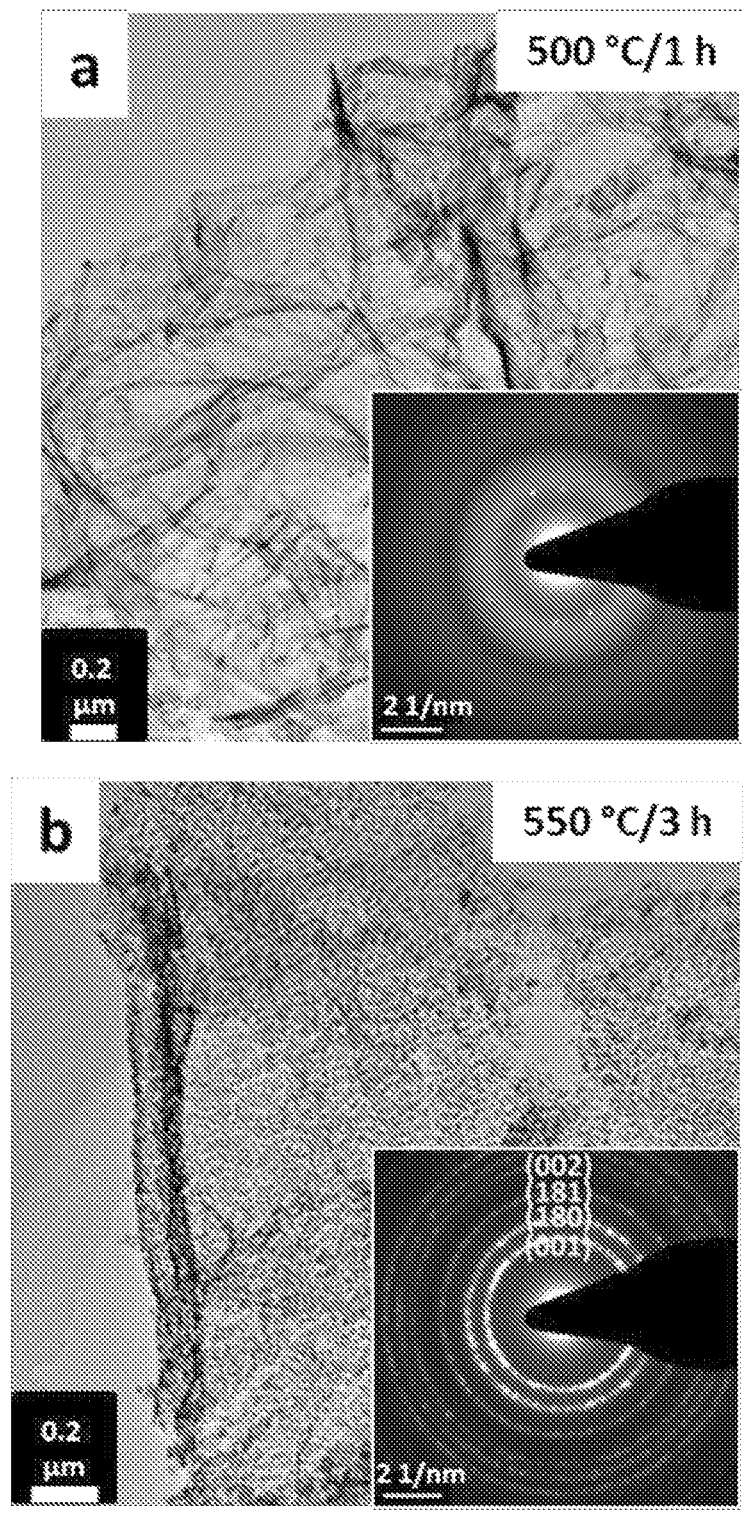

[Fig. 1]
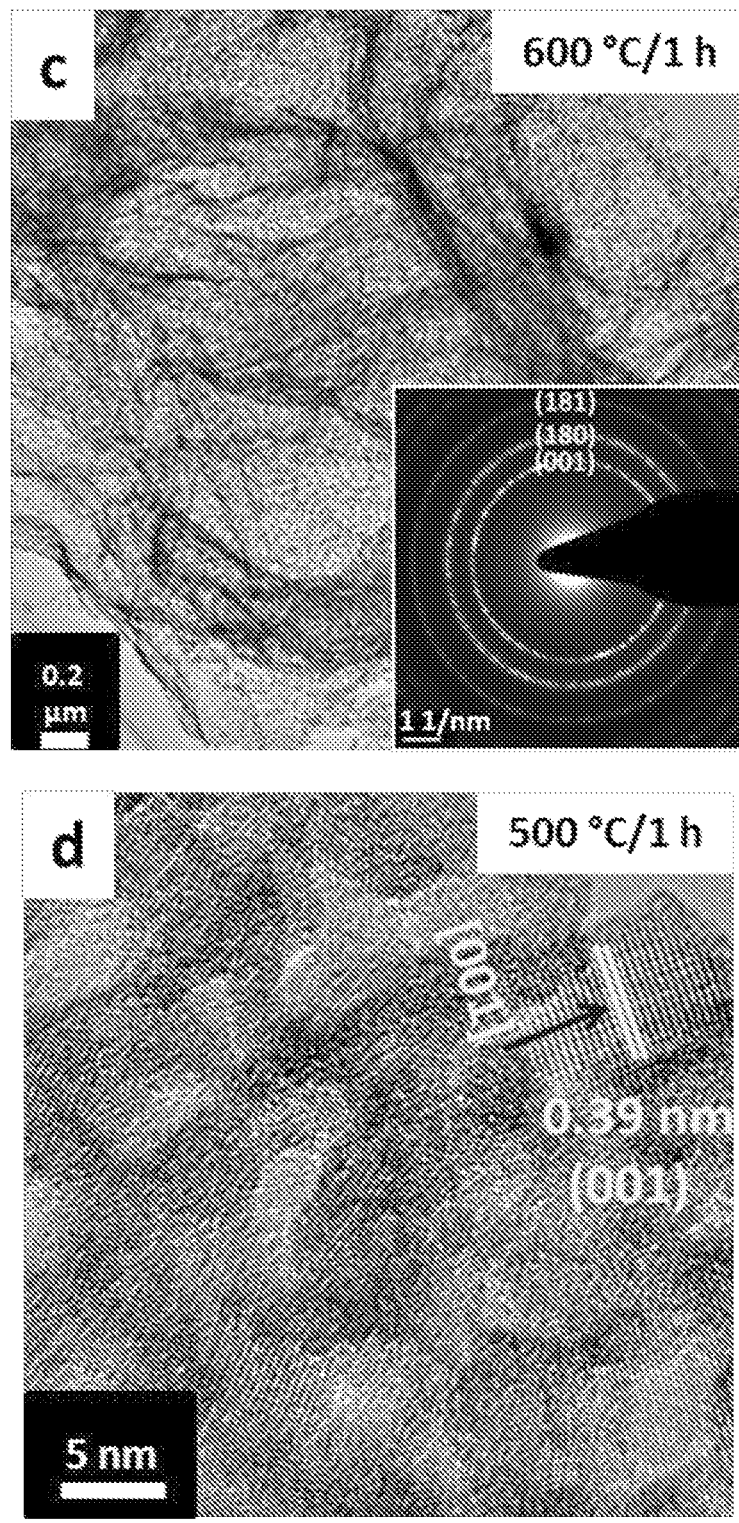

[Fig. 1]
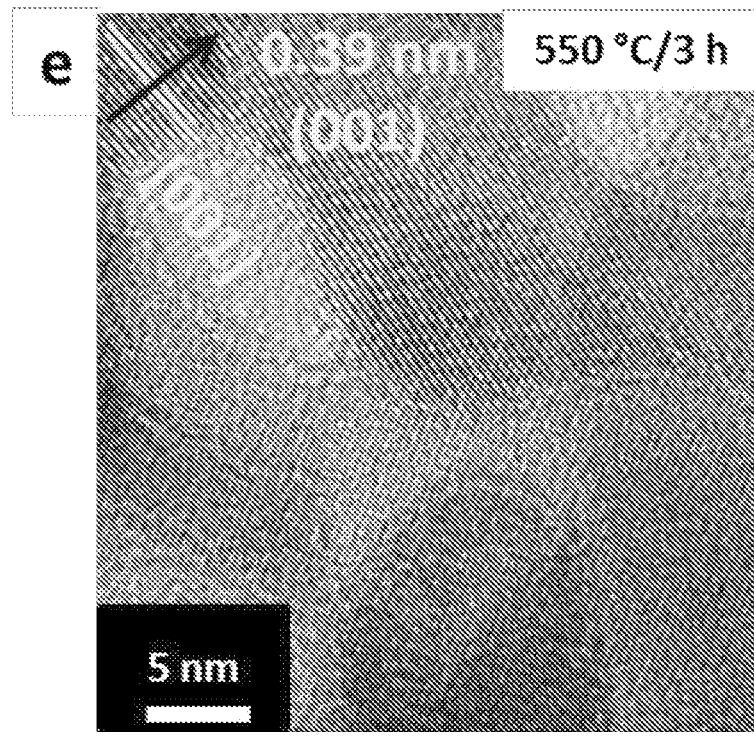
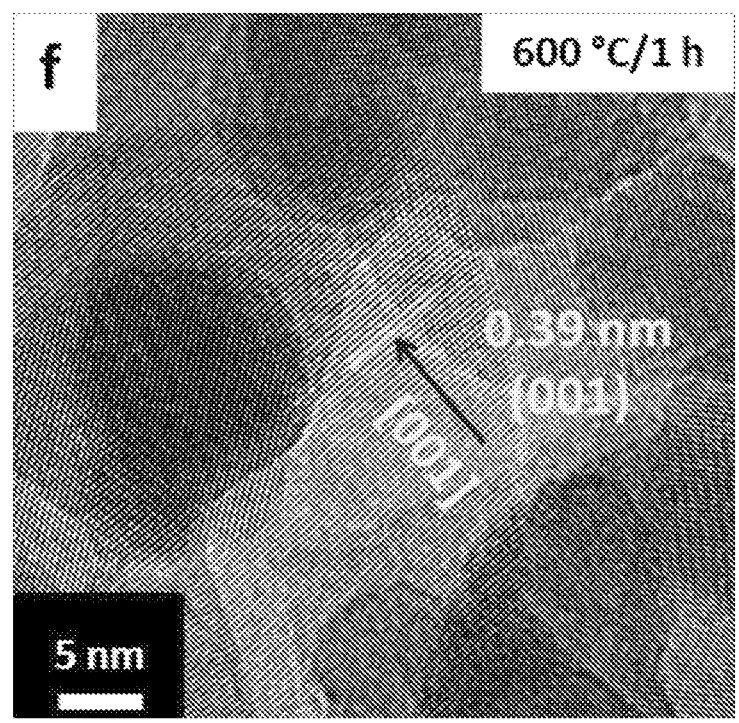

[Fig. 1]
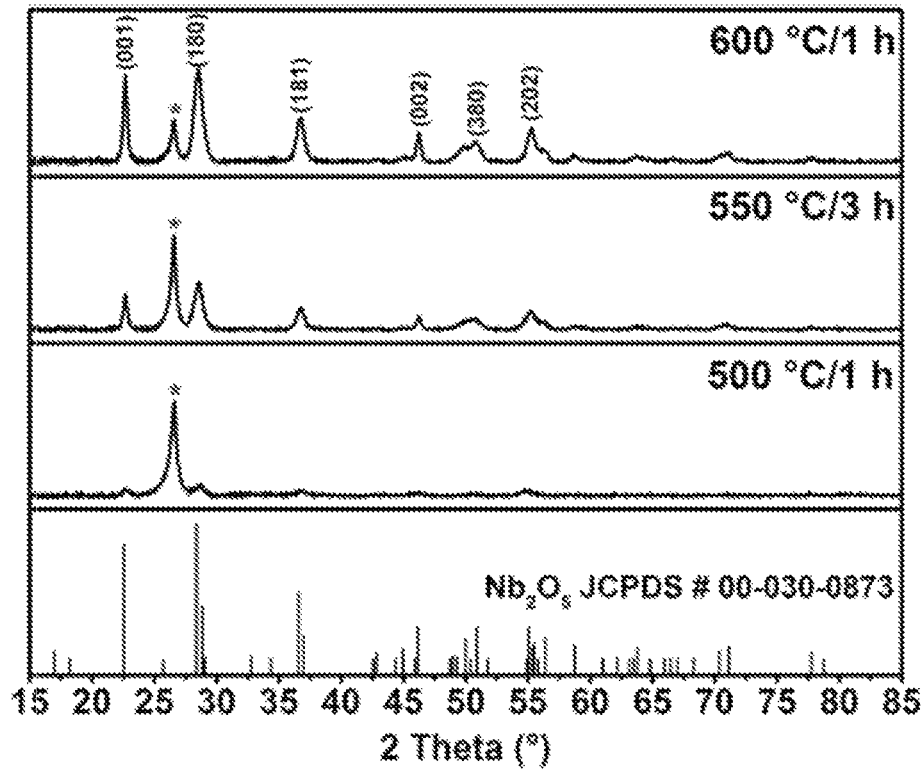
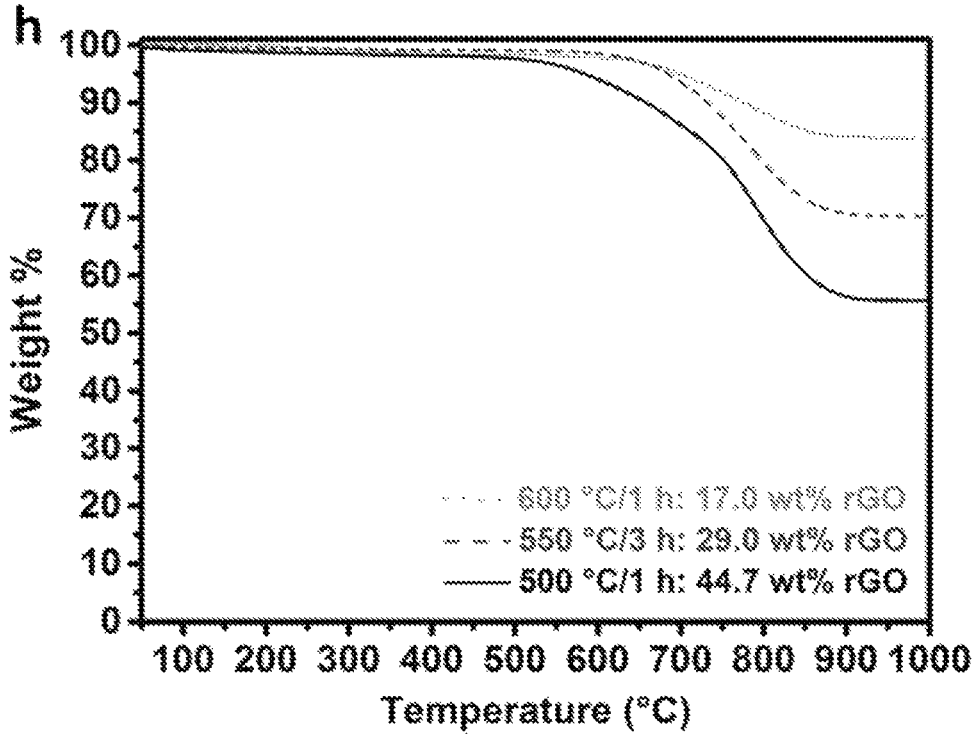

[Fig. 2]
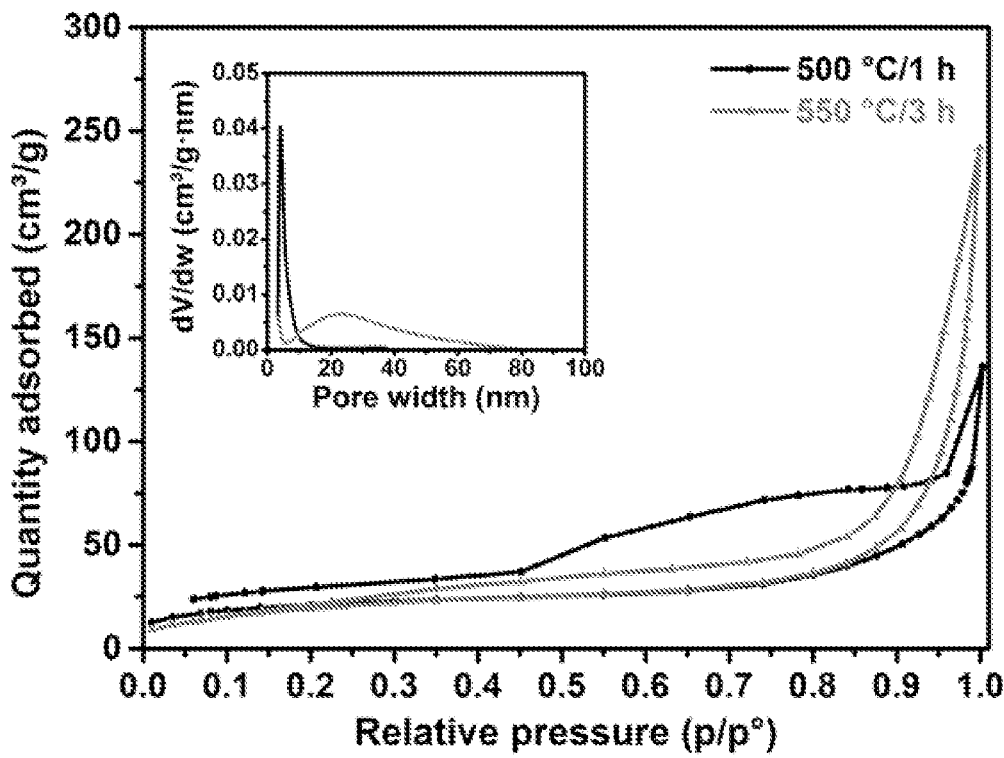
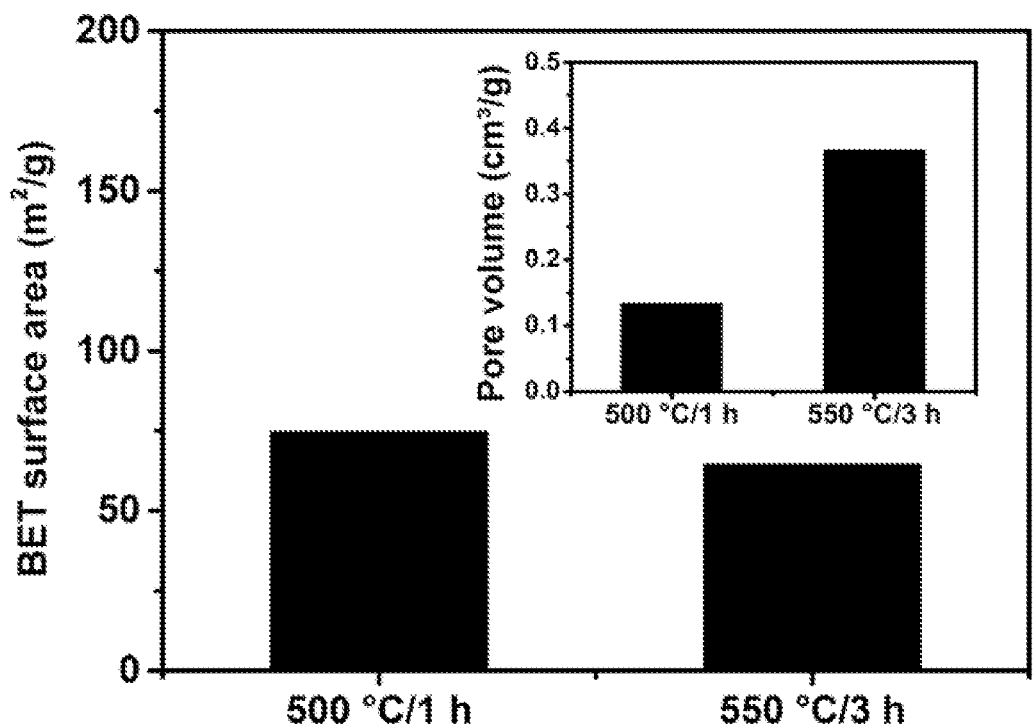

[Fig. 3]
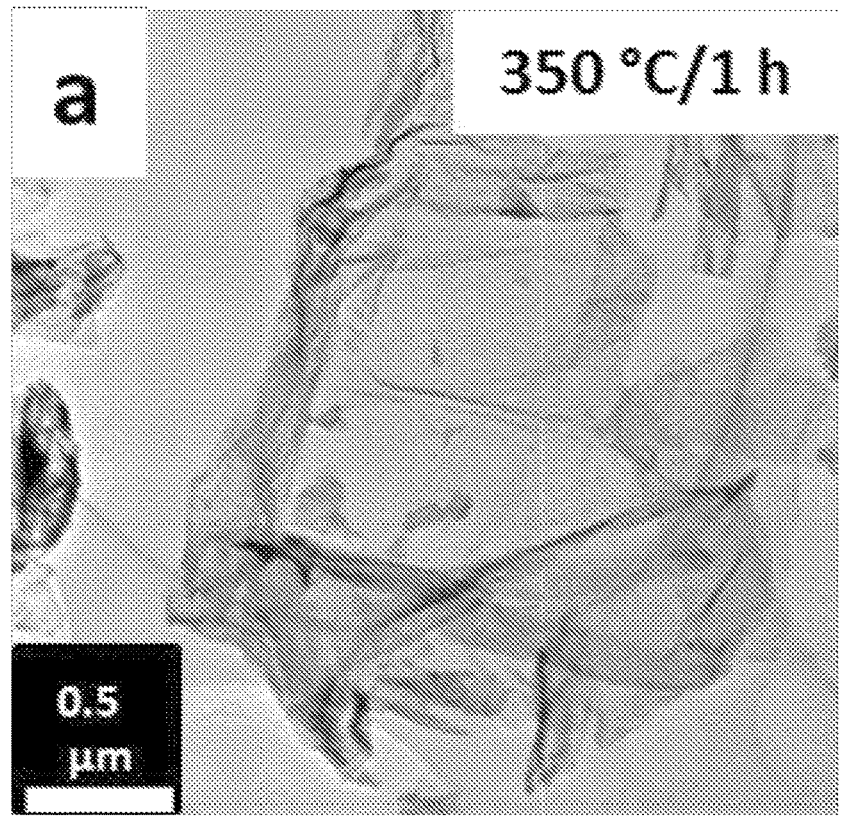
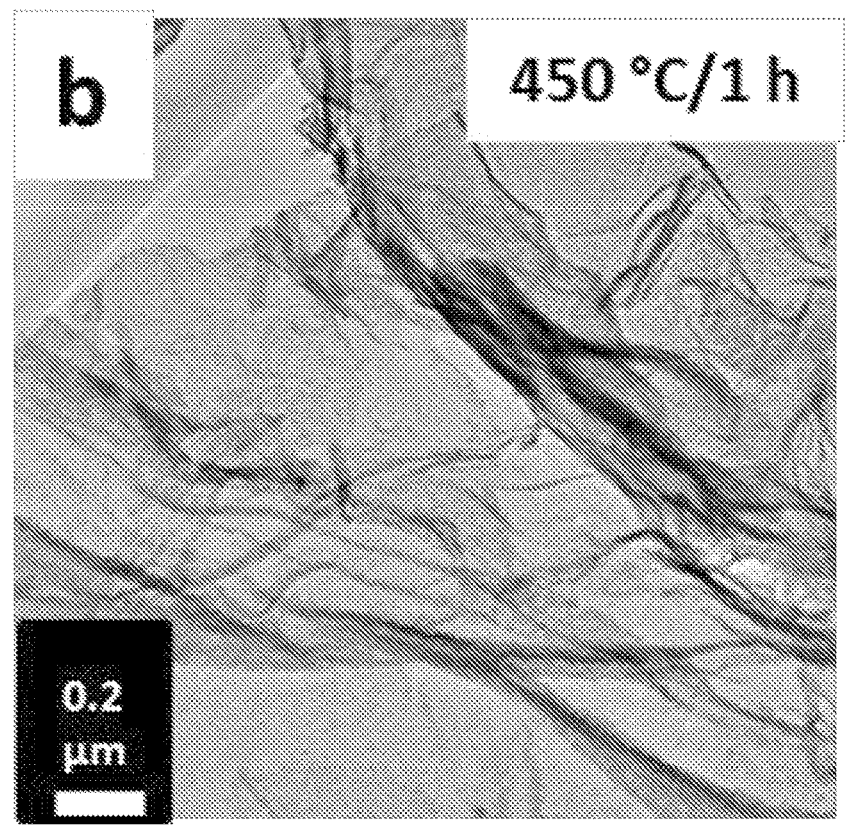

[Fig. 3]
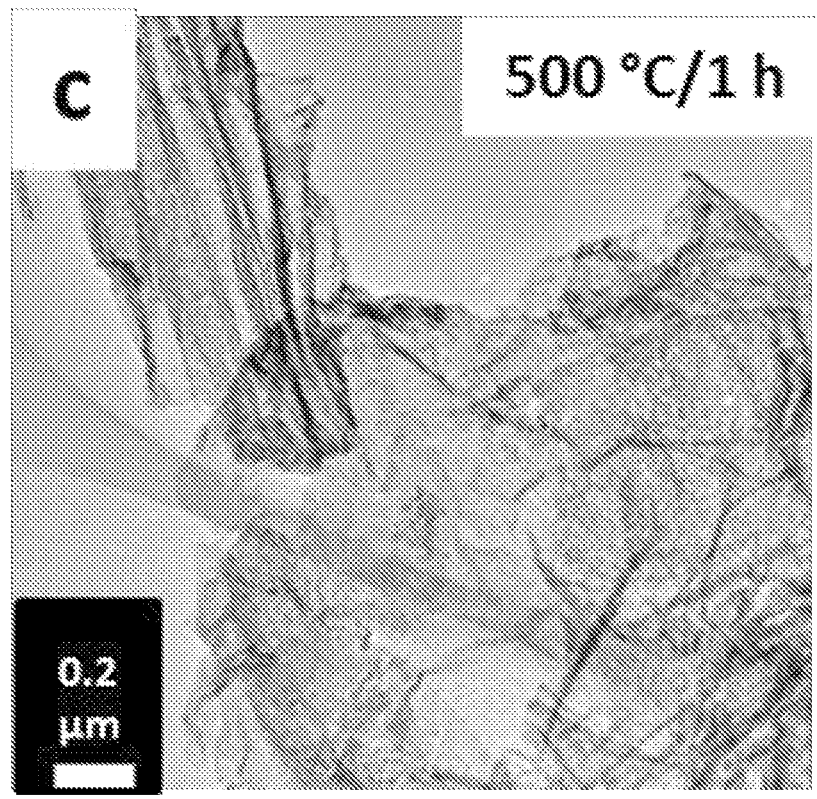
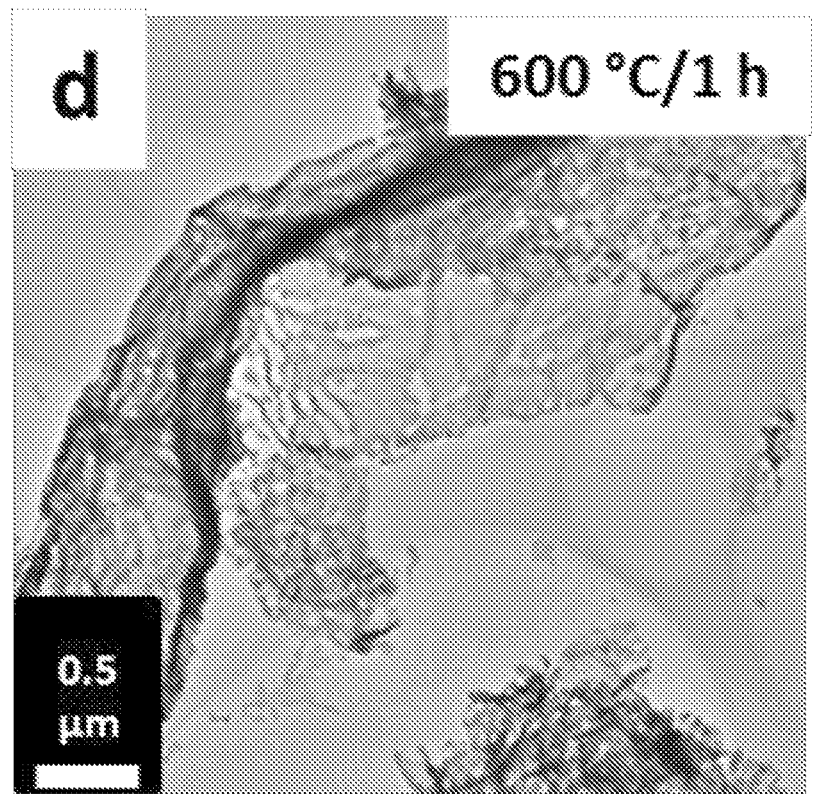

[Fig. 3]
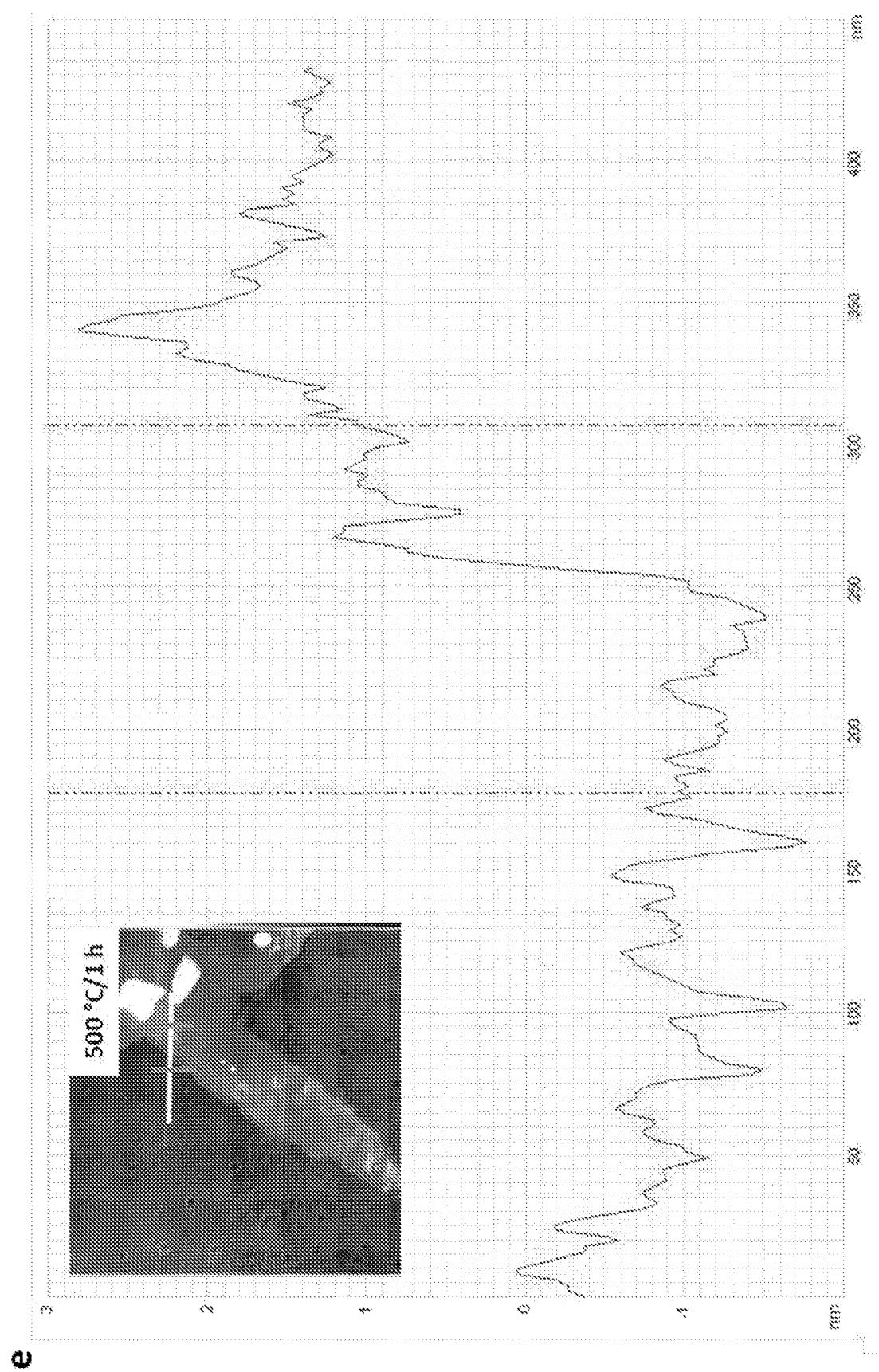

[Fig. 3]
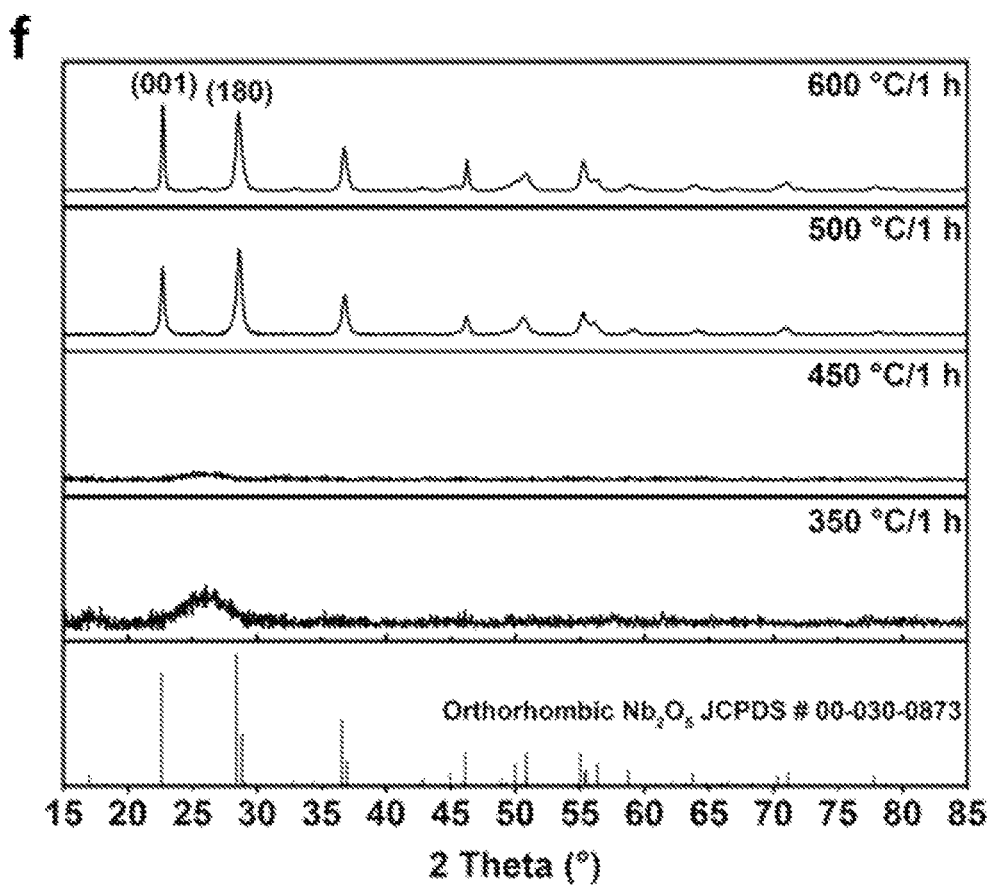

[Fig. 4]
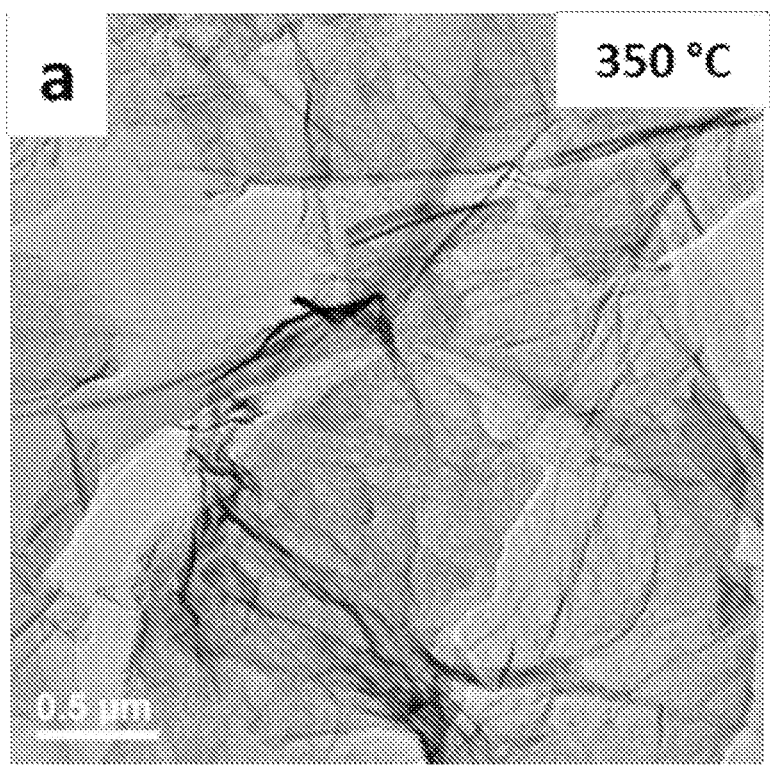
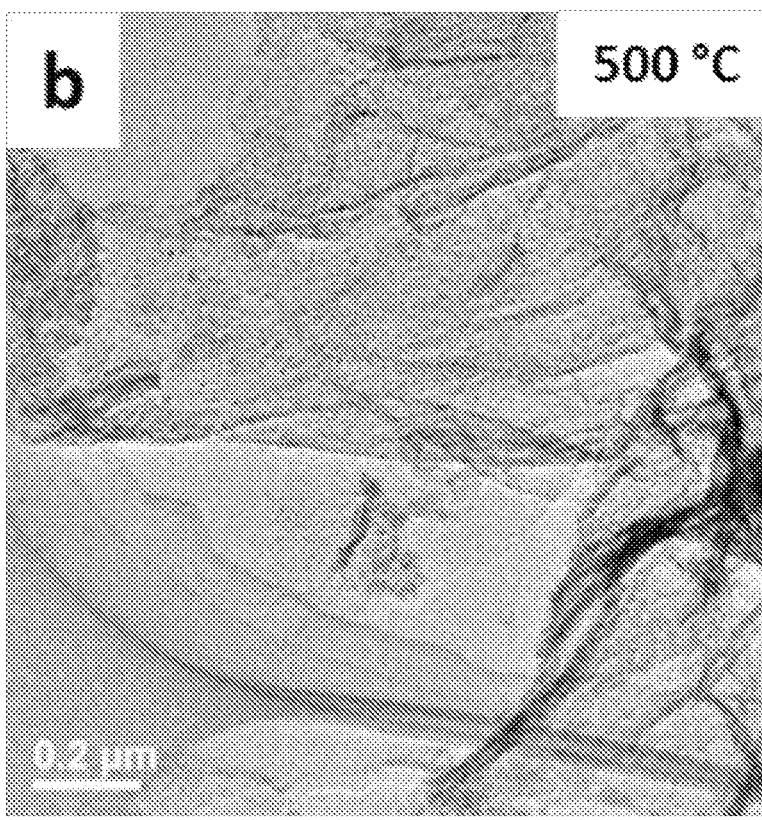

[Fig. 4]
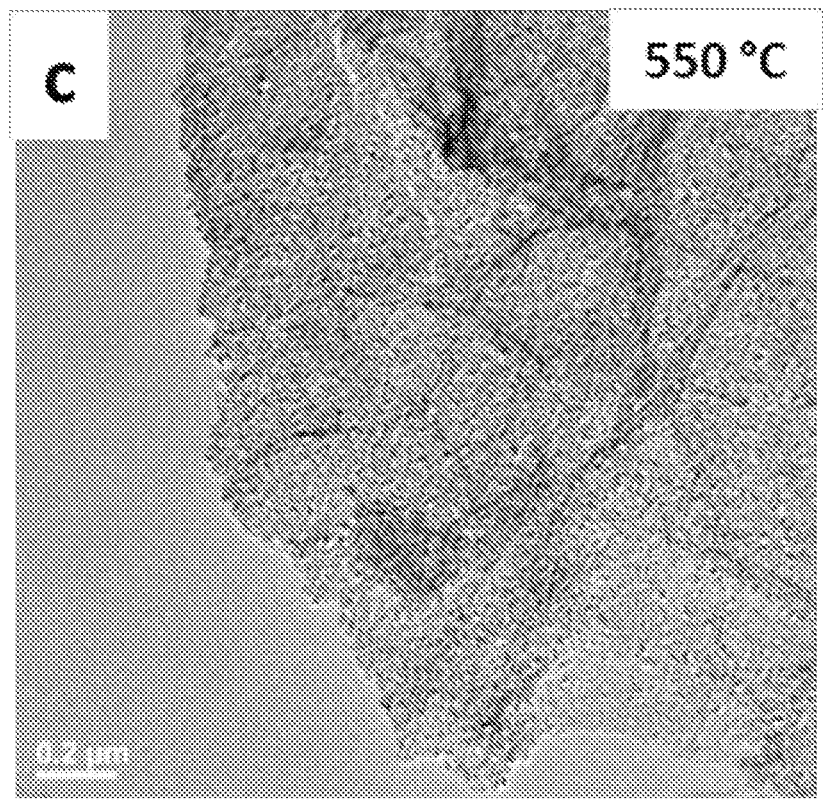
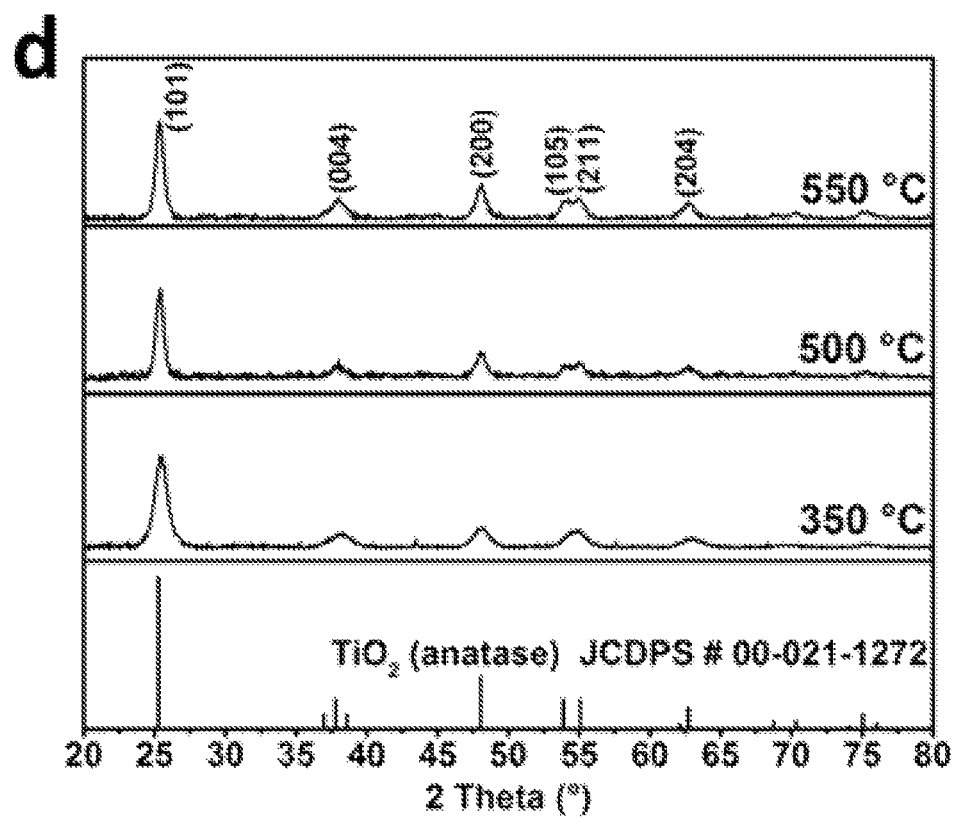

[Fig. 4]
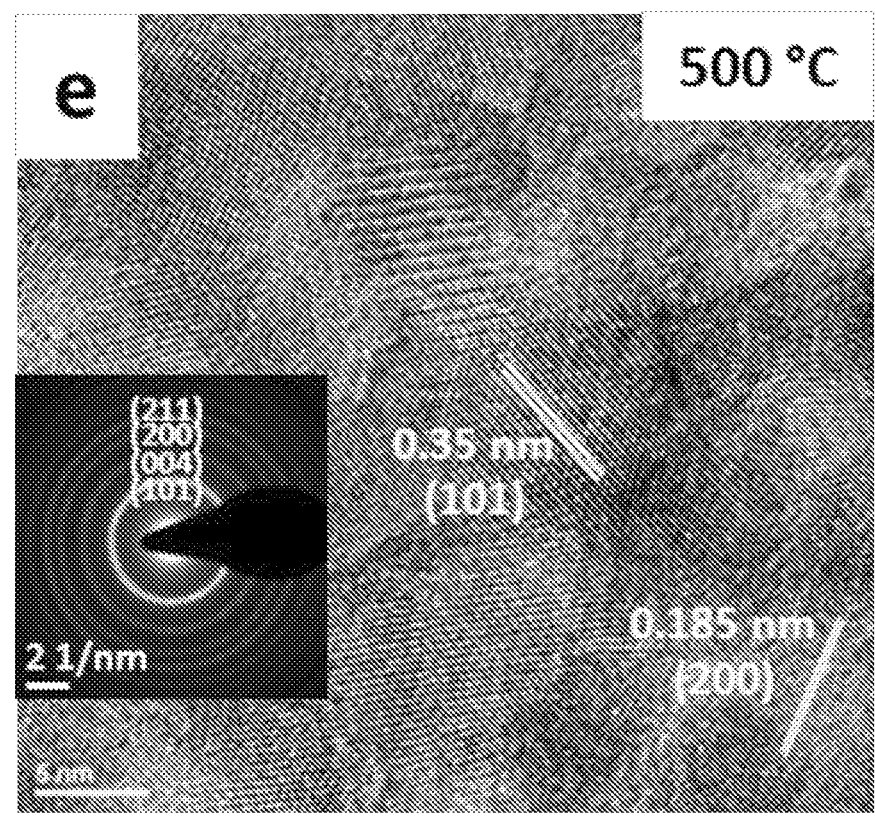
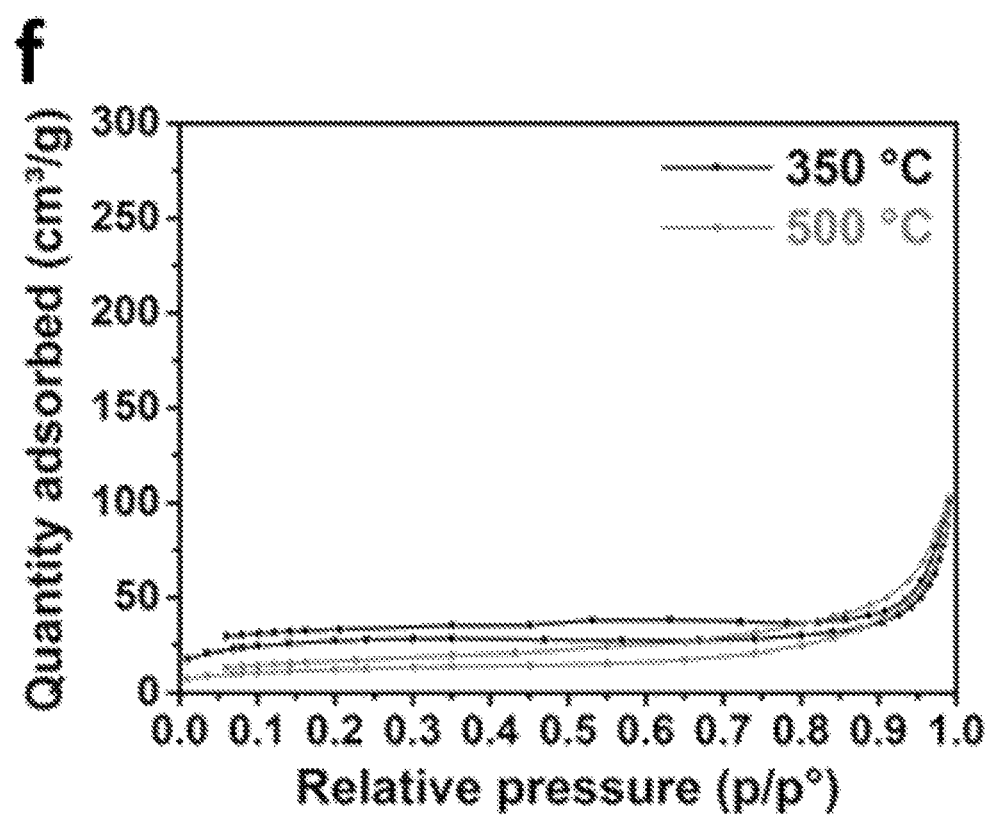

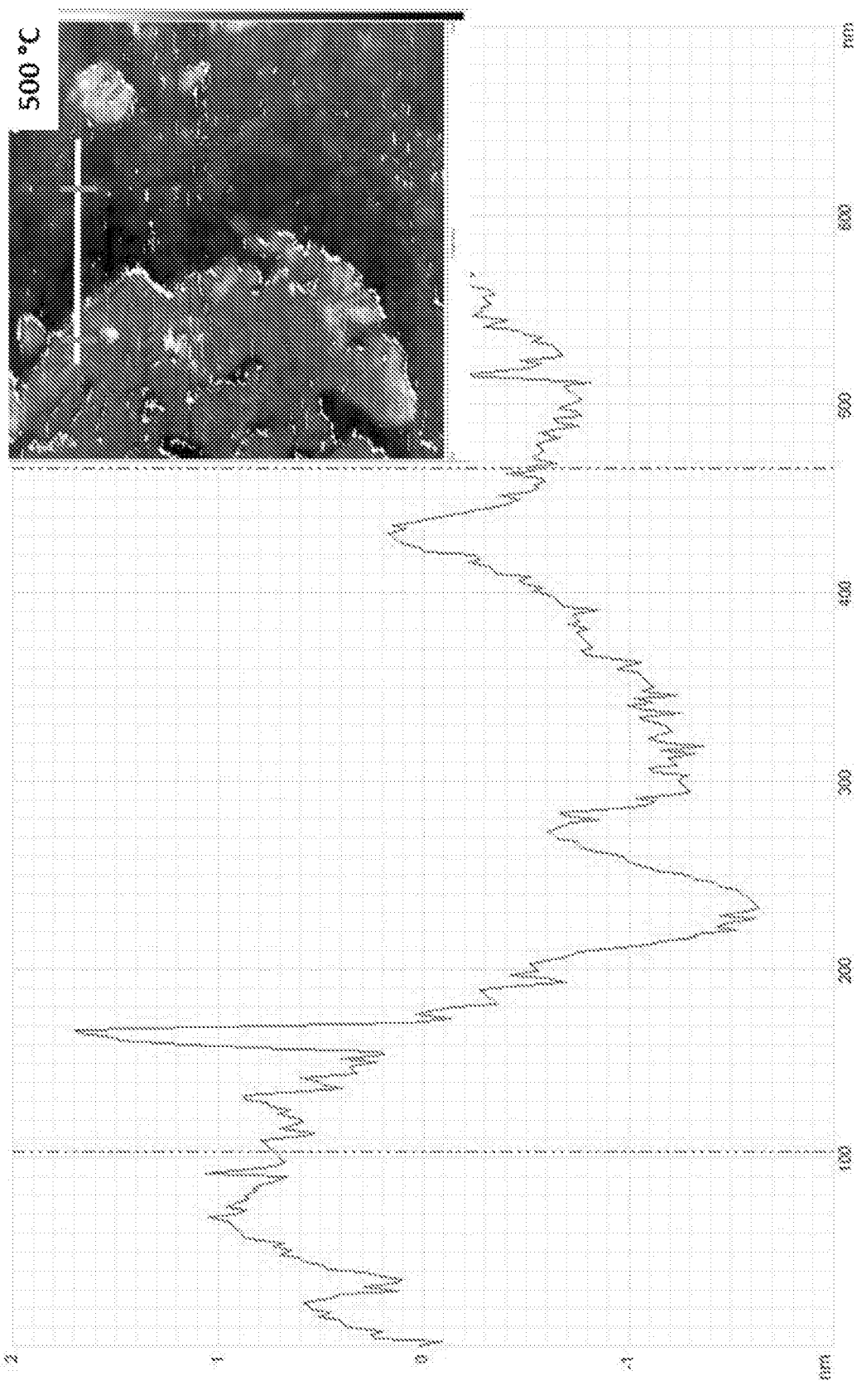
[Fig. 4]

[Fig. 5]
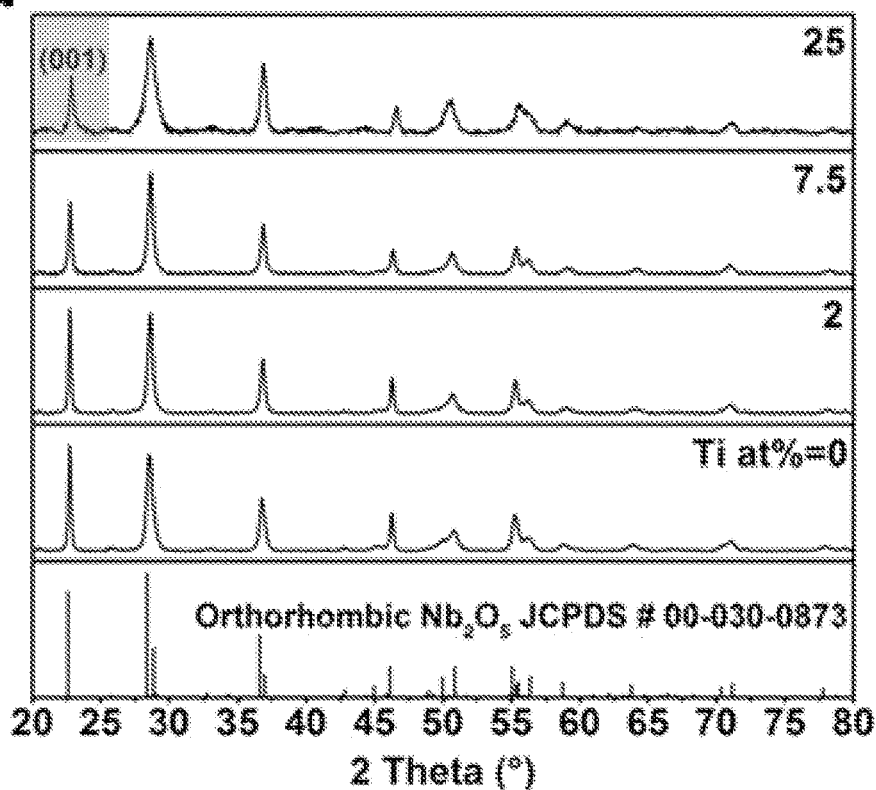
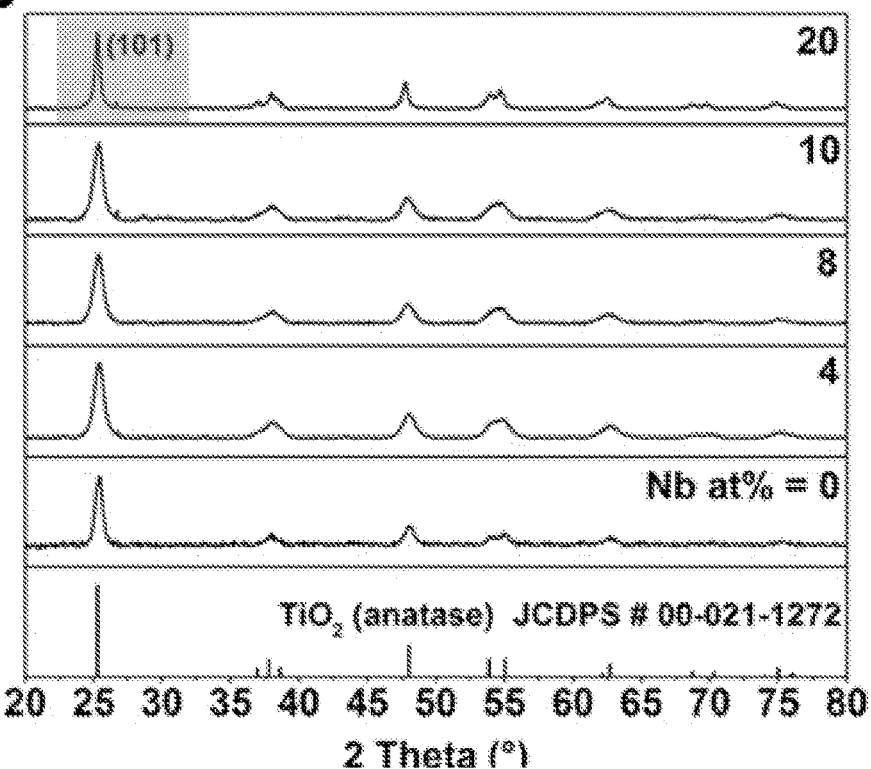

[Fig. 5]
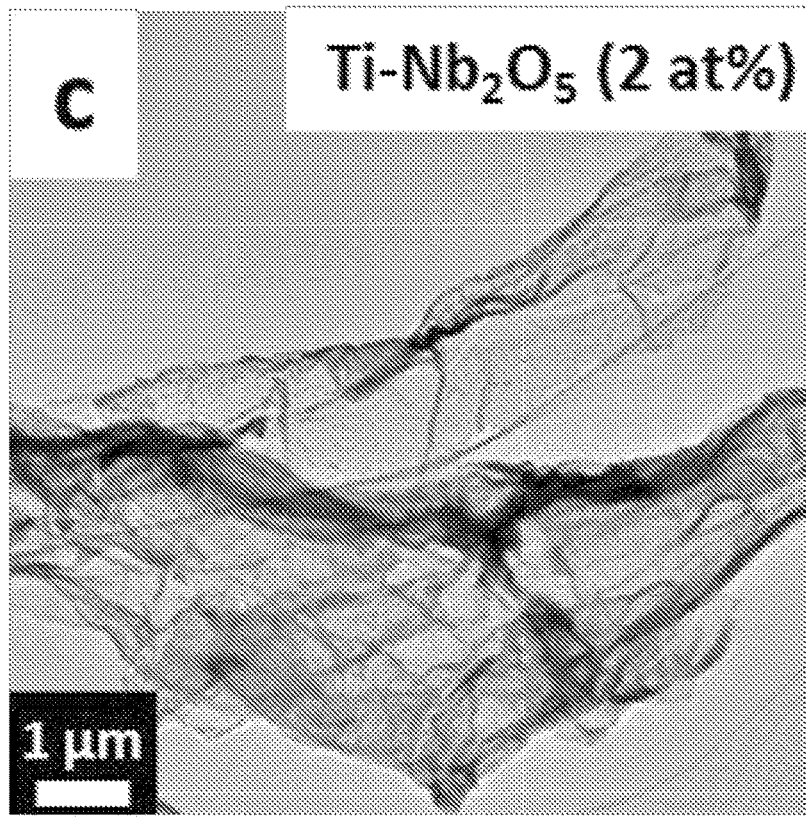
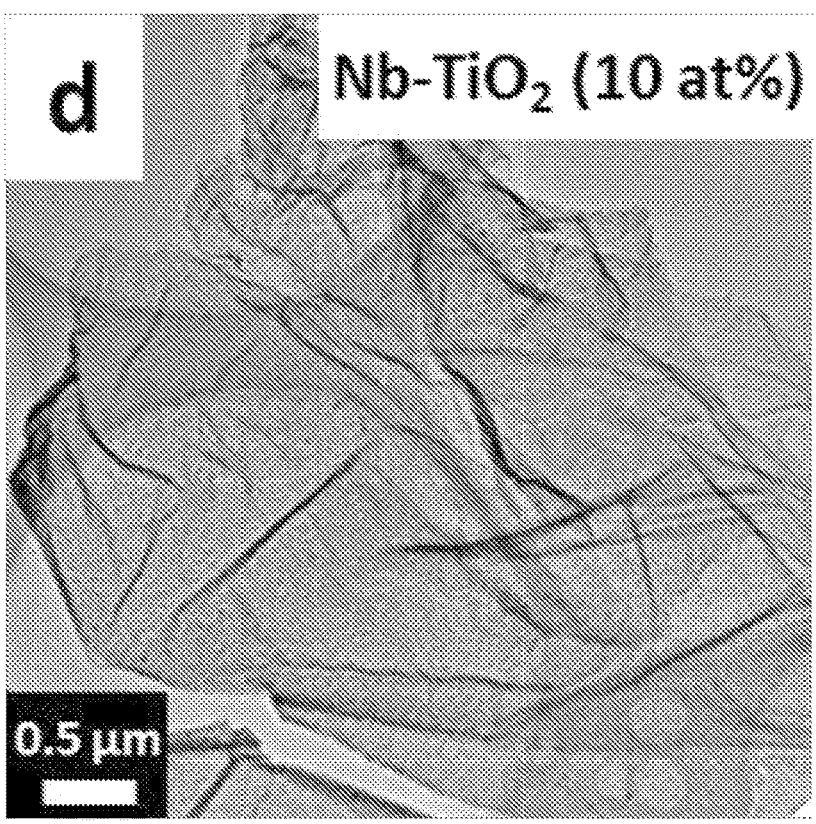

[Fig. 5]
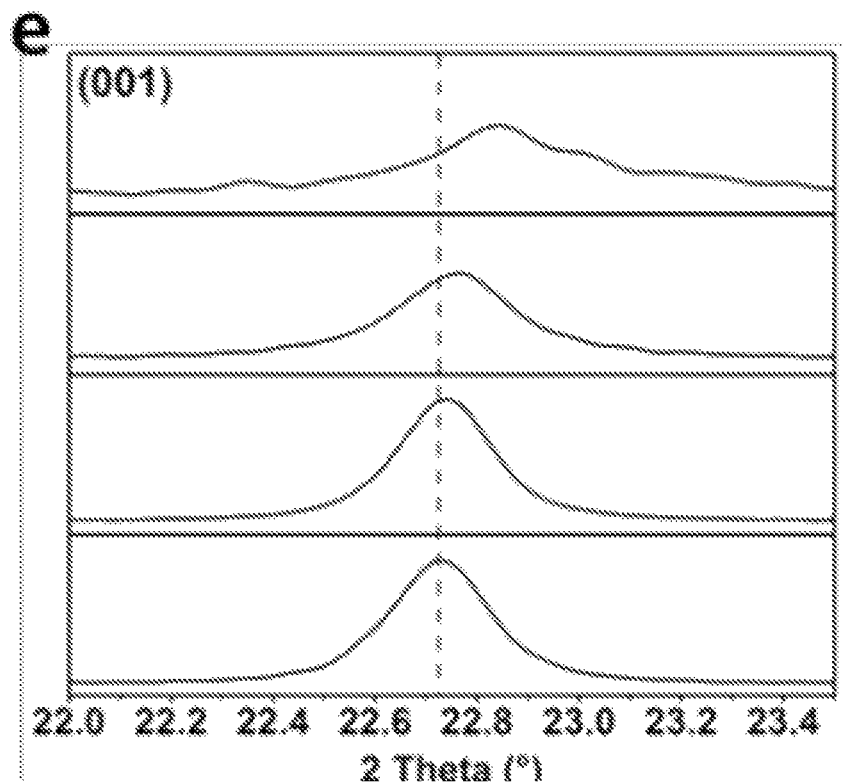
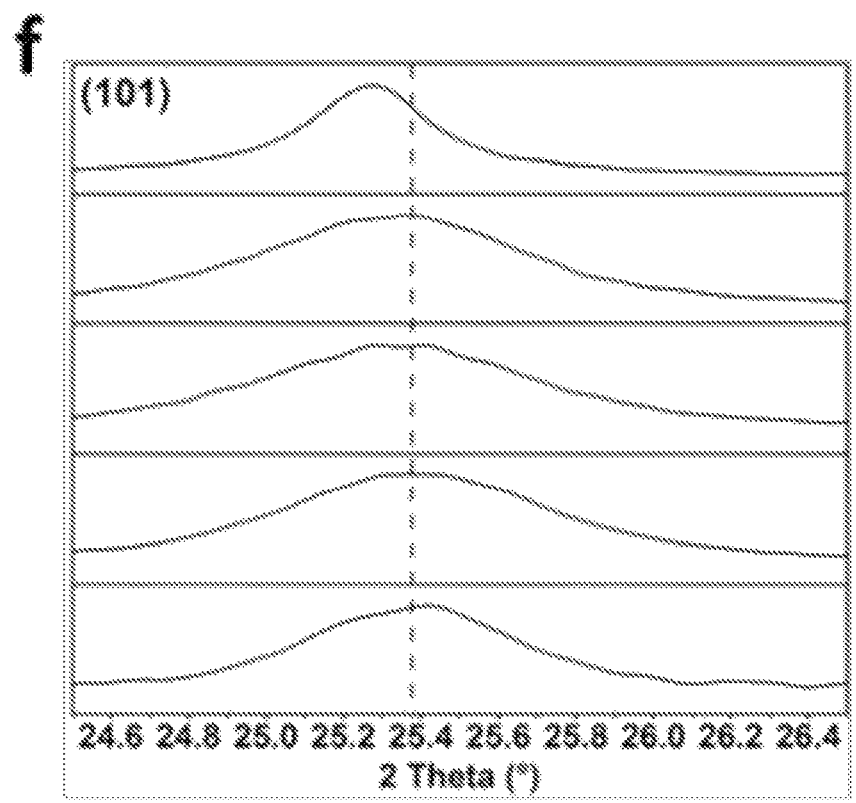

[Fig. 5]
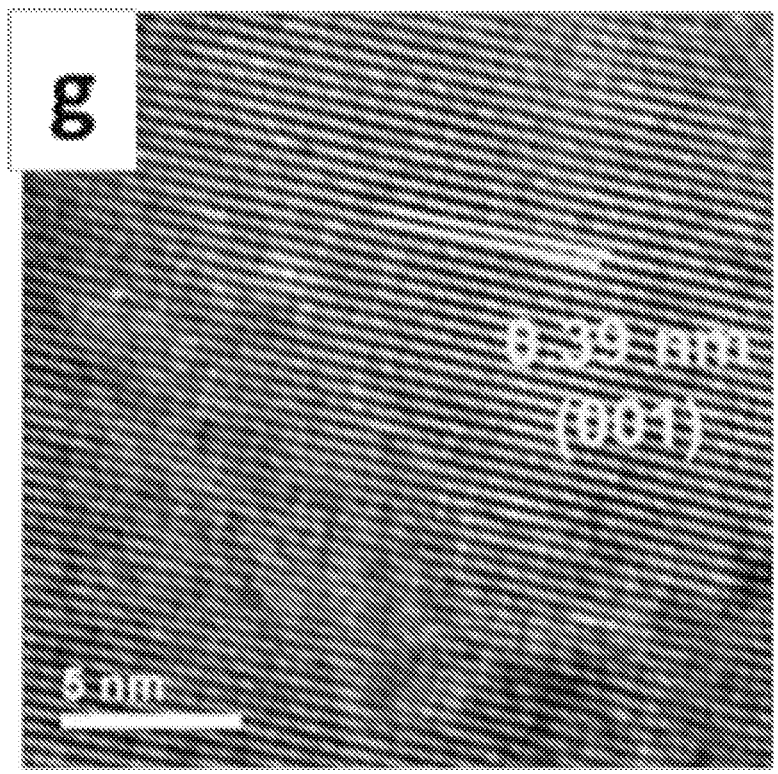
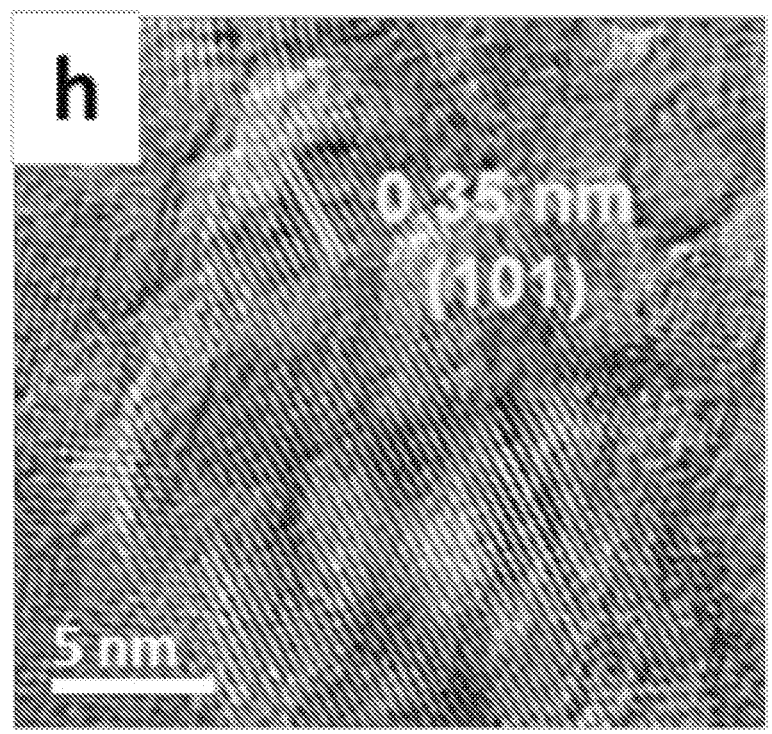

[Fig. 5]
i
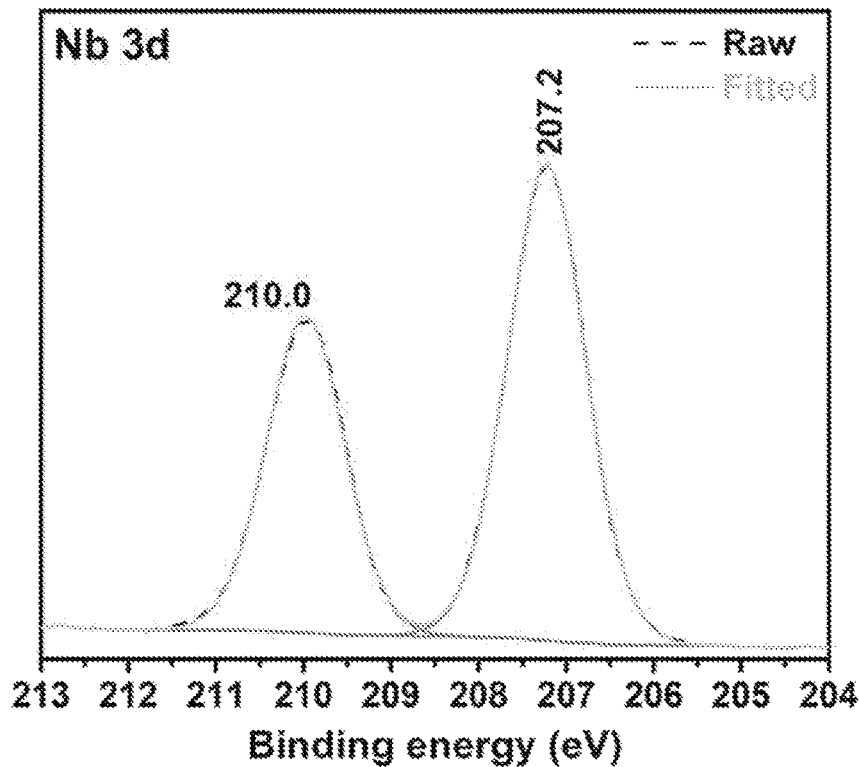
j
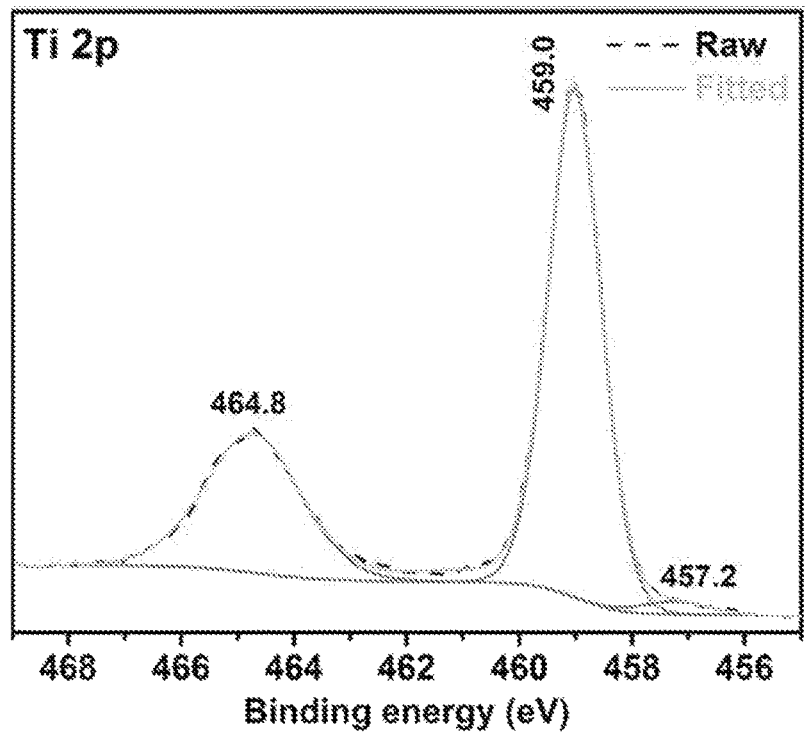

[Fig. 5]
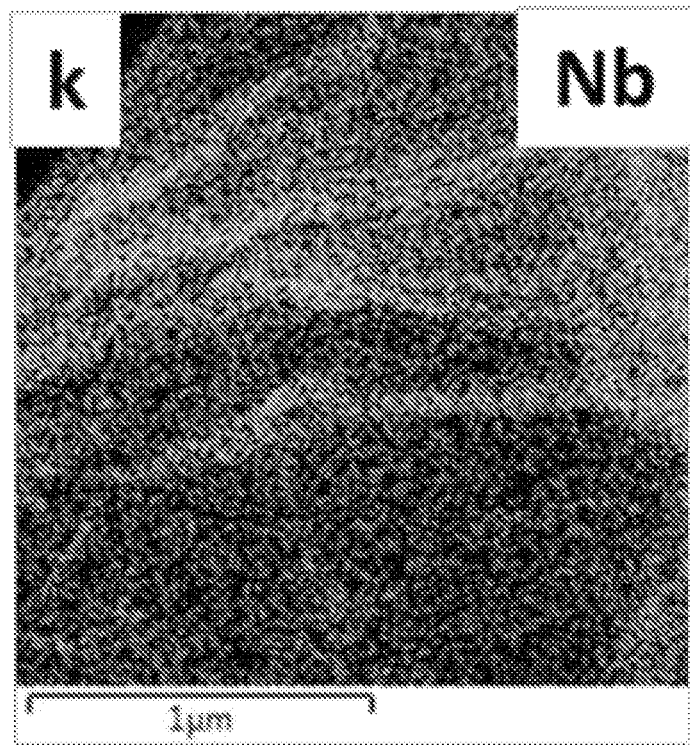
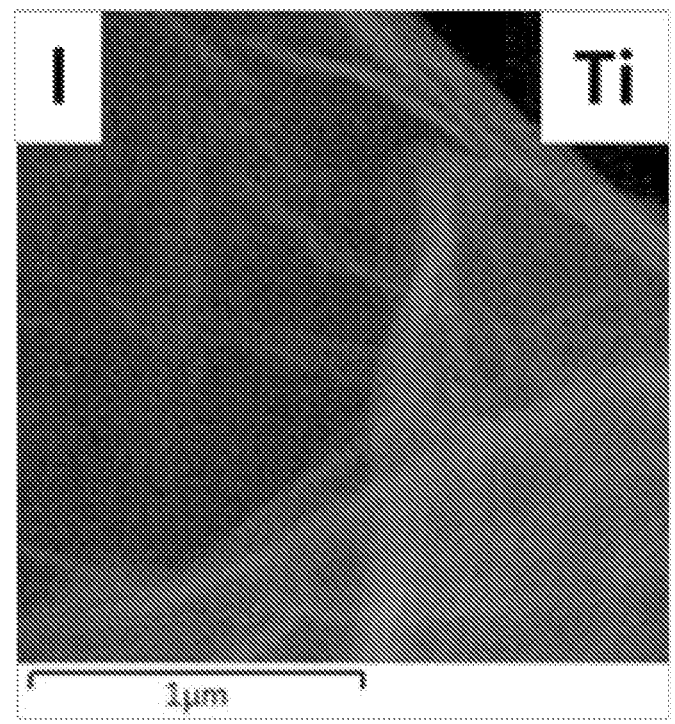

[Fig. 5]
m
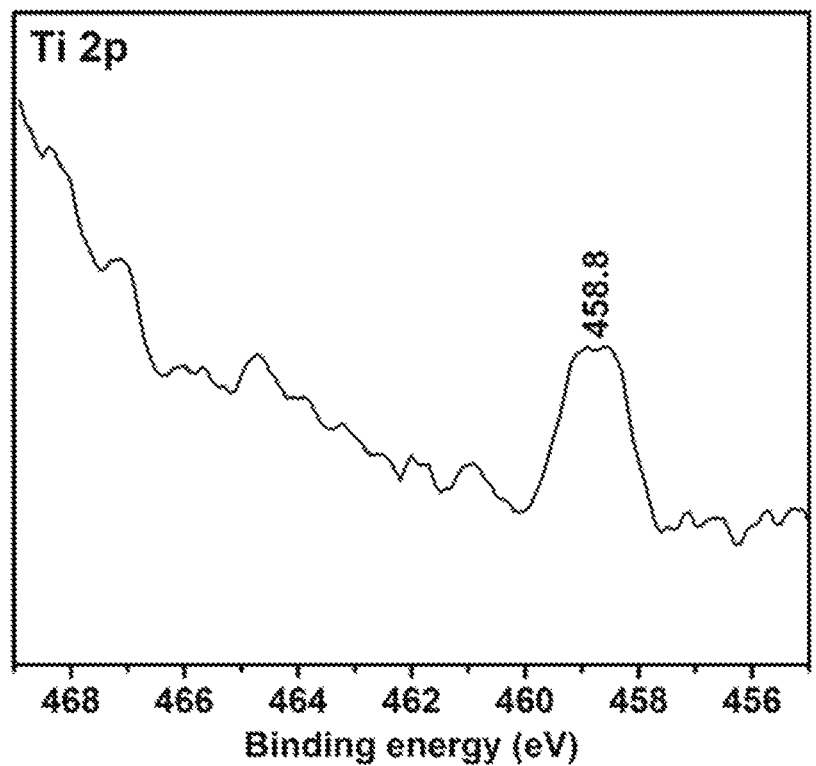
n
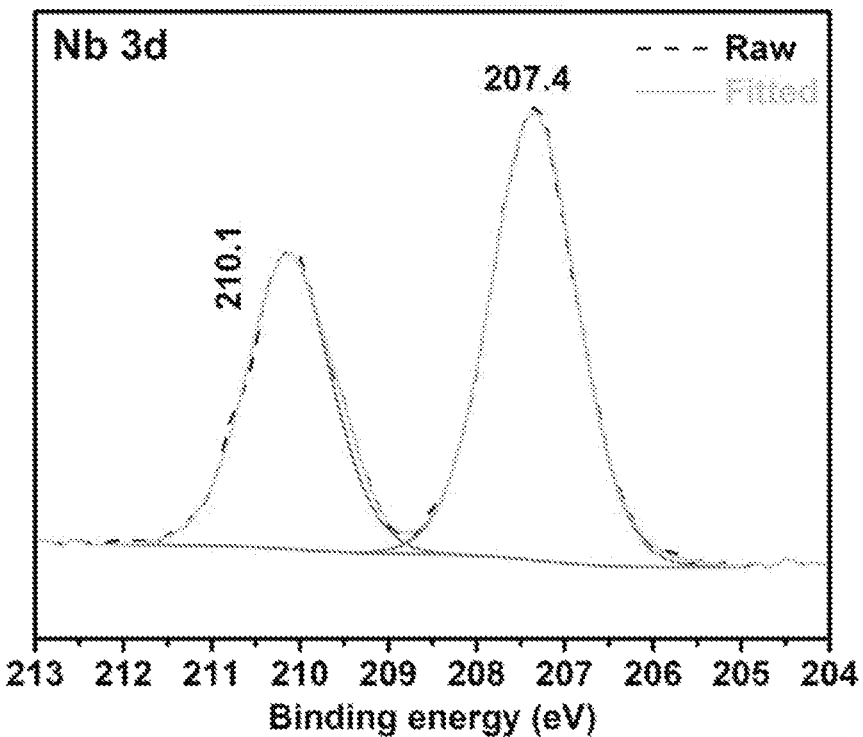

[Fig. 5]
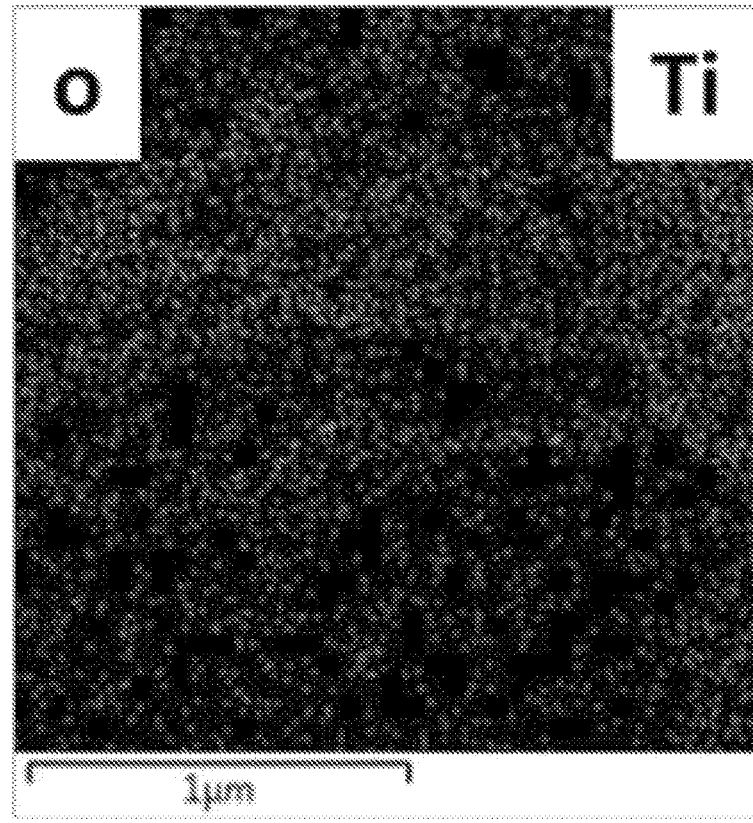
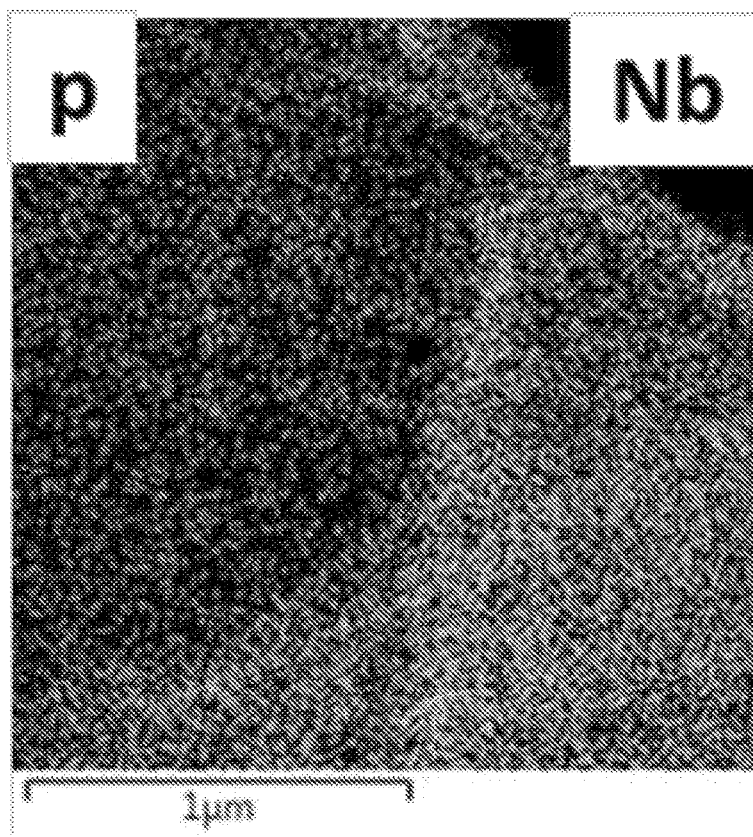

[Fig. 6]
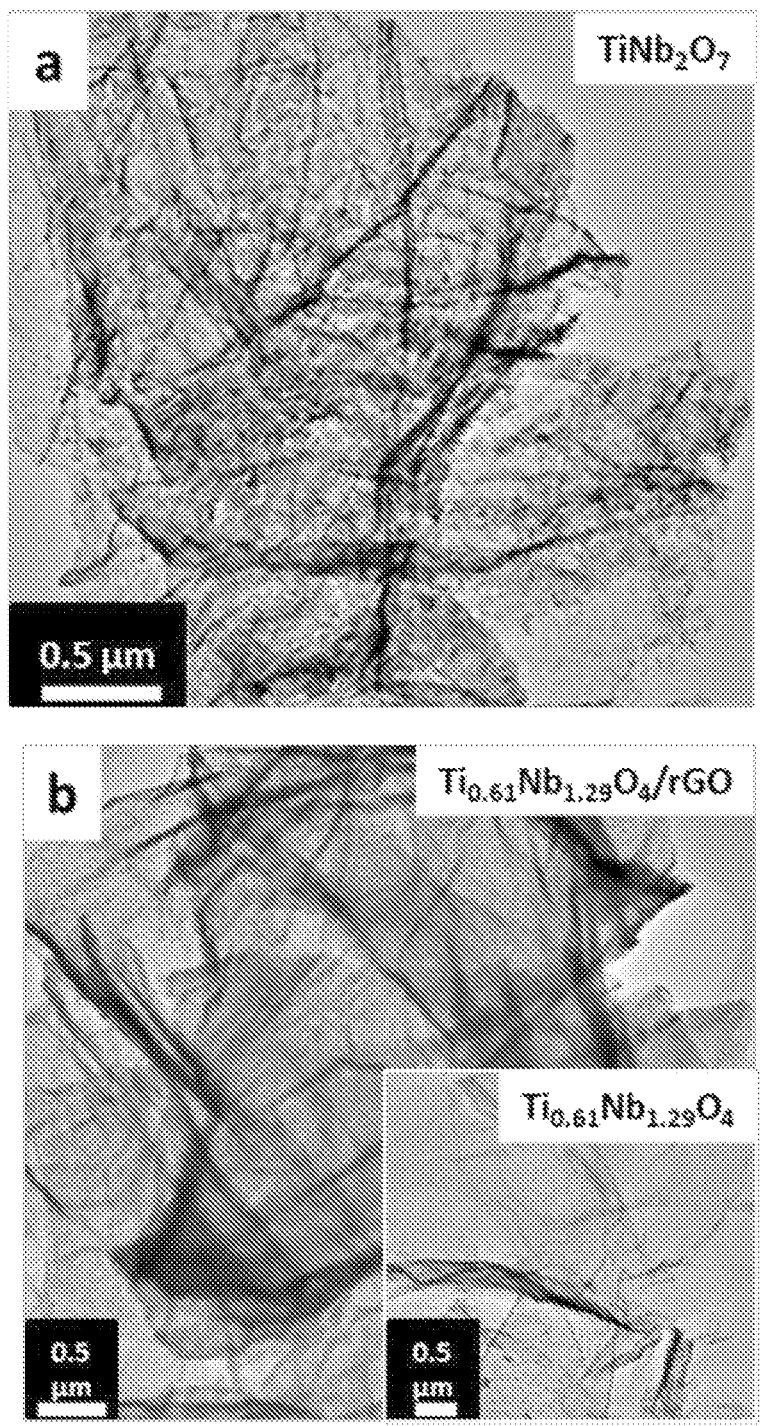

[Fig. 6]
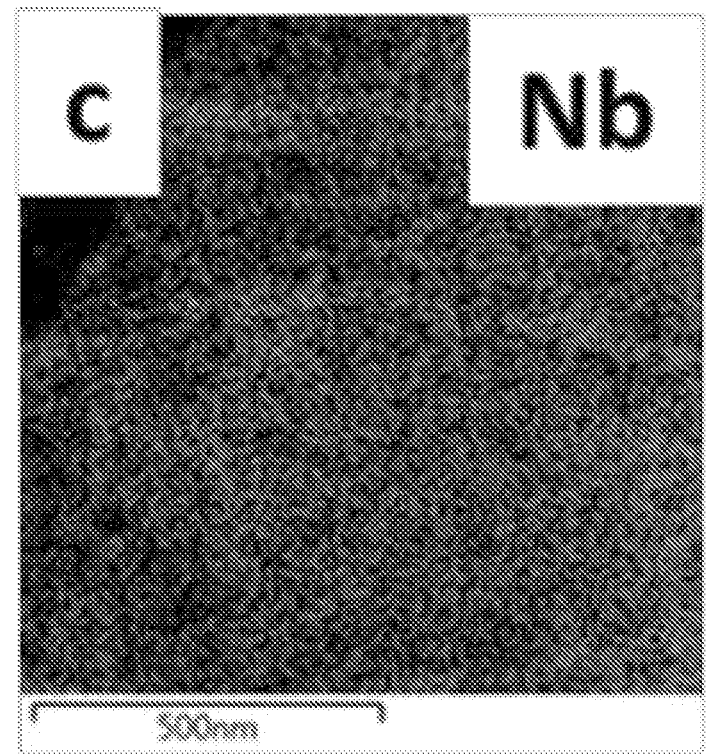
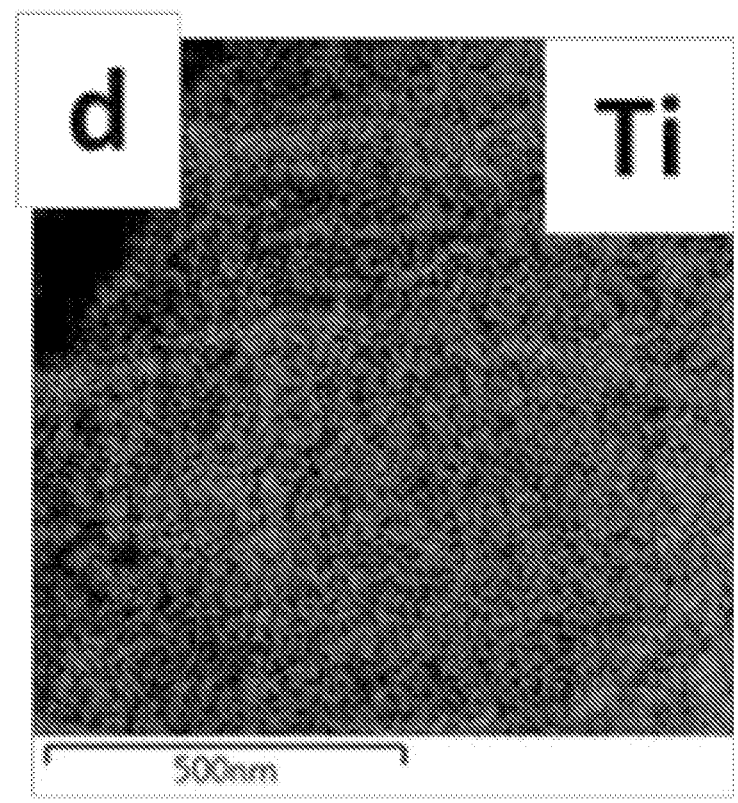

[Fig. 6]
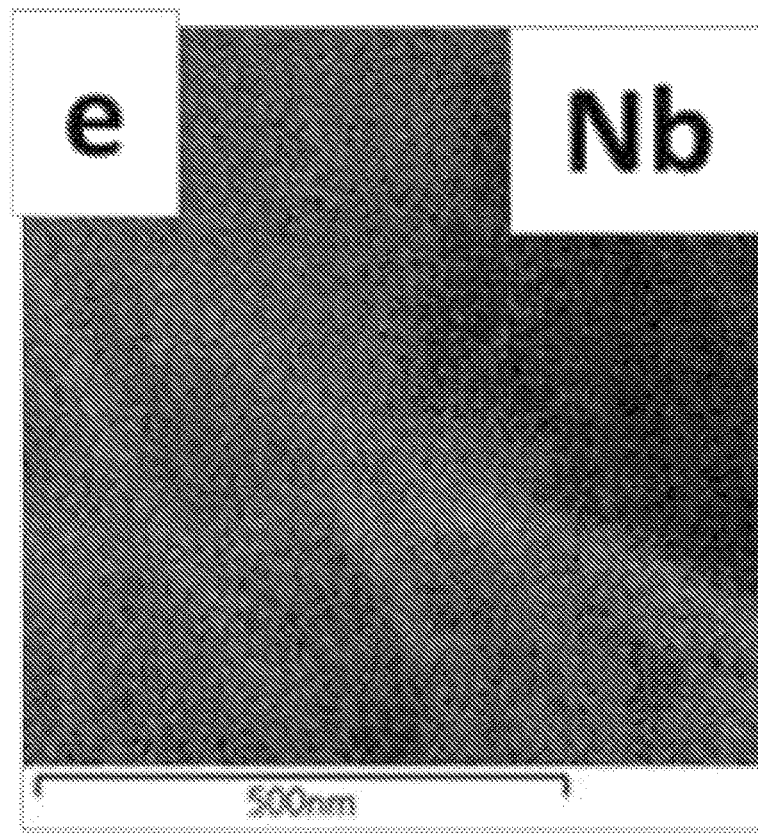
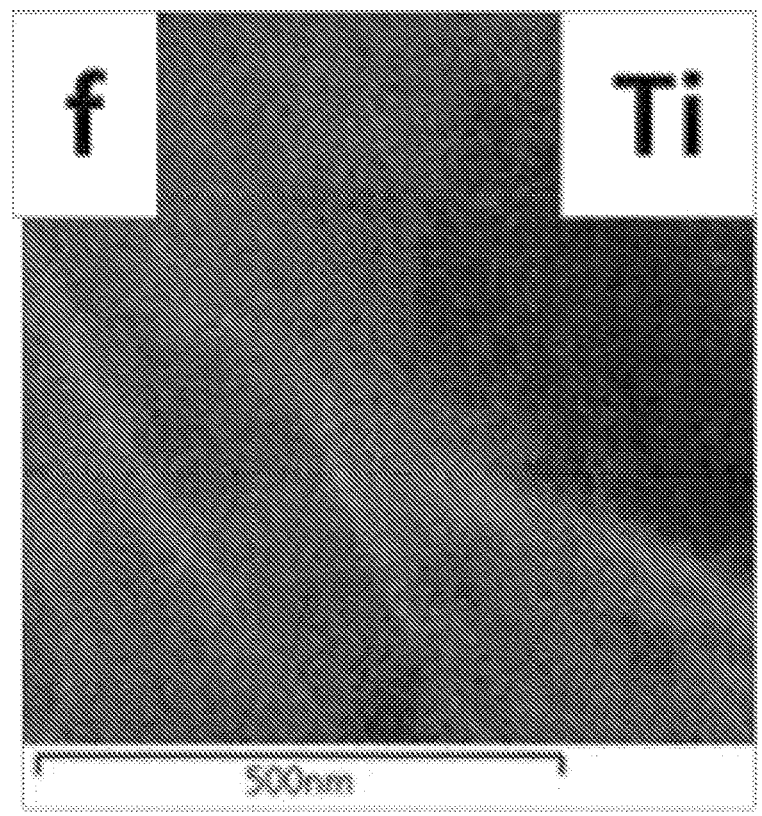

[Fig. 6]
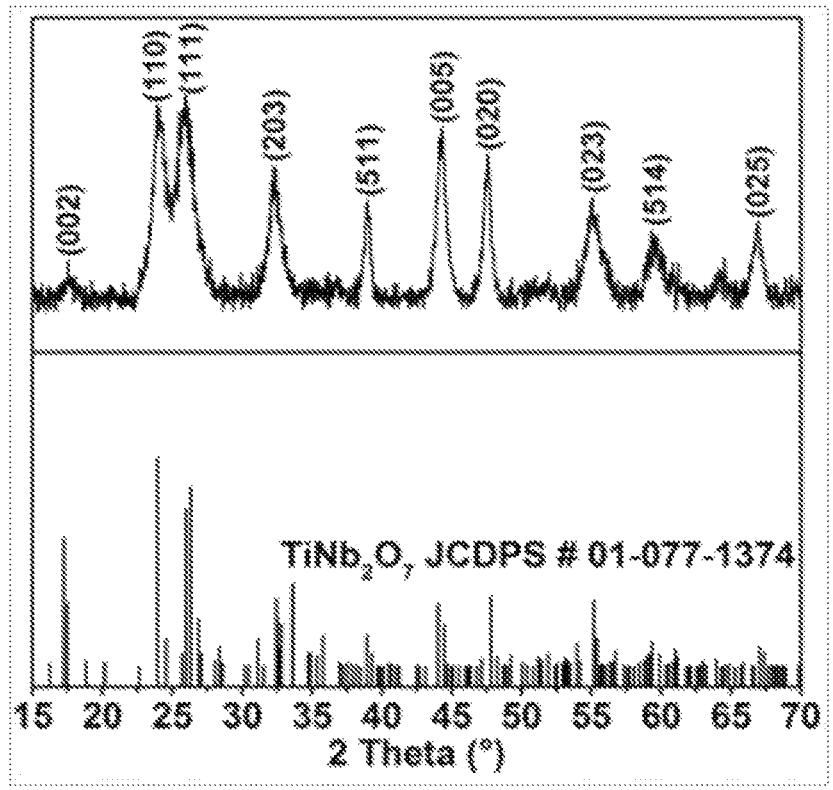
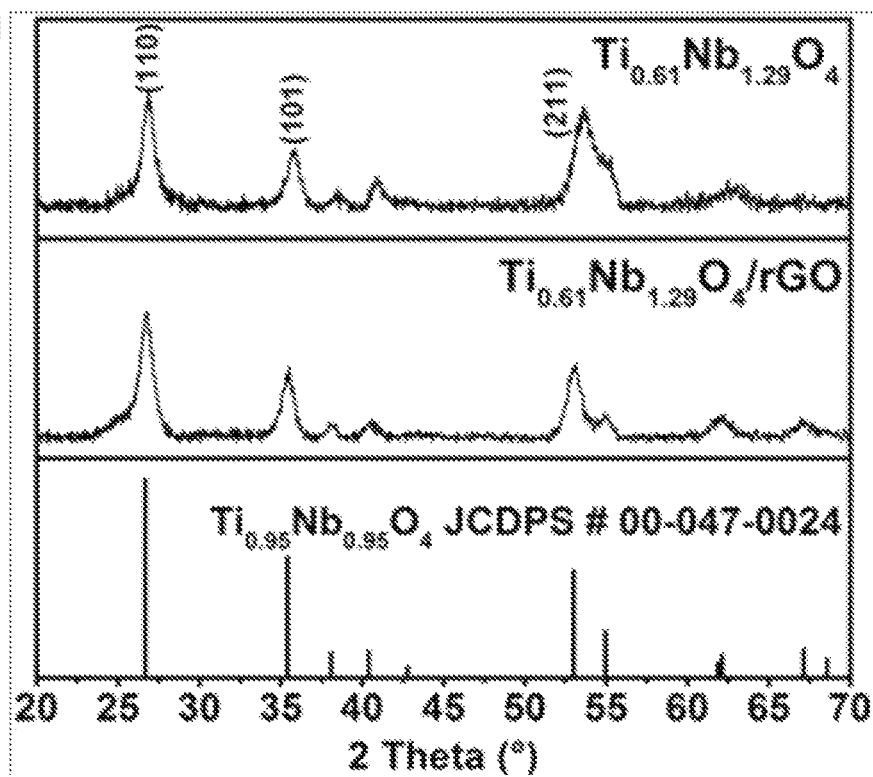

[Fig. 6]
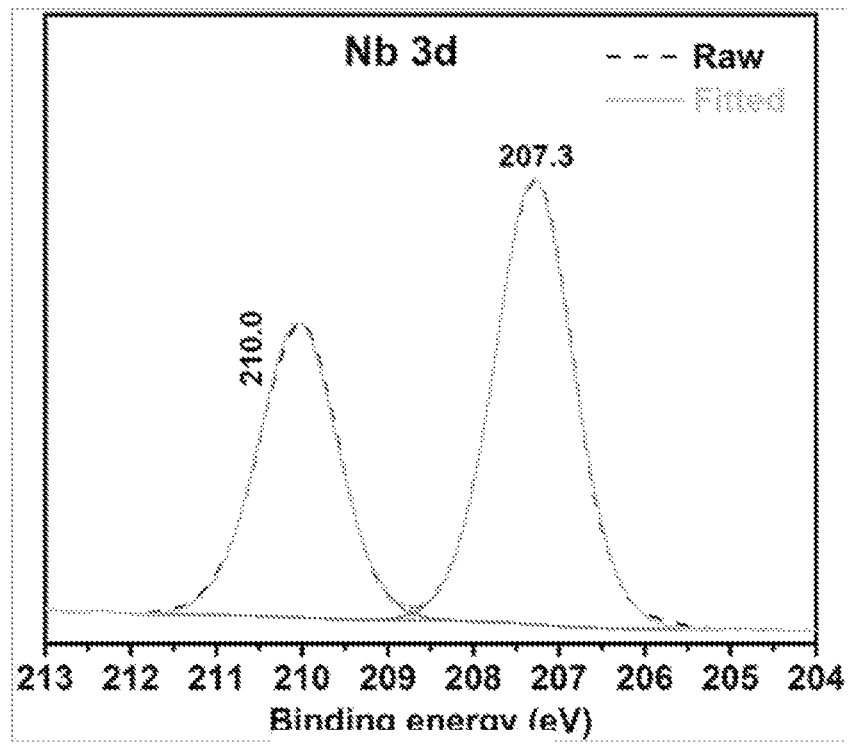
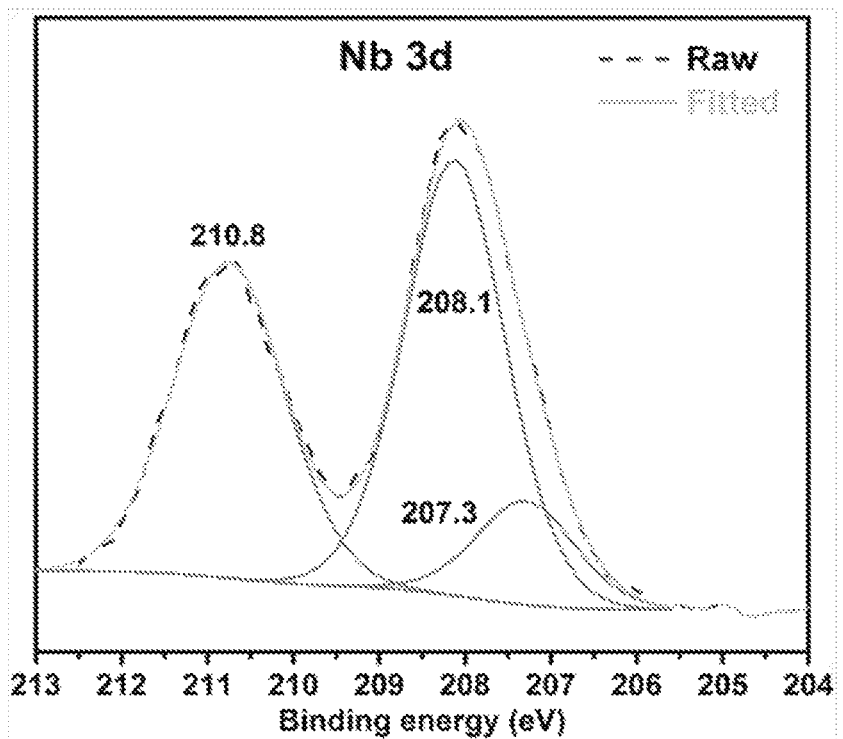

[Fig. 6]
k
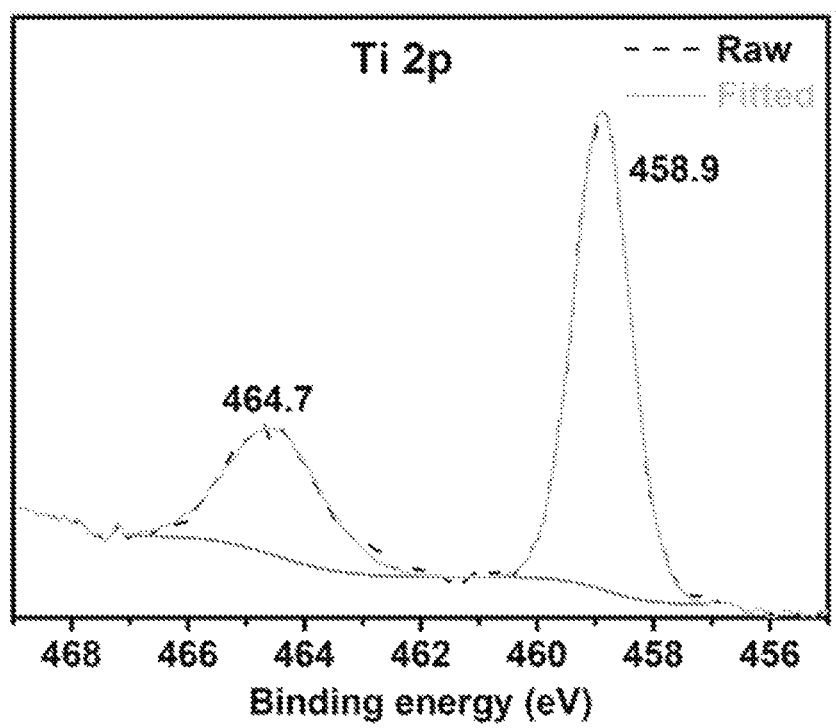
l
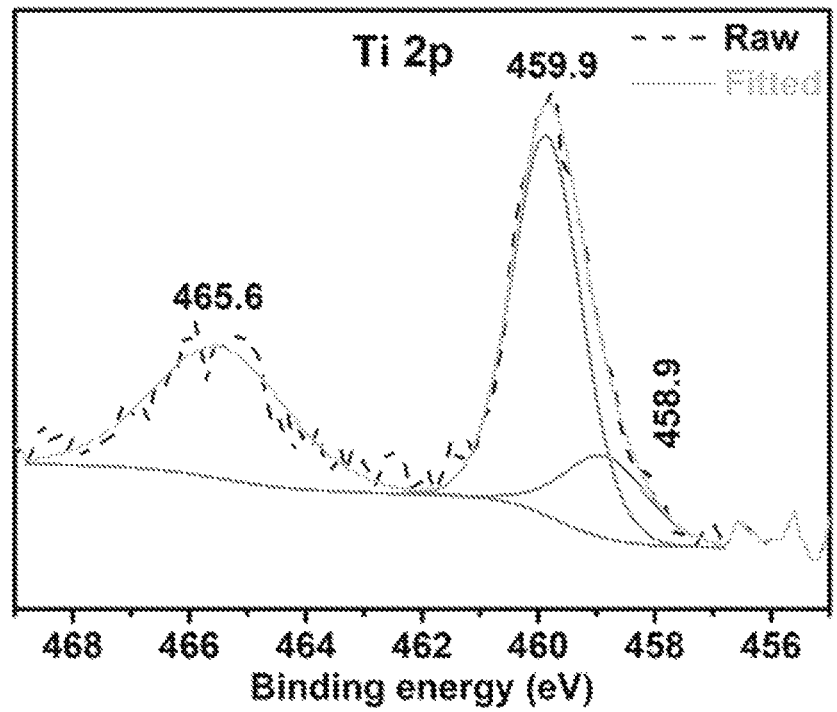

[Fig. 7]
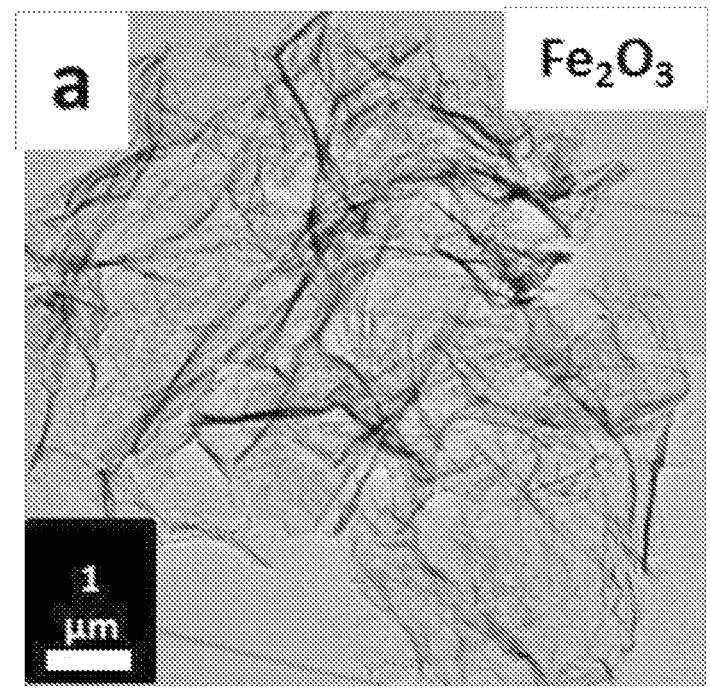
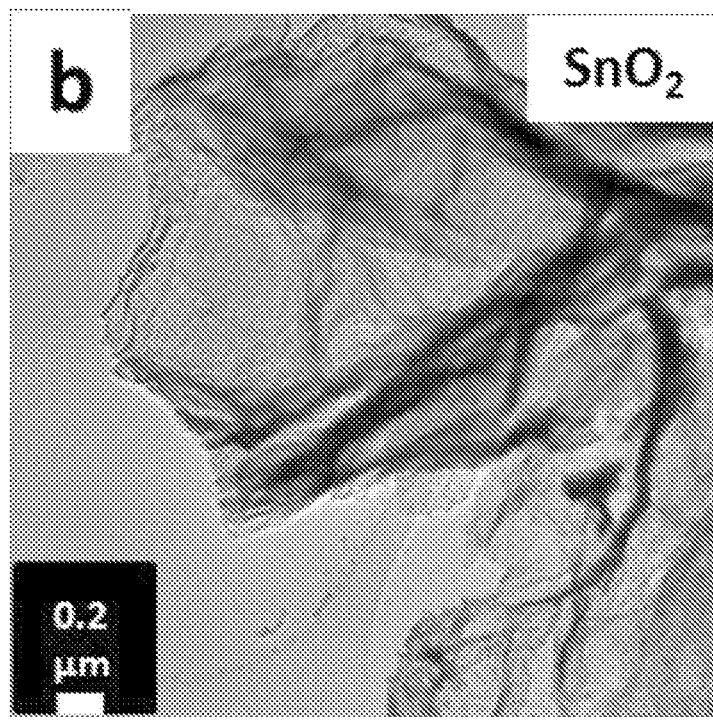

[Fig. 7]
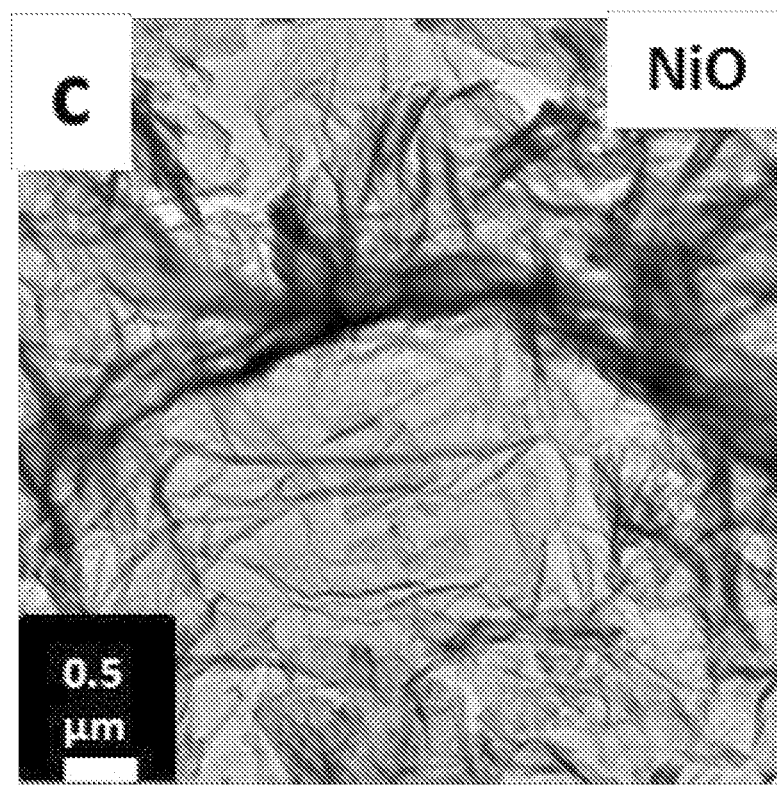
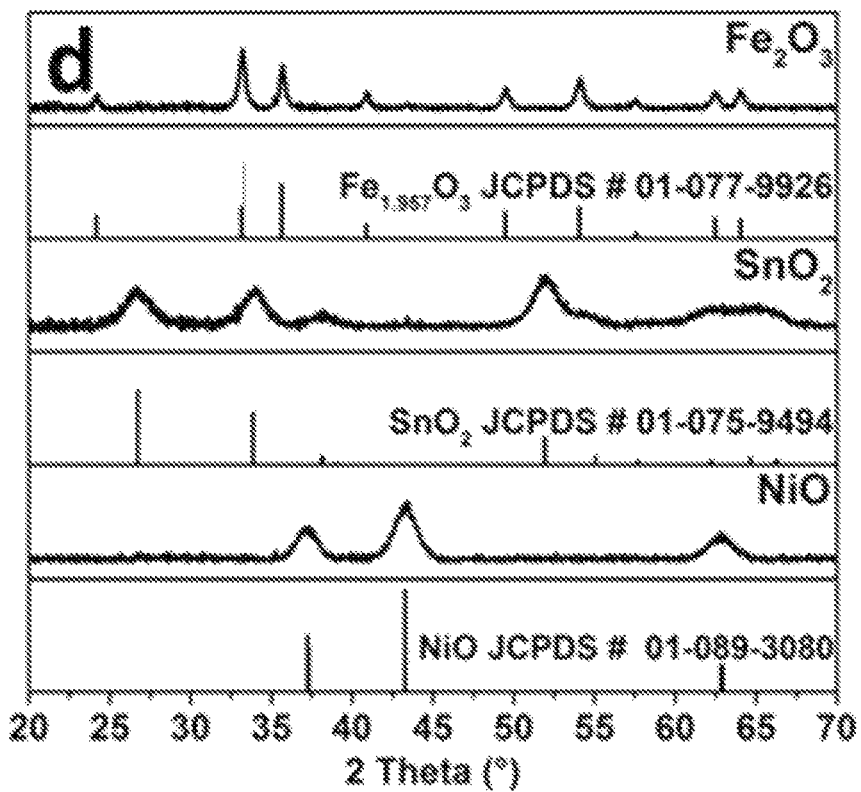

[Fig. 7]
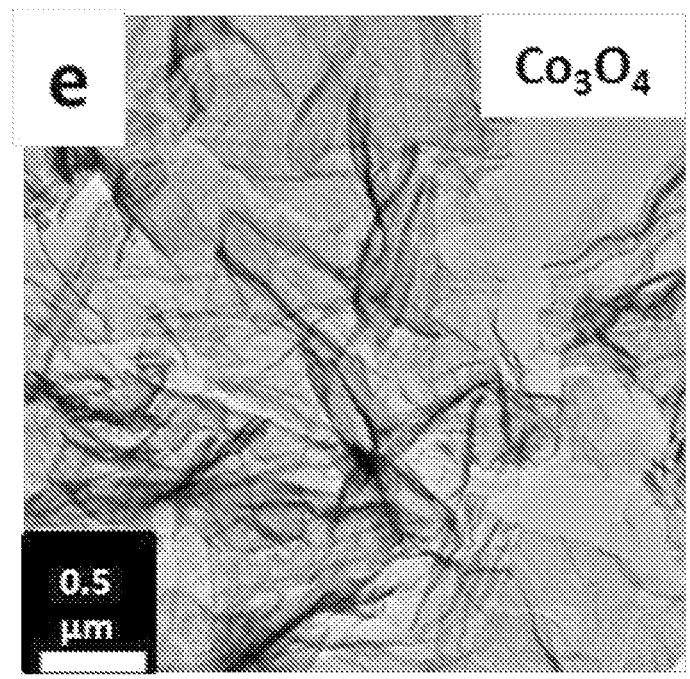
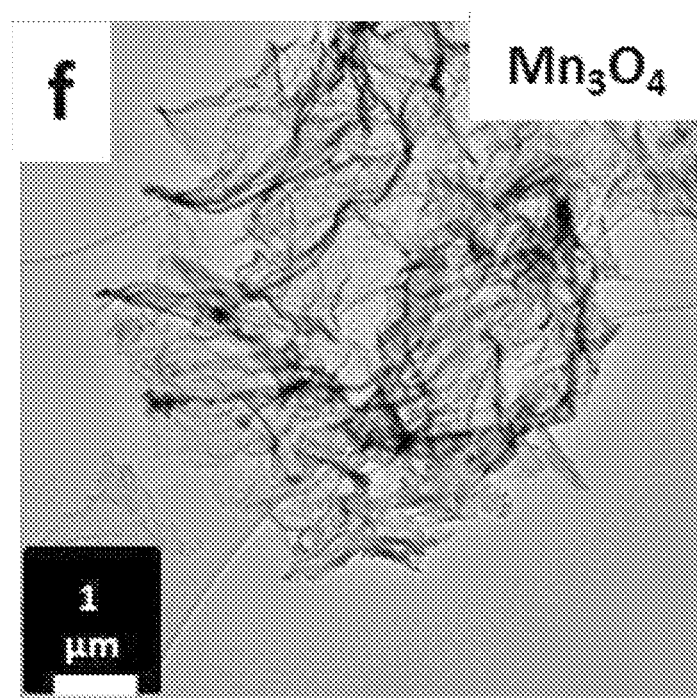

[Fig. 7]
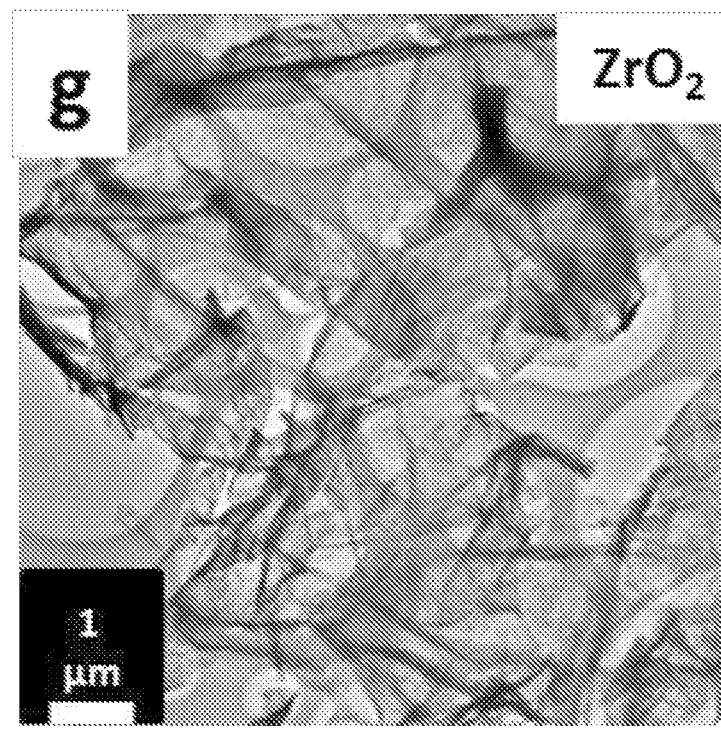
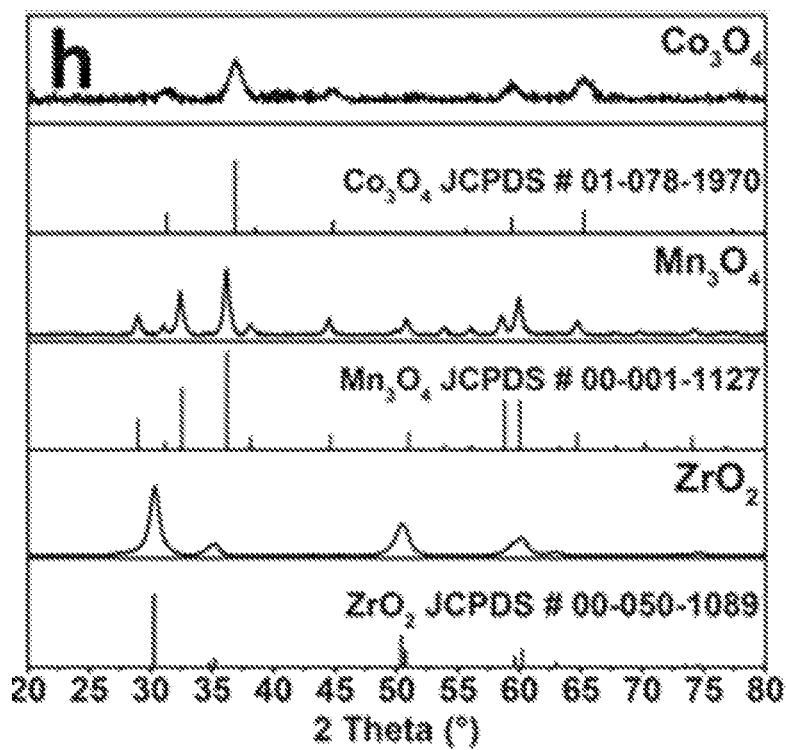

[Fig. 7]
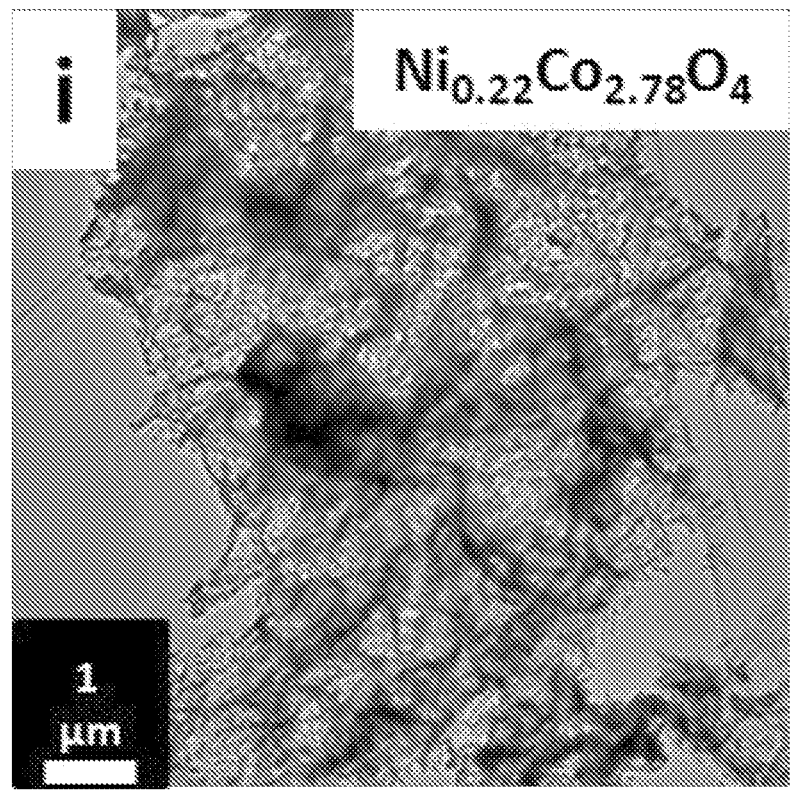
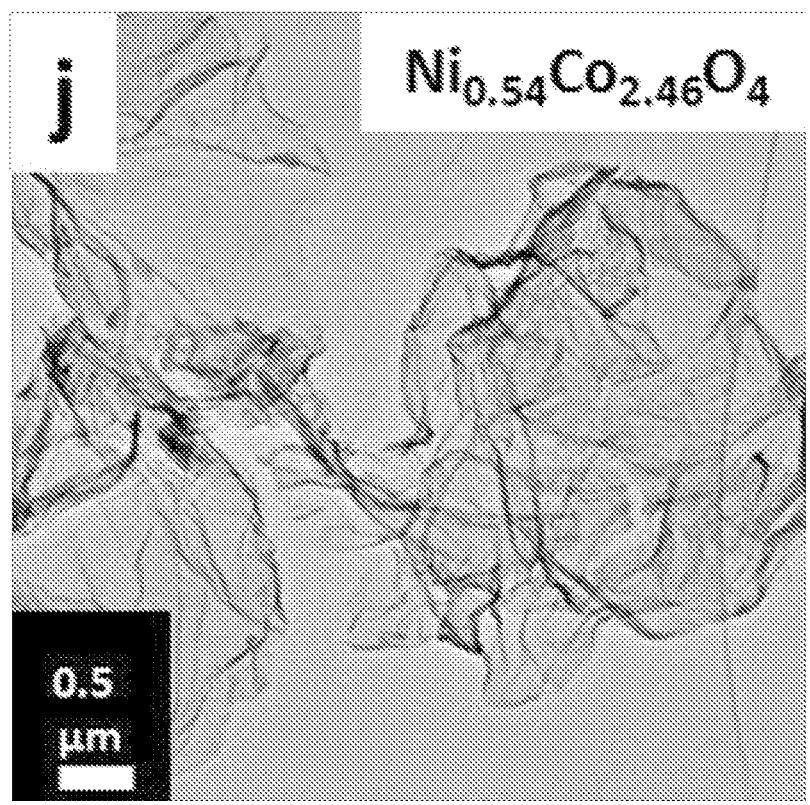

[Fig. 7]
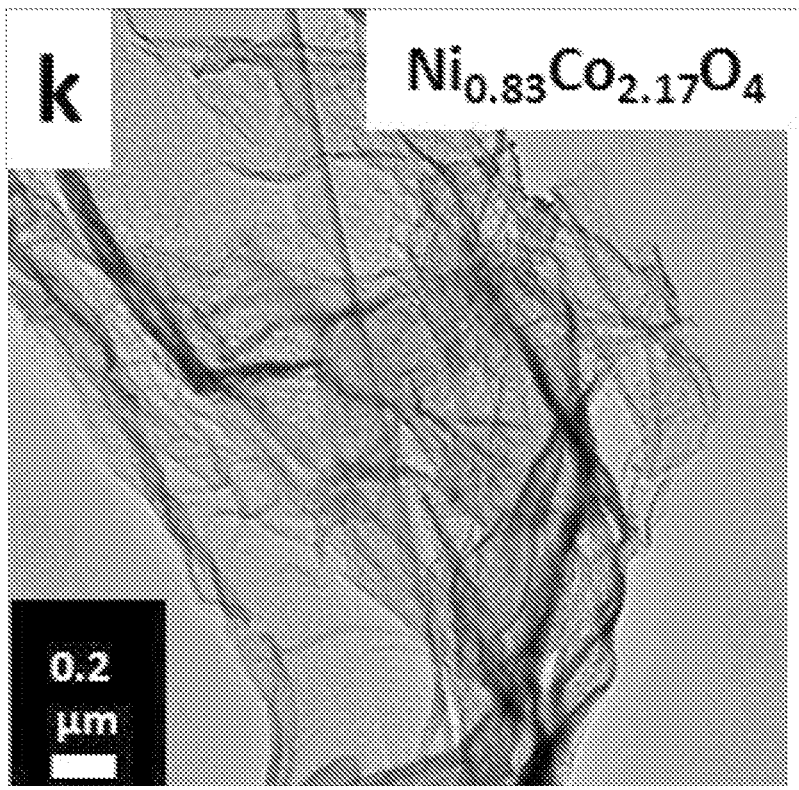
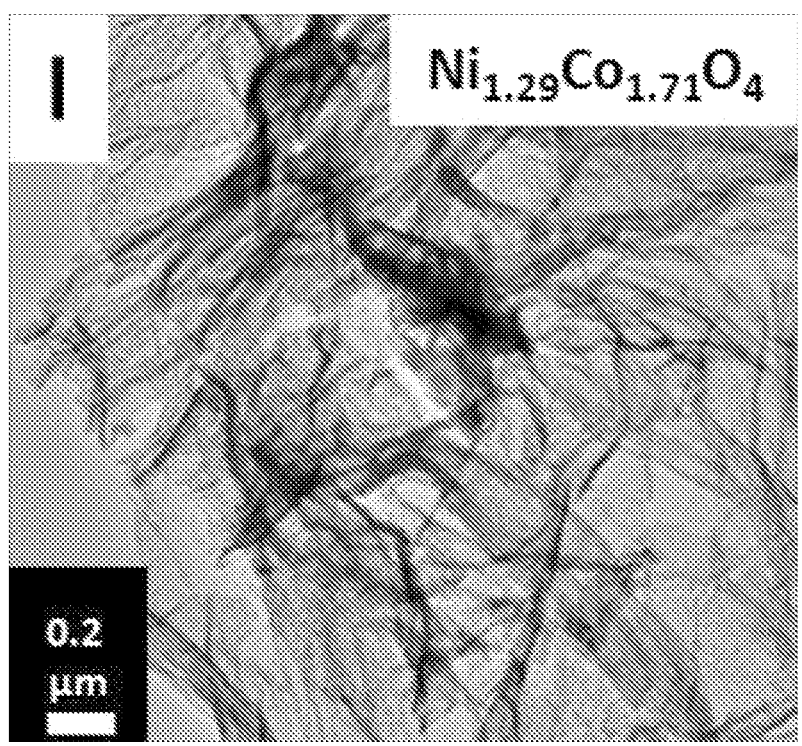

[Fig. 7]
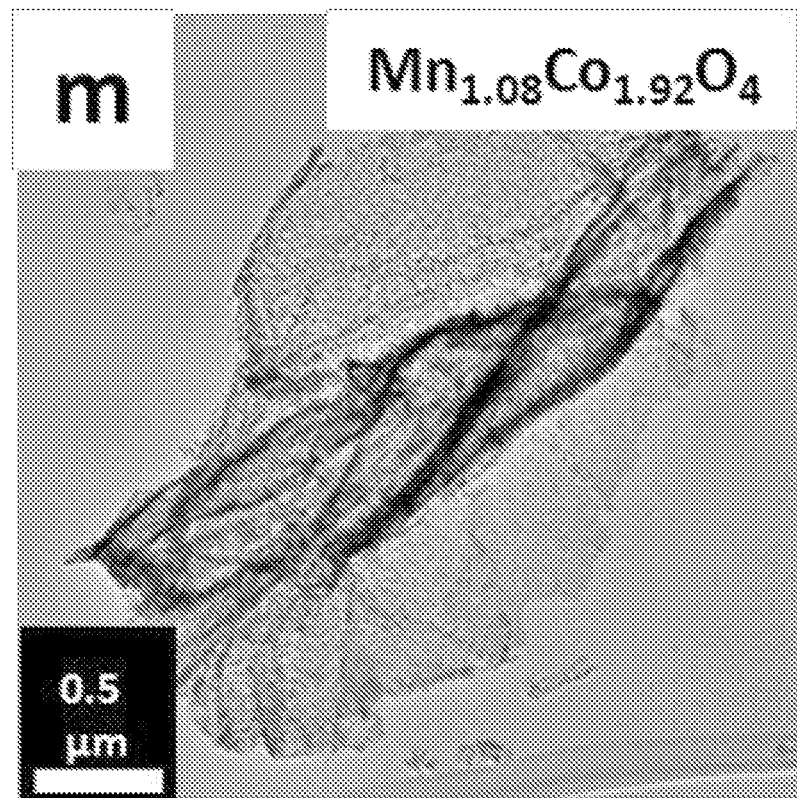
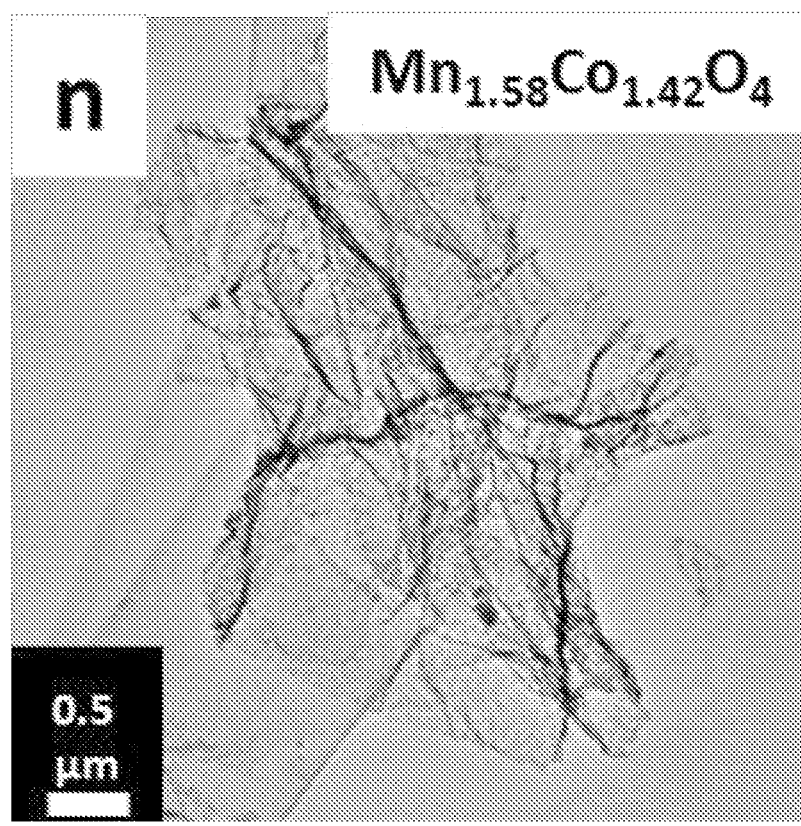

[Fig. 7]
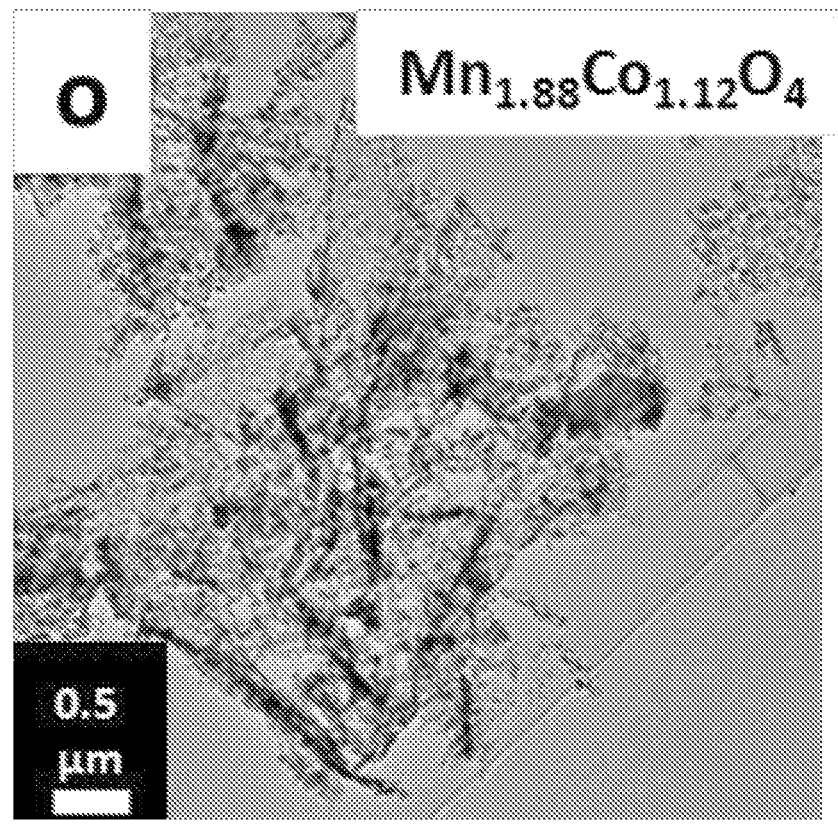
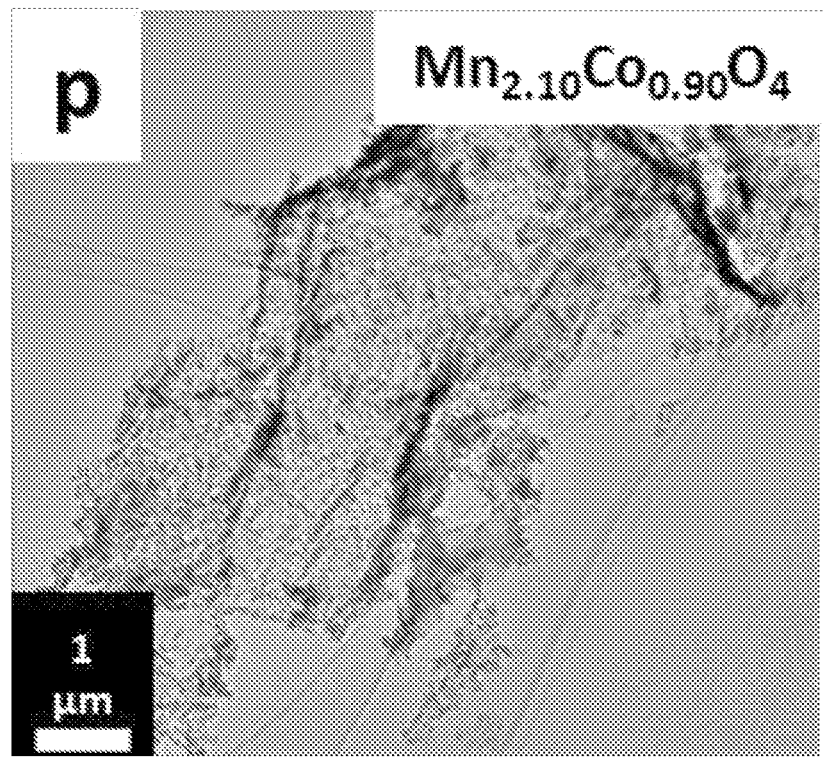

[Fig. 7]
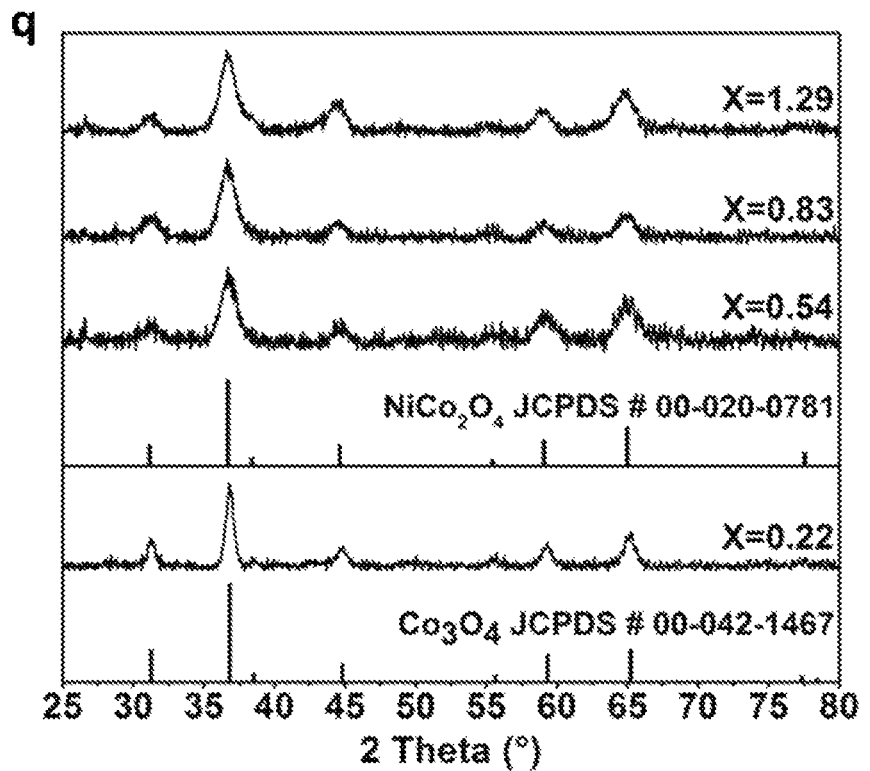
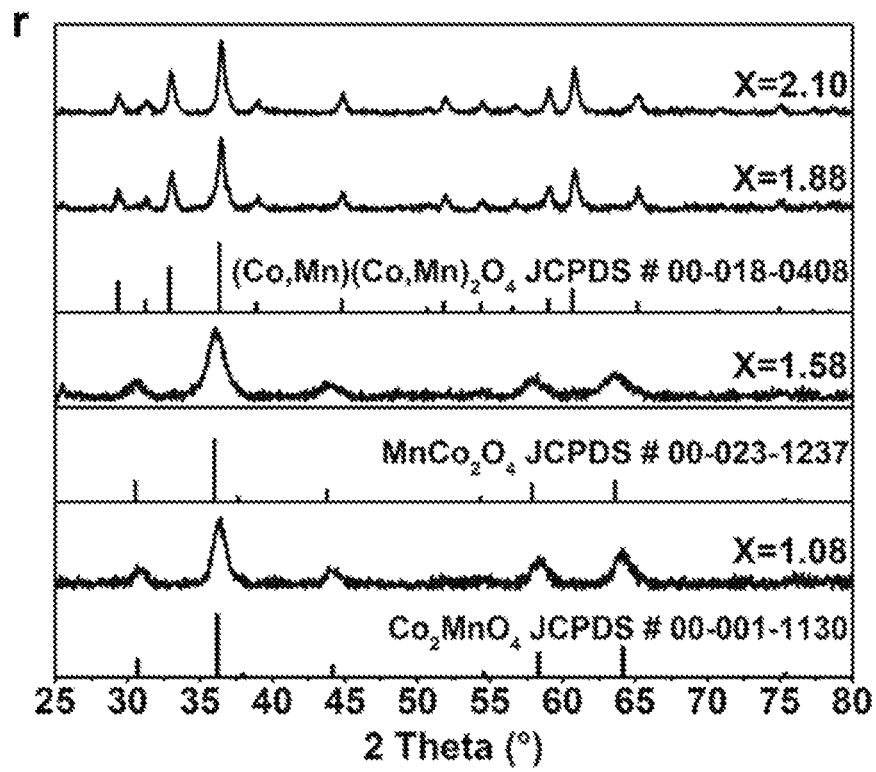

[Fig. 8]
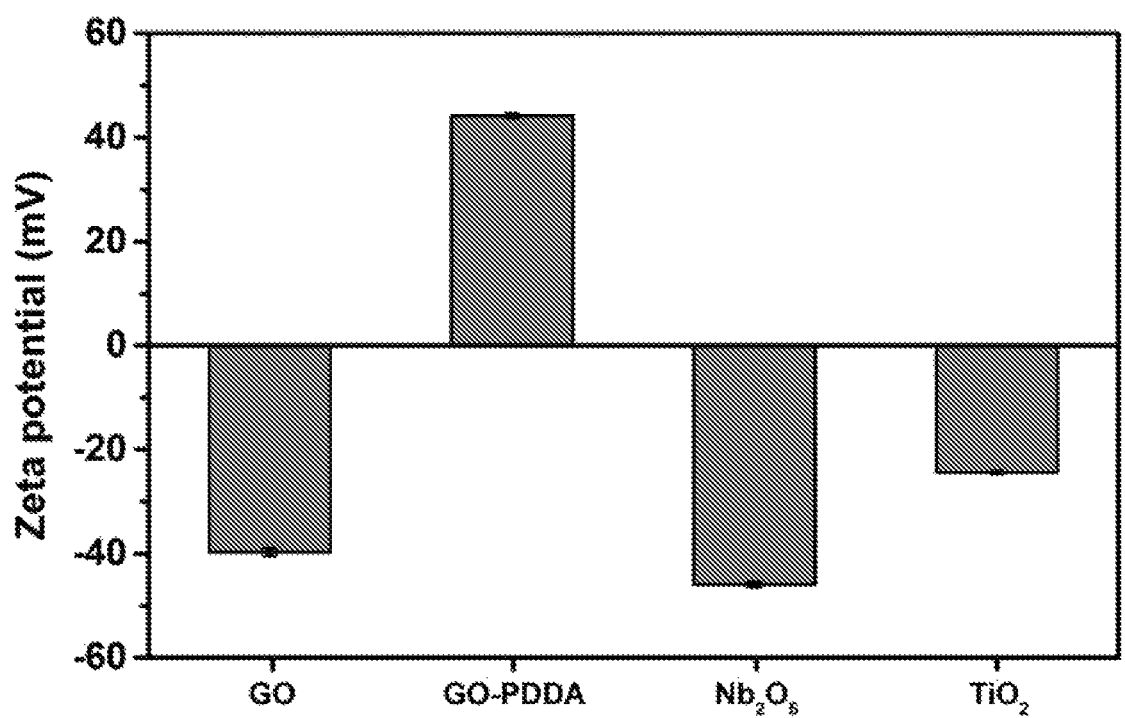

[Fig. 9]
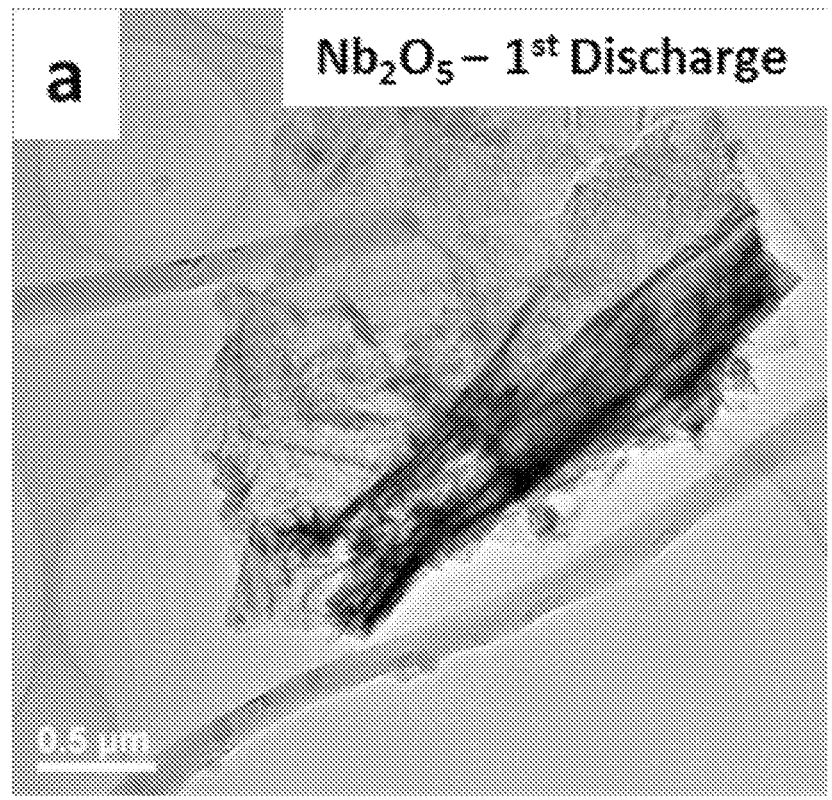
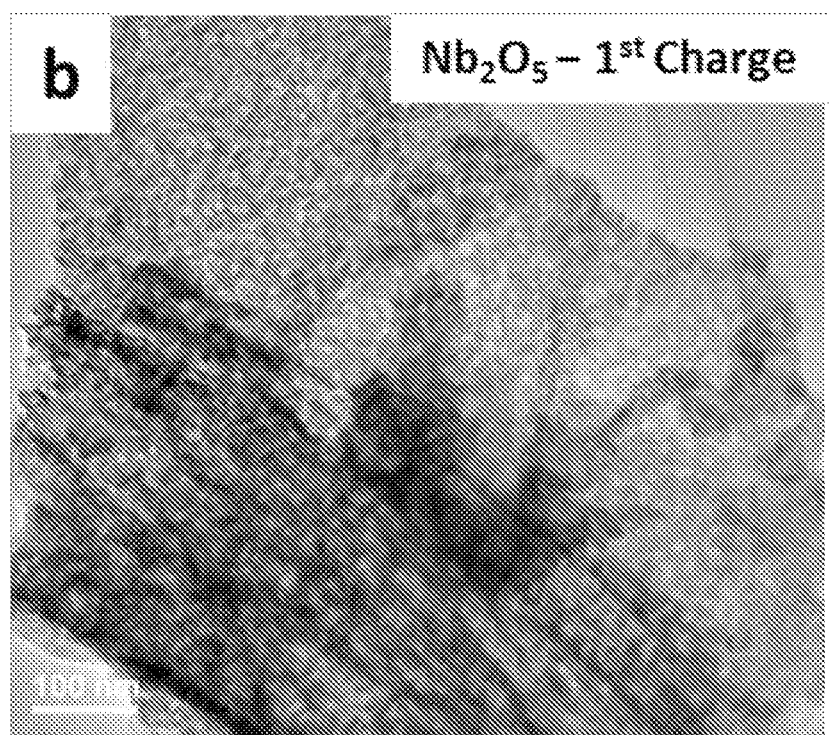

[Fig. 9]
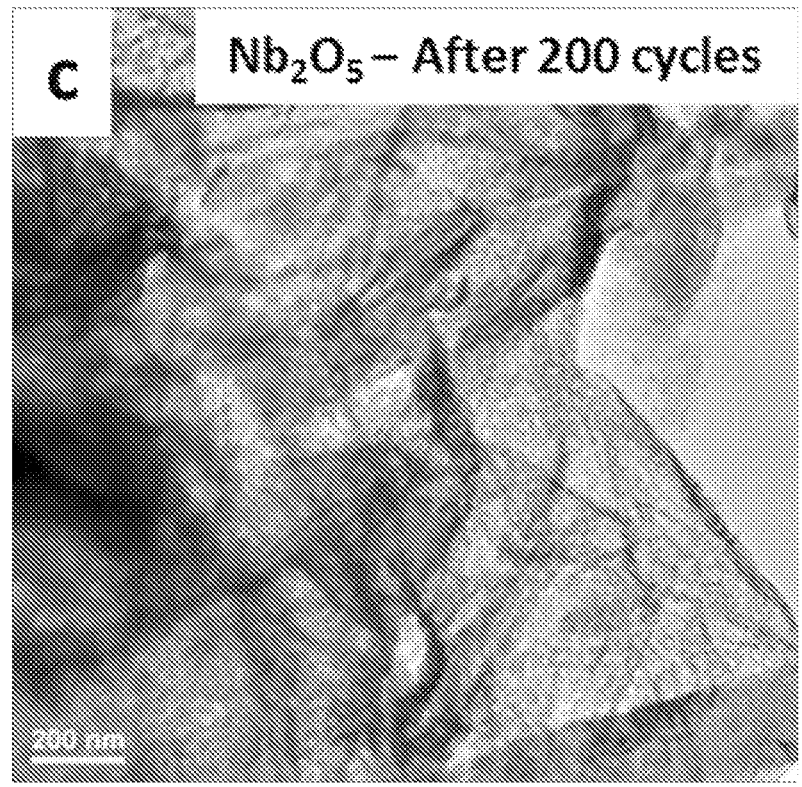
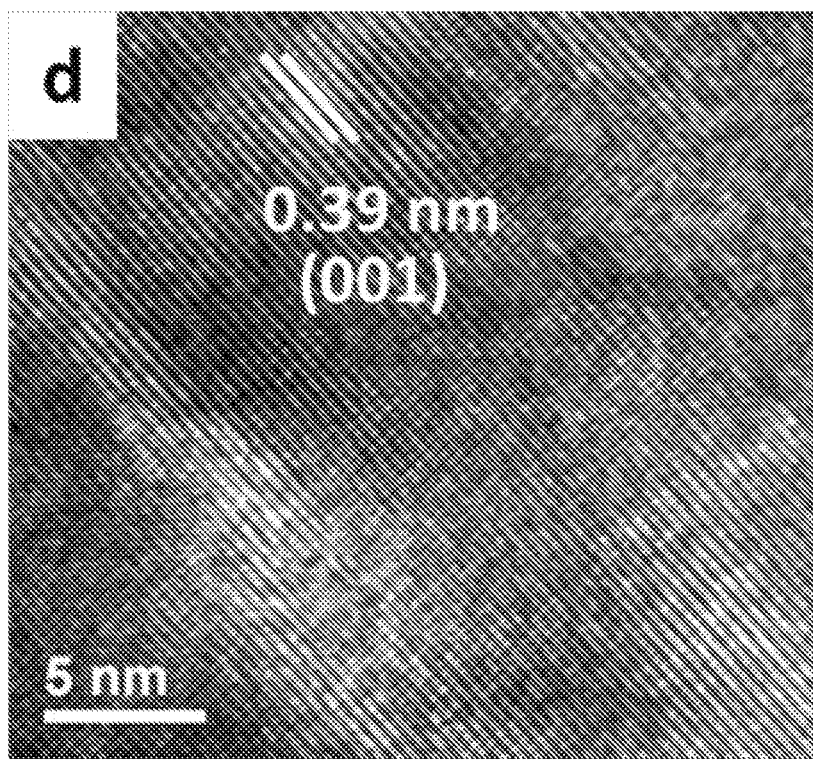

[Fig. 9]
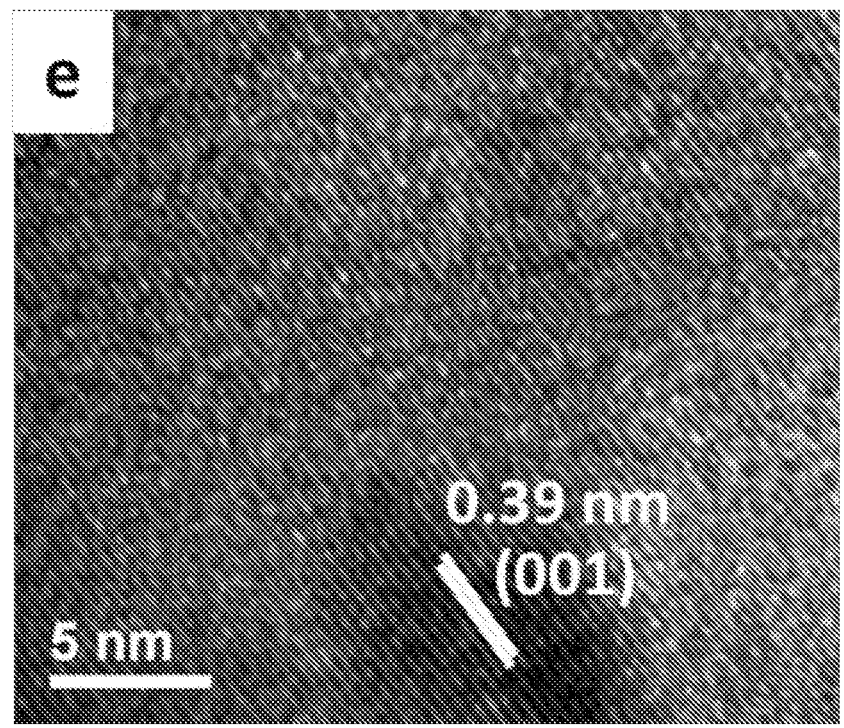
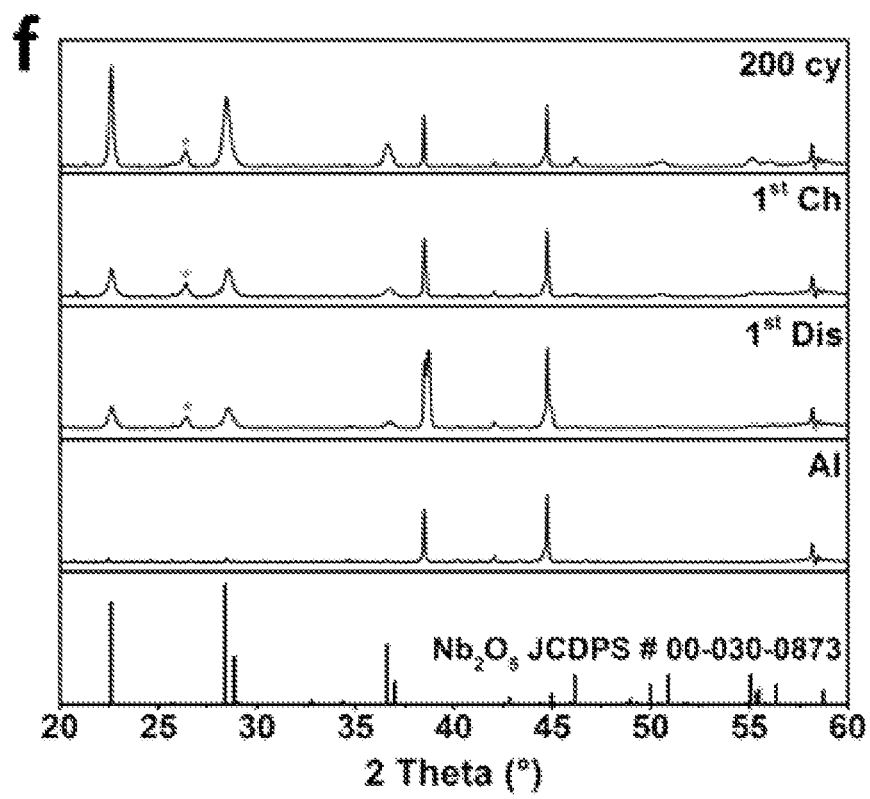

[Fig. 9]
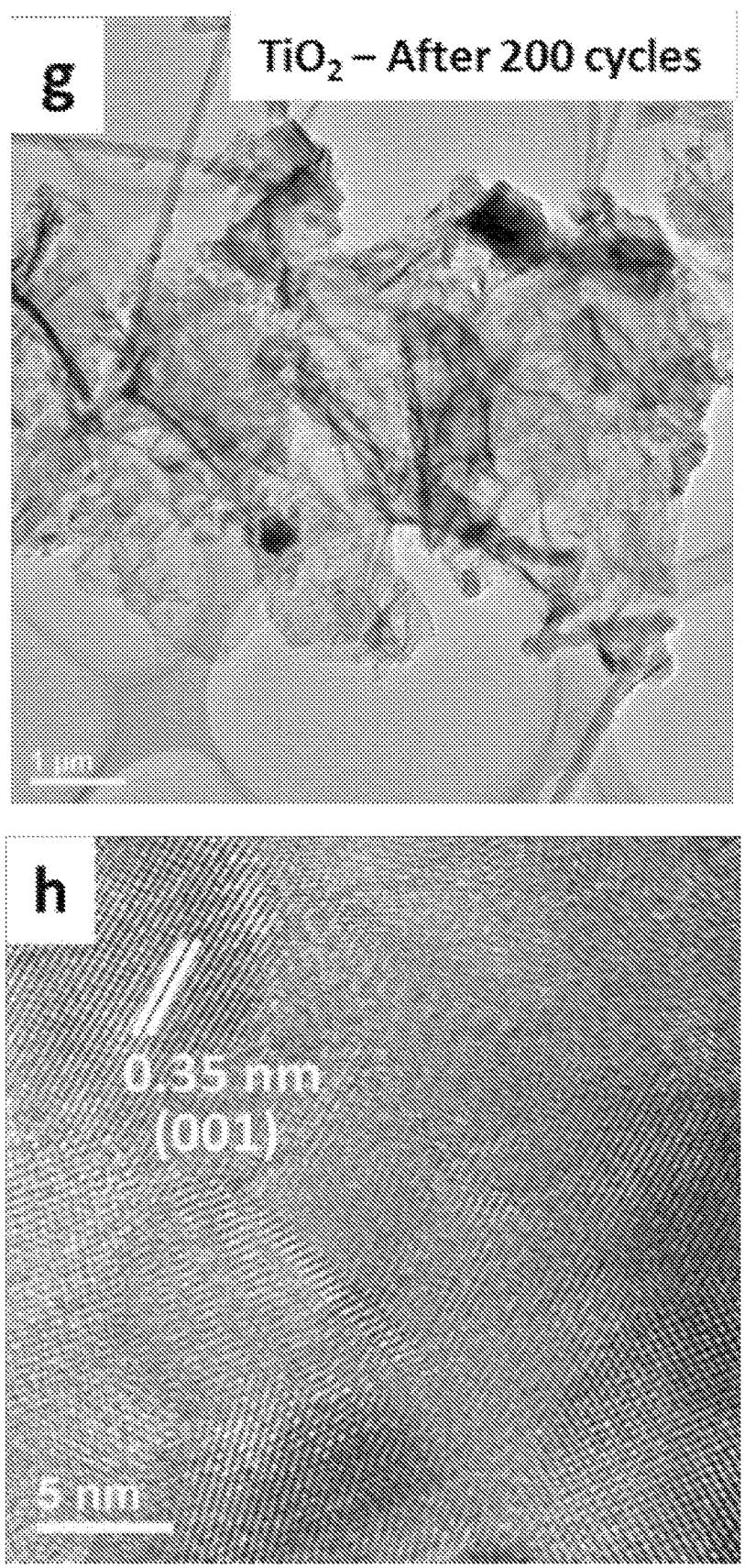

[Fig. 9]
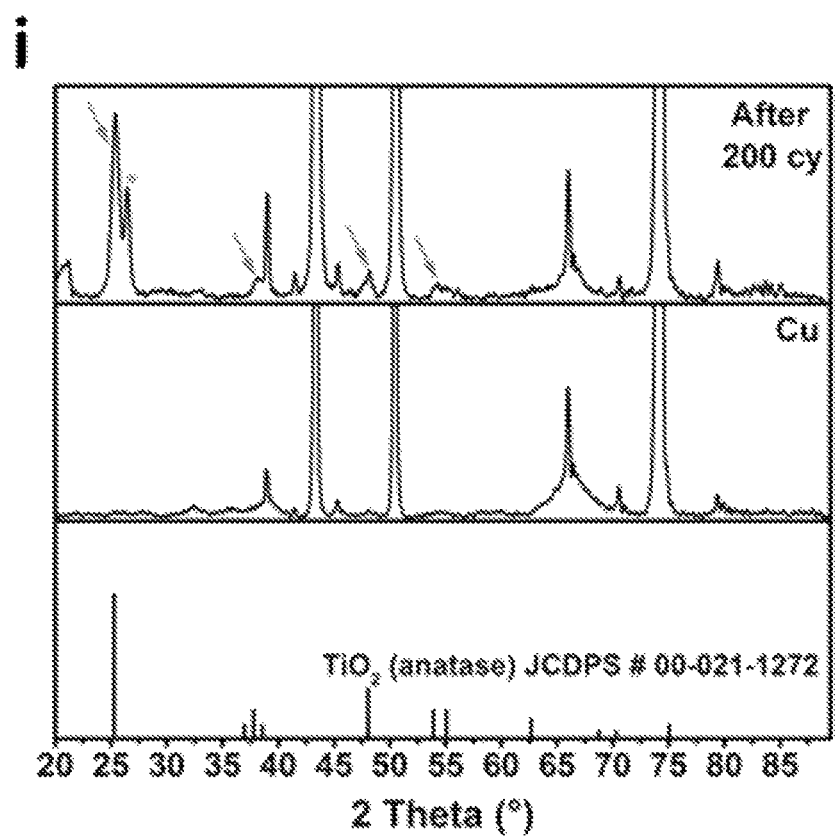

[Fig. 10]
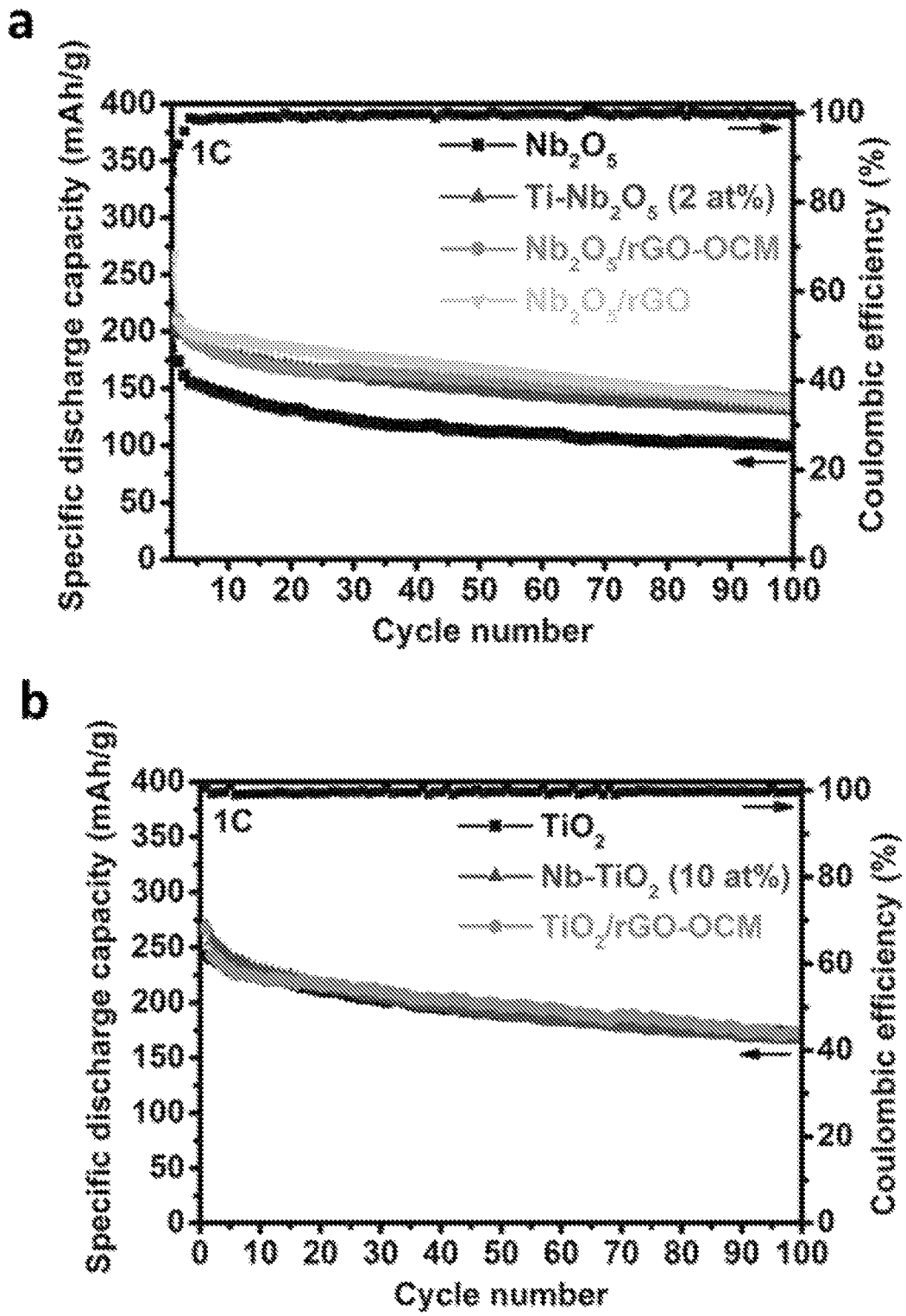

[Fig. 10]
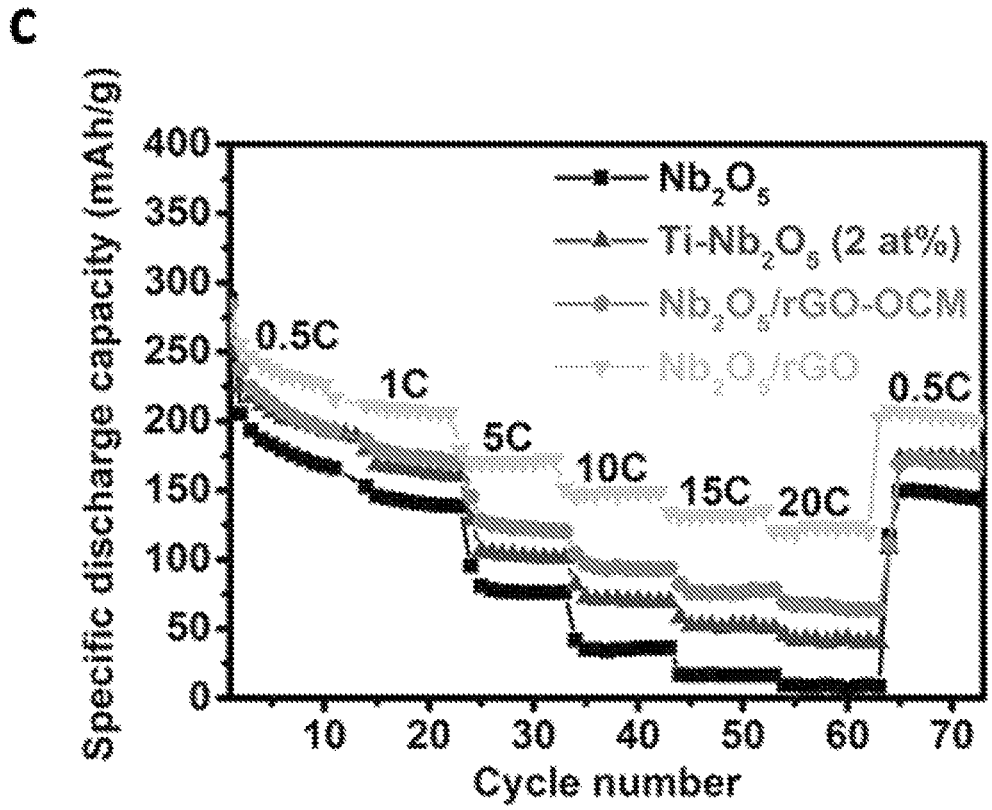
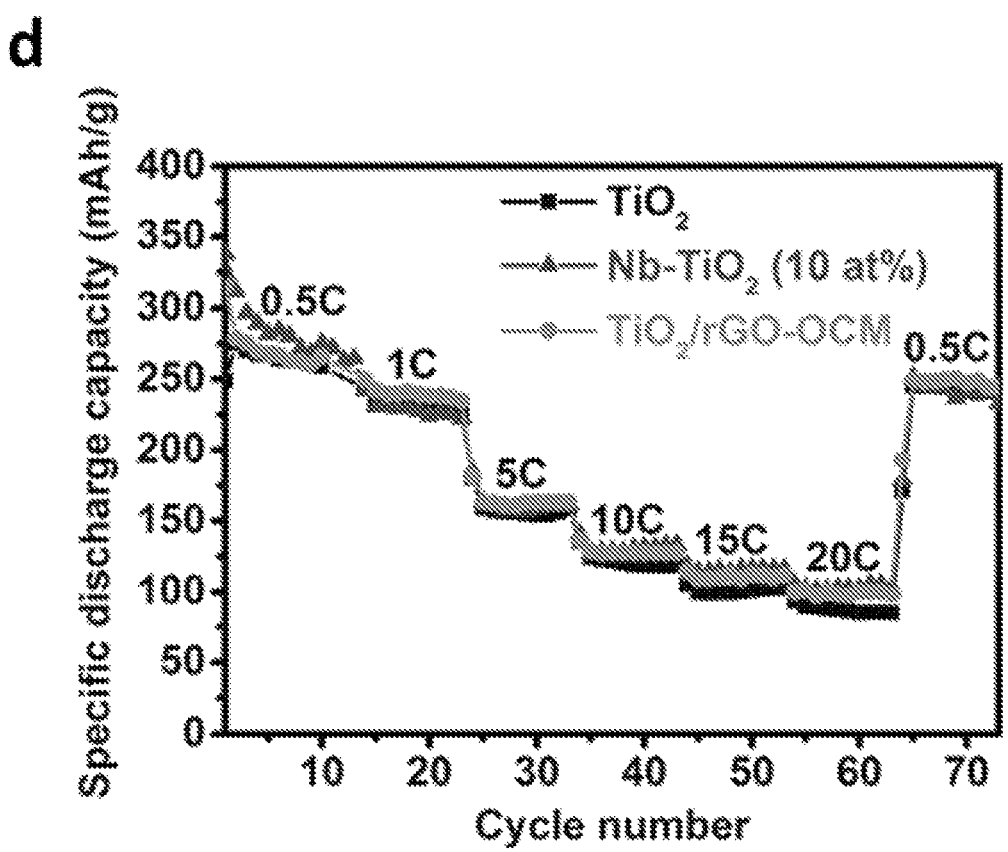

[Fig. 10]
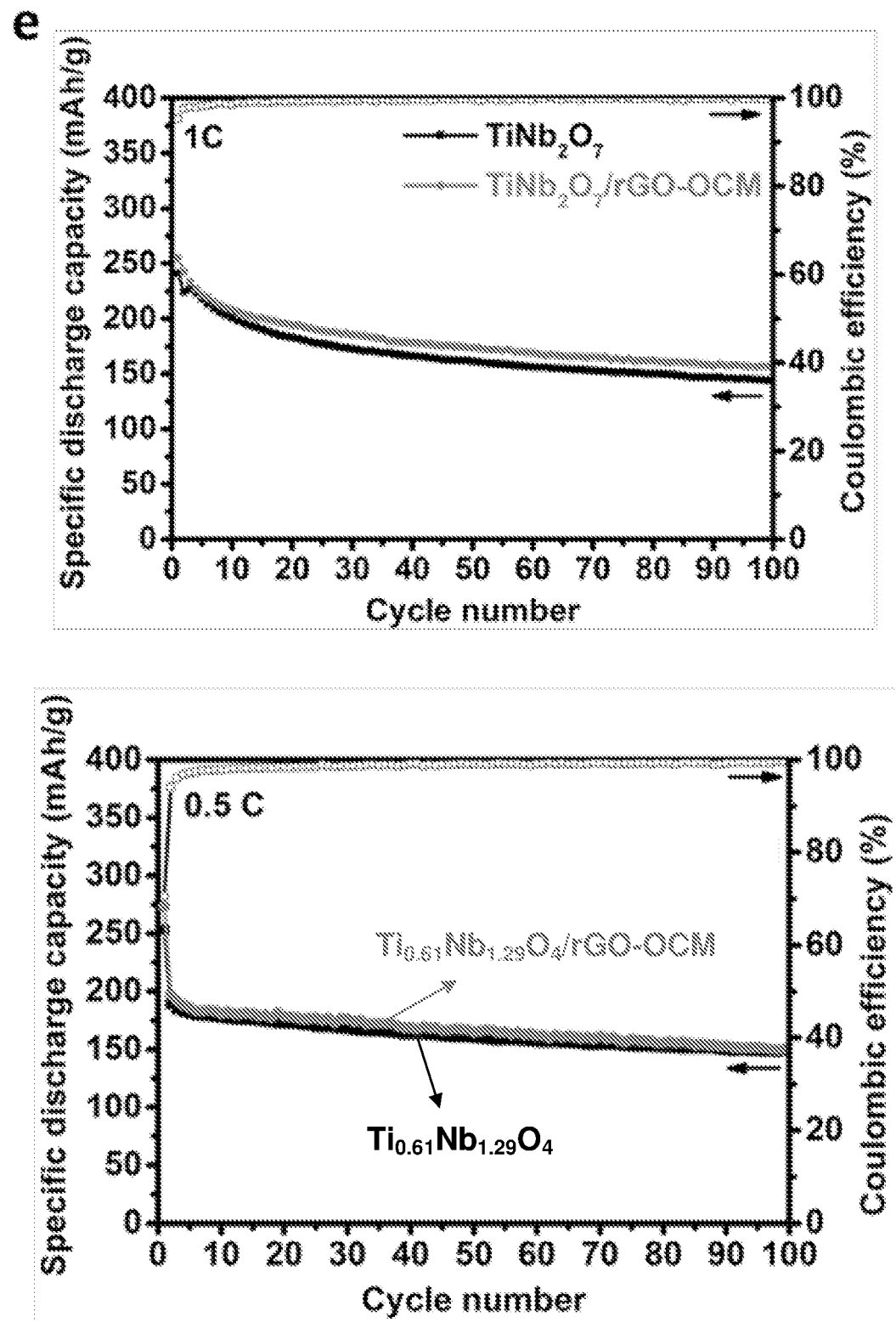

[Fig. 10]
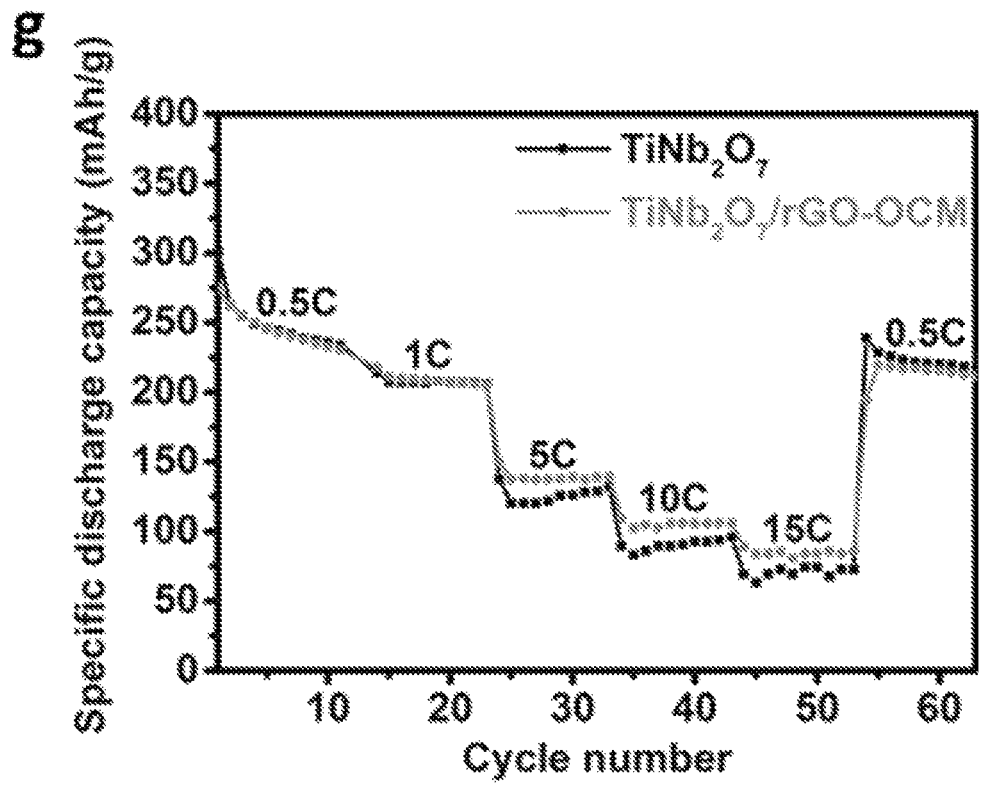
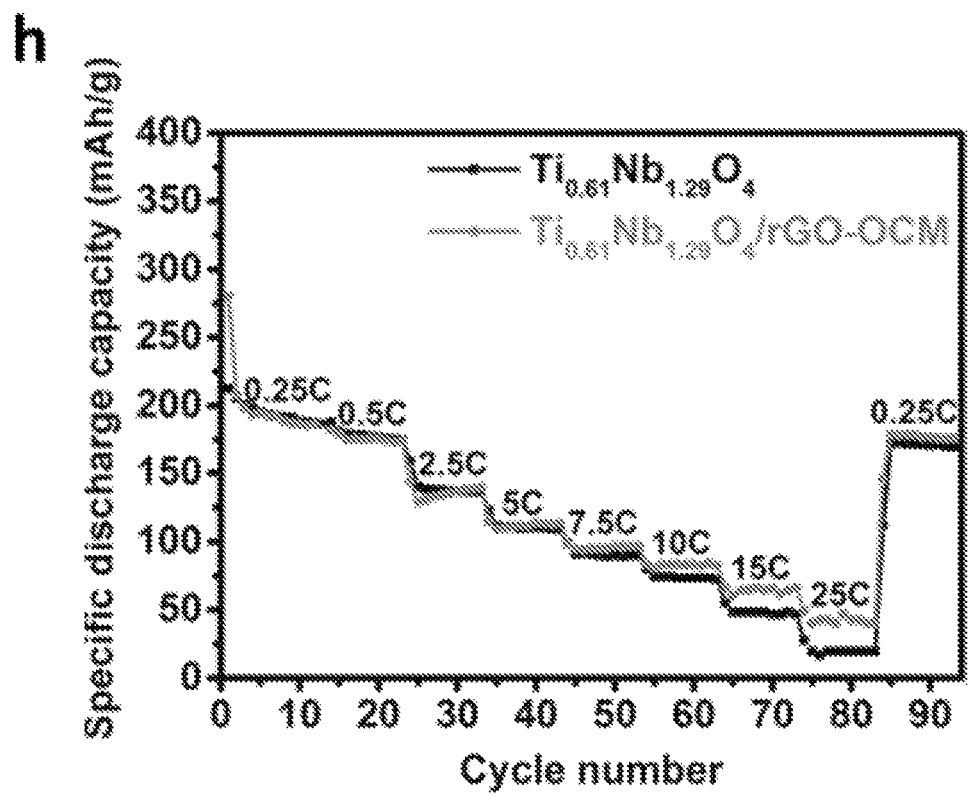

[Fig. 11]
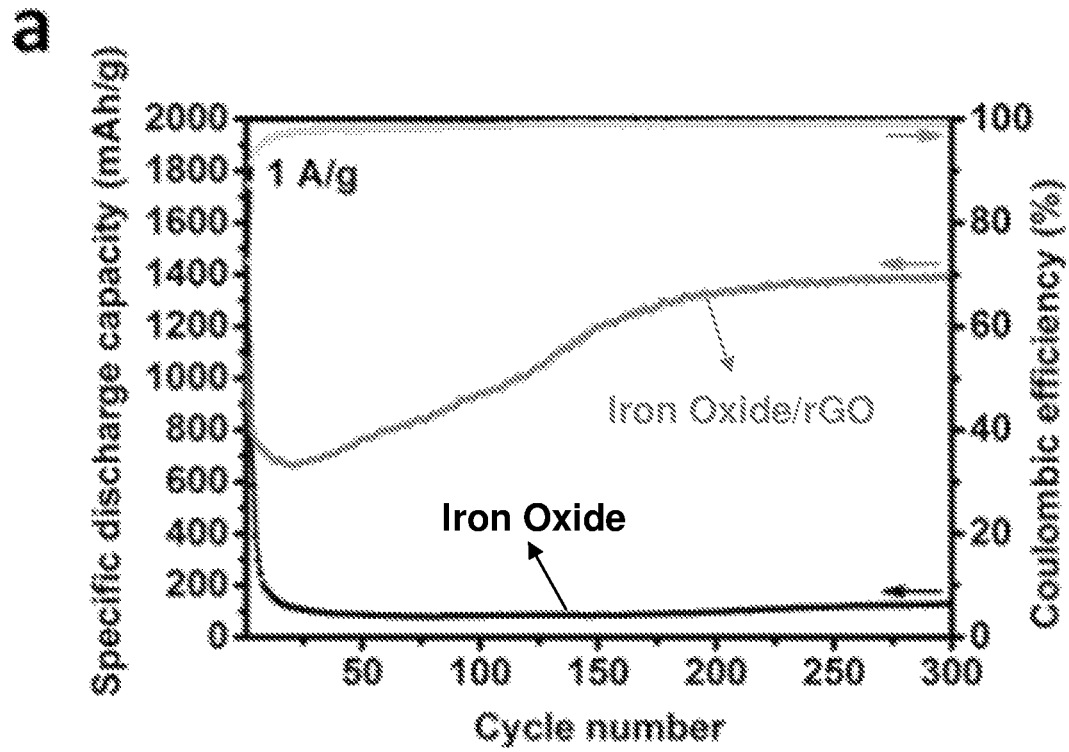
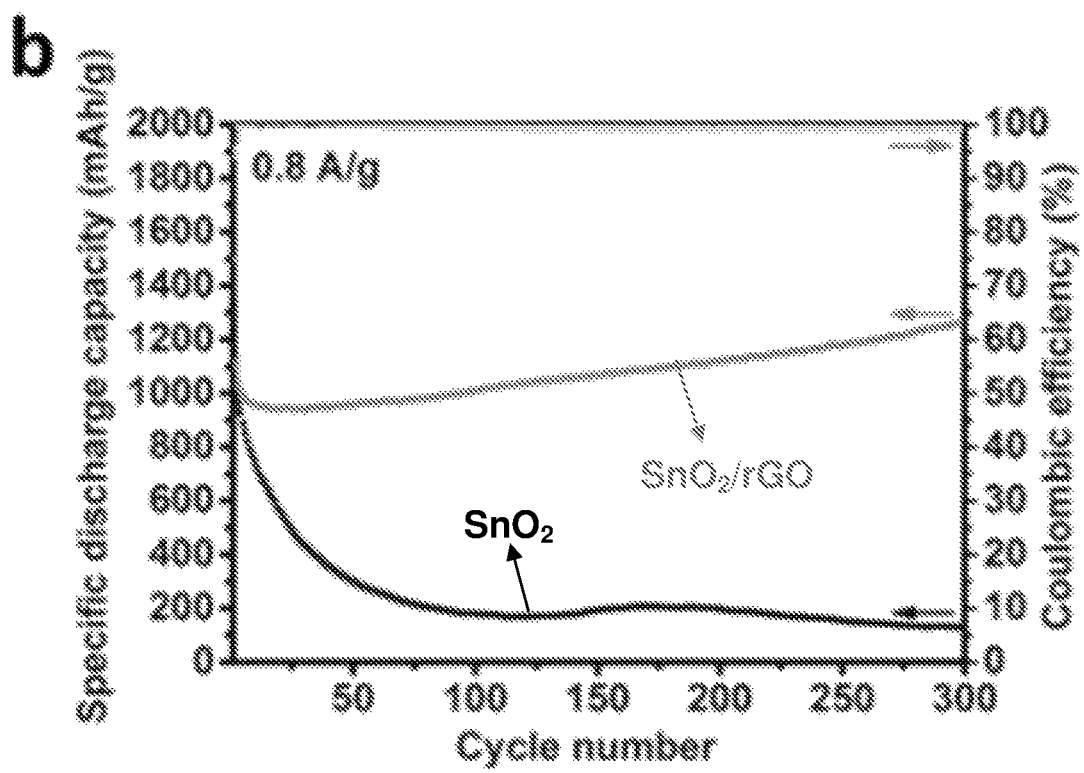

[Fig. 11]
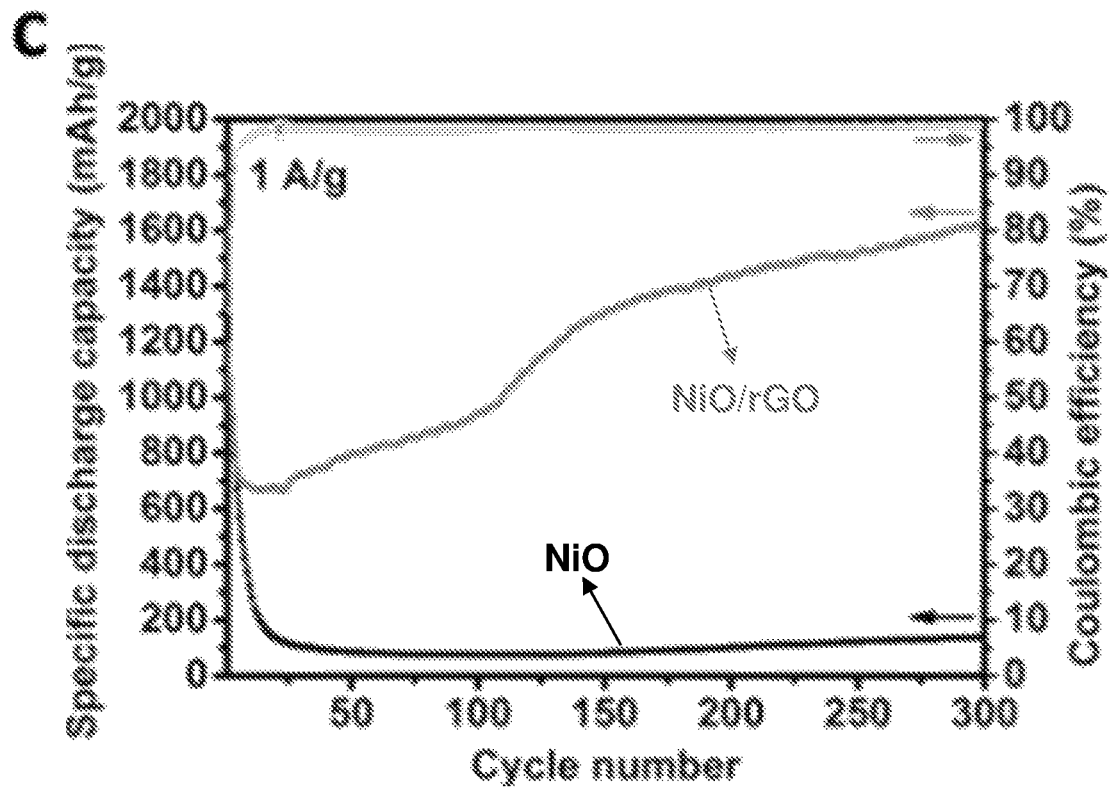
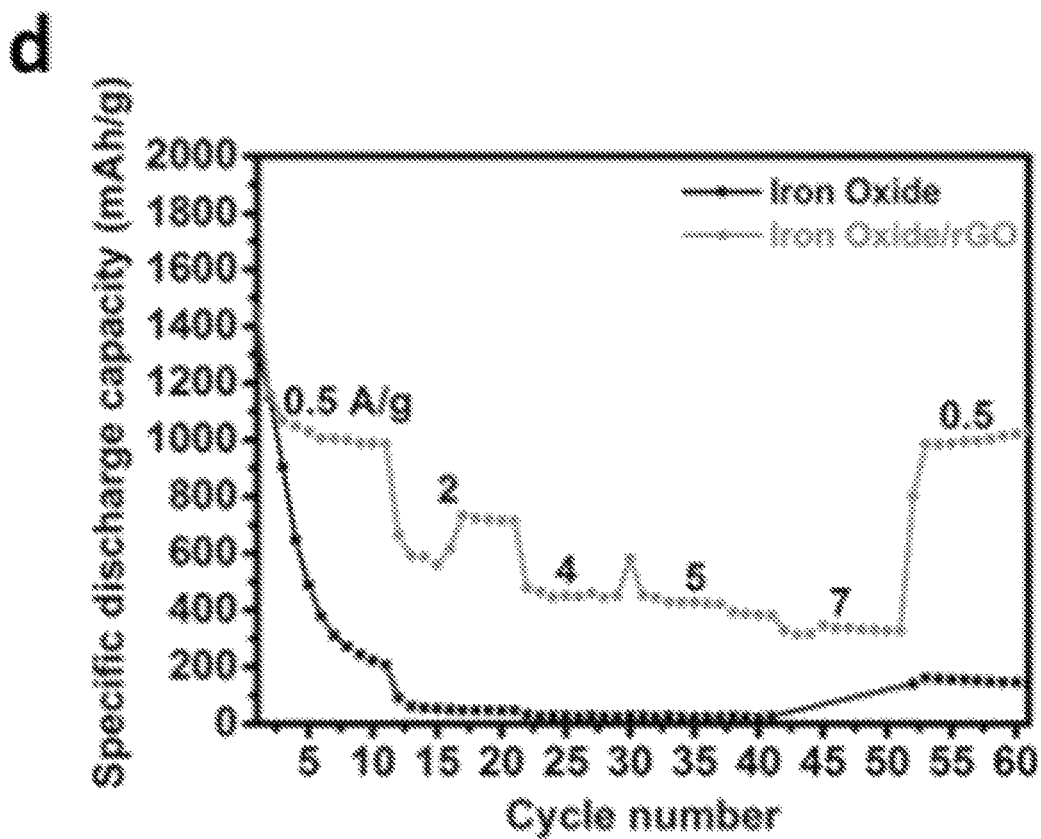

[Fig. 11]
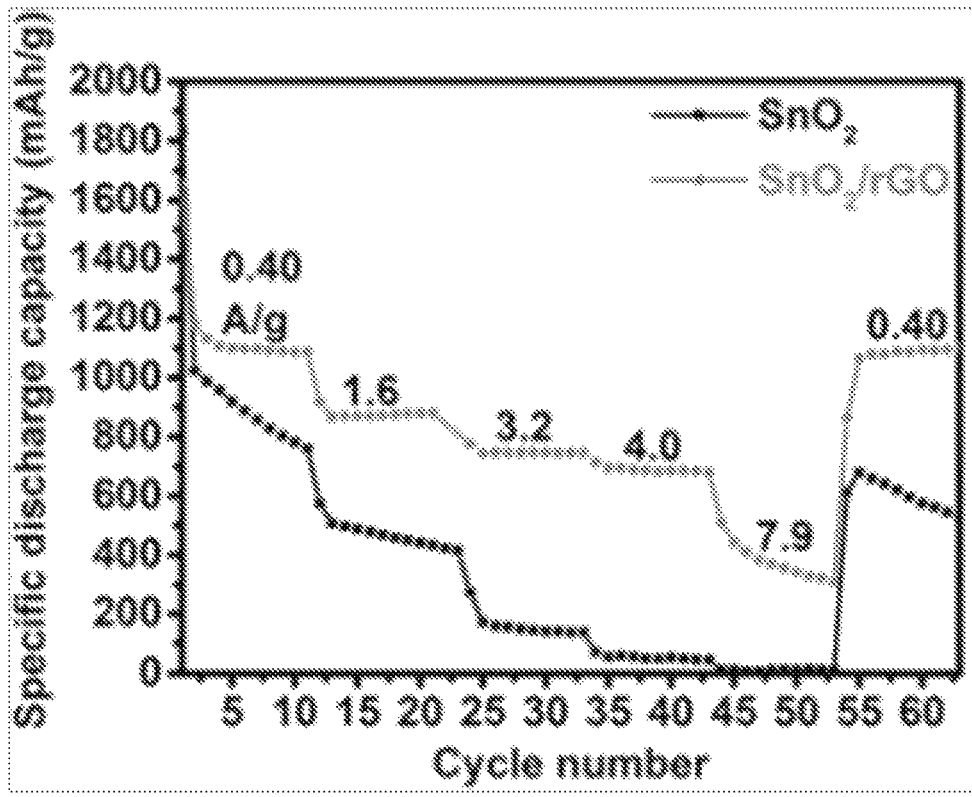
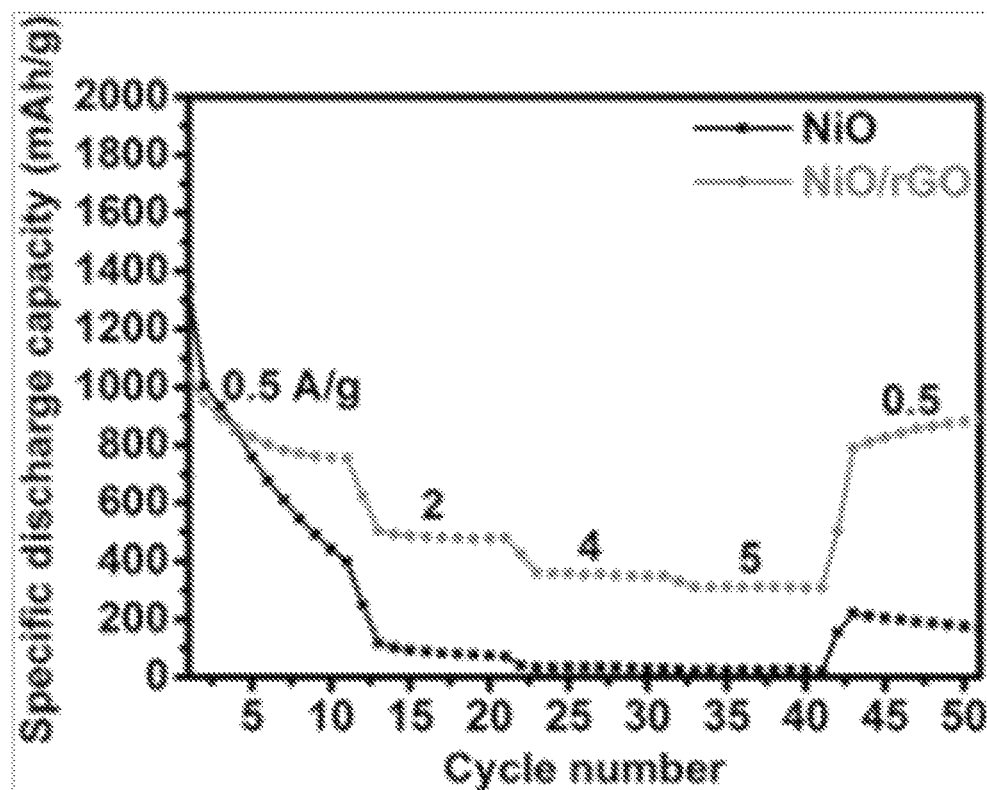

[Fig. 11]
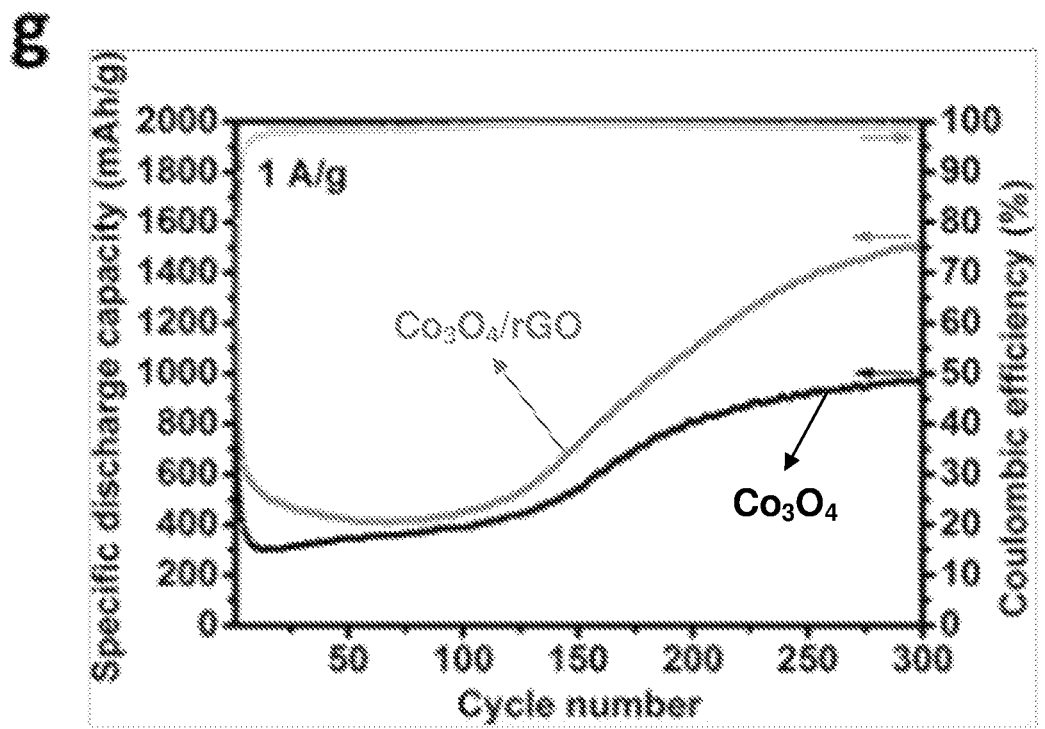
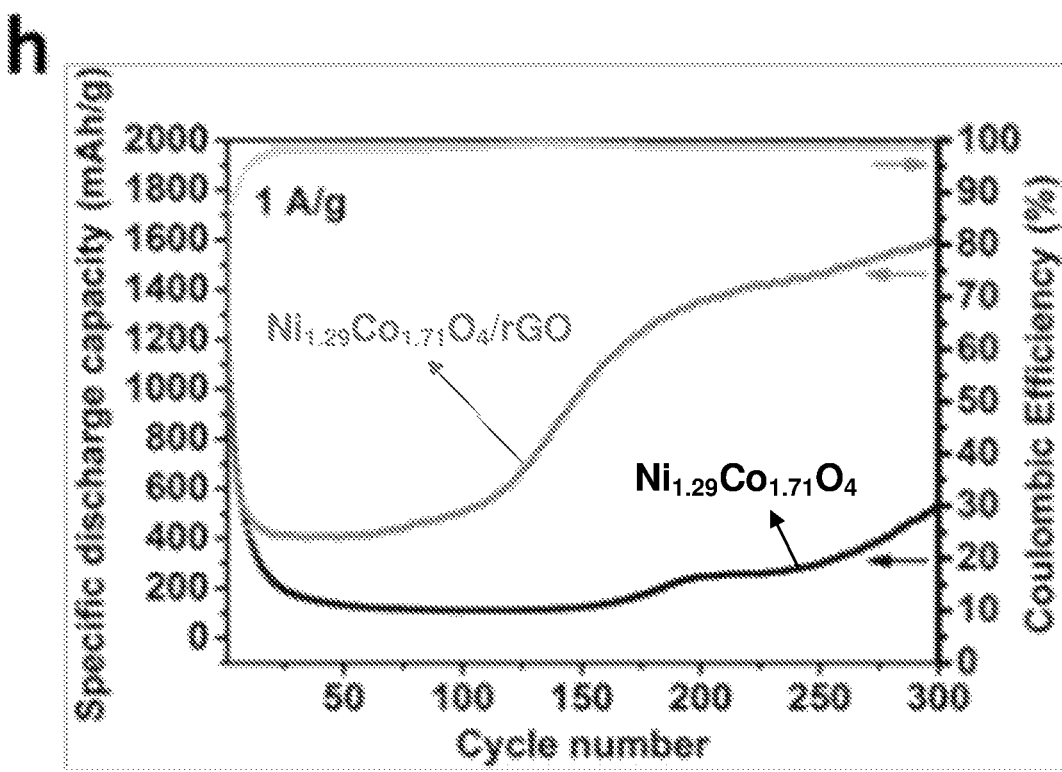

[Fig. 11]
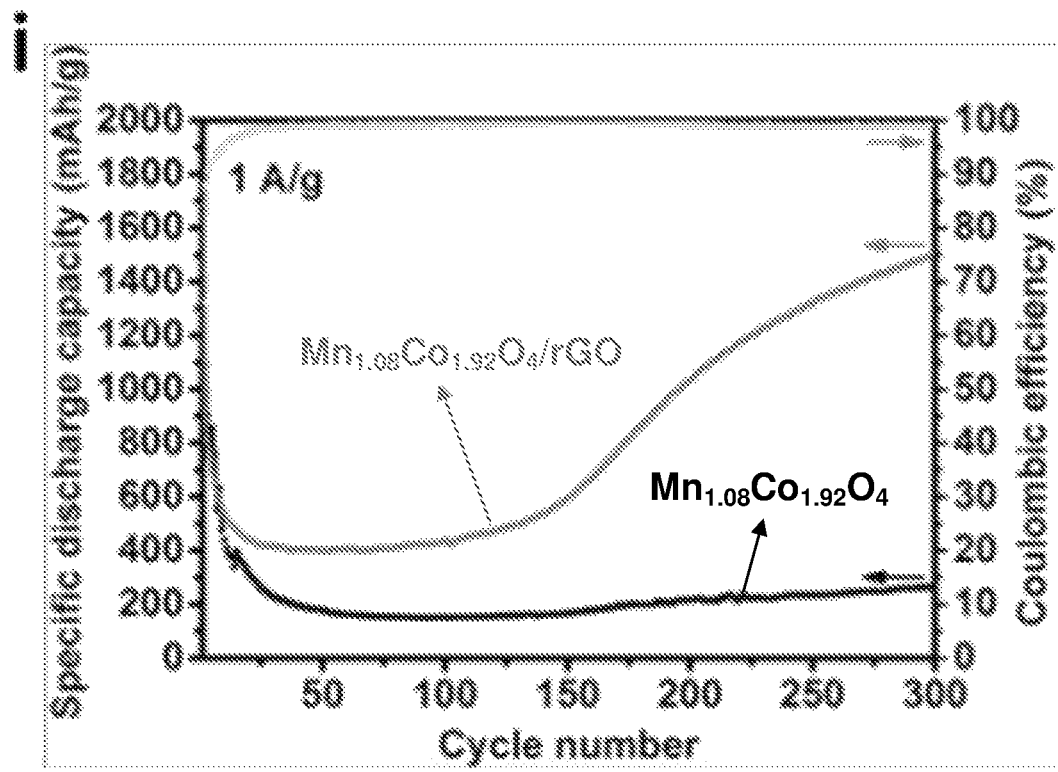
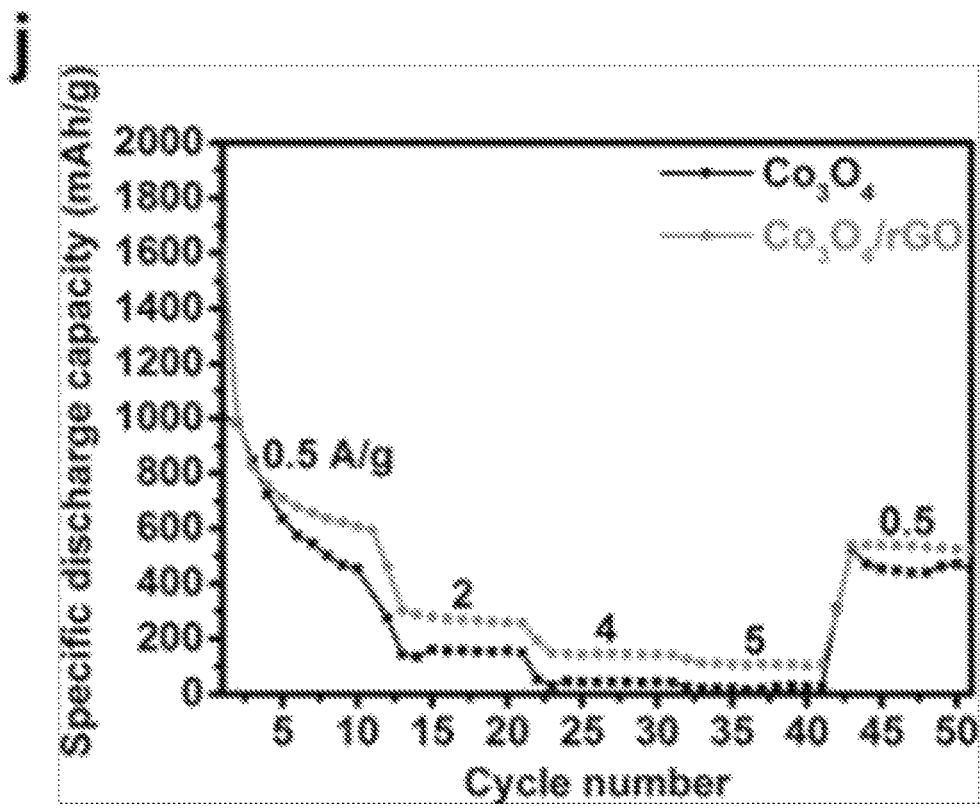

[Fig. 11]
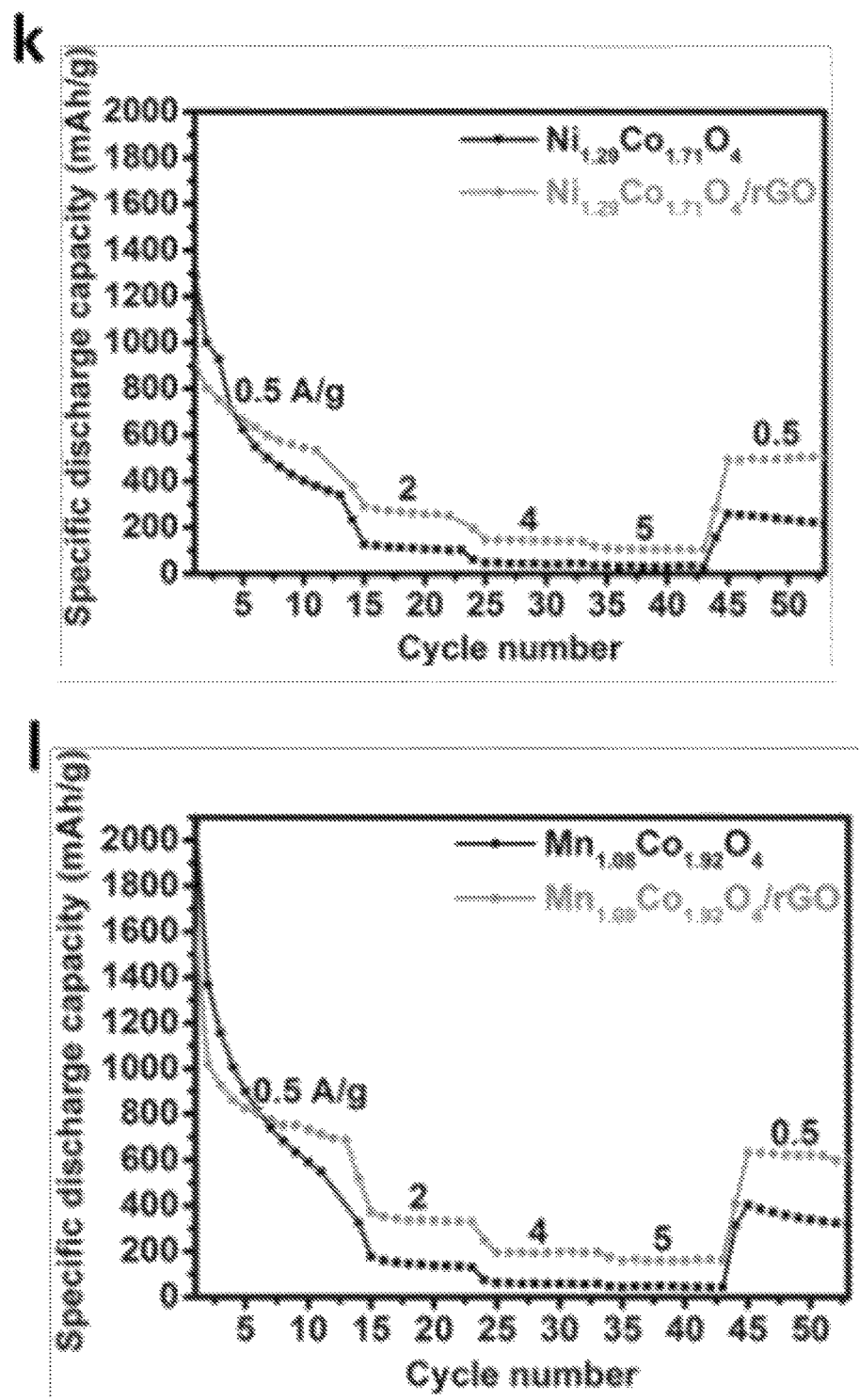

METHOD FOR PREPARING METAL OXIDE NANOSHEETS

CROSS-REFERENCE TO RELATED APPLICATIONS

This patent application is a U.S. National Phase Application Under 35 U.S.C § 371 of International Application No. PCT/SG2017/050525, filed on Oct. 20, 2017, entitled "A METHOD FOR PREPARING METAL OXIDE NANOSHEETS," which claims the benefit of priority of Singapore Patent Application No. 10201608827X, filed on Oct. 20, 2016.

TECHNICAL FIELD

The present invention generally relates to a method for preparing metal oxide nanosheets. The present invention also relates to the metal oxide nanosheets and a battery anode comprising the metal oxide nanosheets.

BACKGROUND ART

Nanosheets, with a thickness of less than 5 nm and lateral dimensions of 100 nm to micrometers, have been used in a wide array of applications such as energy storage, catalysis and sensors.

In particular, the unique structure of nanosheets is expected to improve lithium-ion battery performance. The enhanced structural integrity that results from the lateral dimensions can buffer volume change, thus enhancing stability. The ultrathin nanosheets promote $Li^+$ and electron transport across the material, yielding higher rate capability. In addition, the high surface area of the nanosheets allows for good contact between the active material and the electrolyte, facilitating access to electrochemically active sites. The special surface electronic structure of nanosheets may also give rise to unique properties such as pseudocapacitive behavior. Such attractive capacity and rate capability have been shown by nanosheets, such as $SnO_2$, $TiO_2$, $Li_2MSiO_4$ (M=Mn, Fe), and $LiMPO_4$/C (M=Fe, Mn, Co) nanosheets.

Metal oxide nanosheets are typically prepared by exfoliation, which is only limited to intrinsically layered materials. To synthesize nanosheets for various compositions including non-layered materials, a bottom-up approach is desirable. Chemical vapor deposition is an option, however, it involves sophisticated equipment and is not economical. Wet-chemical methods, such as hydrothermal synthesis and template-assisted methods, have also been investigated. Although hydrothermal method is suitable for nanosheets' synthesis for several metal oxides, it entails multiple steps with limited scalability. Template-assisted methods have been employed to obtain a number of metal oxide nanosheets, e.g. $Co_3O_4$, $TiO_2$, $SnO_2$, $Fe_2O_3$, $Nb_2O_5$ and $ZrO_2$. However, it involves a graphene-silica nanosheet template that requires etching for template removal, or adopts a hydrothermal approach that limits industrial scale-up.

There is a need to provide a method for preparing the metal oxide nanosheets above that overcomes, or at least ameliorates, one or more of the disadvantages described above.

SUMMARY

According to a first aspect, there is provided a method of preparing metal oxide nanosheets comprising the steps of:

a) mixing a template with at least one metal oxide precursor to form a metal oxide precursor-bonded template;

b) calcining the metal oxide precursor-bonded template obtained in step a) to form the metal oxide nanosheets.

Advantageously the method described herein may proceed via a single step of reaction (step b) and may not require the use of an autoclave or an additional reaction (such as a solvothermal or hydrothermal reaction) to produce the metal oxide nanosheets.

Further advantageously, the method described here is simple, general and scalable. Further, this method is capable of providing a good control over the compositions and attributes of the metal oxide nanosheets produced.

In another aspect, there is provided metal oxide nanosheets having a thickness in the range of about 0.5 nm to 10 nm.

Advantageously, the metal oxide nanosheets of the present disclosure exhibit desirable properties including small thickness, good mechanical properties, high surface area and continuous charge-transfer paths, which make the above nanosheets suitable as materials used for high battery performance as mentioned below.

In another aspect, there is provided a battery anode comprising metal oxide nanosheets comprising at least one transition metal, wherein the metal oxide nanosheets are binary oxide nanosheets, doped binary oxide nanosheets or ternary oxide nanosheets.

Advantageously, the battery anode comprising the metal oxide nanosheets as defined herein exhibits enhanced capacity, rate capability and stability when it is used as the active material in the Li-ion battery anodes.

In another aspect, there is provided a method for preparing a battery anode comprising metal oxide nanosheets comprising at least one transition metal, comprising the steps of:

a) mixing a template with at least one metal oxide precursor to form a metal oxide precursor-bonded template;

b) calcining the metal oxide precursor-bonded template obtained in step a) to form the metal oxide nanosheets;

c) mixing the metal oxide nanosheets obtained in step b) with at least one inert material and a solvent to form a slurry; and d) coating the slurry obtained in step c) on a support thereby forming the battery anode.

DEFINITIONS

The following words and terms used herein shall have the meaning indicated:

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a method for preparing metal oxide nanosheets, will now be disclosed.

The method of preparing the metal oxide nanosheets comprises the steps of:

a) mixing a template with at least one metal oxide precursor to form a metal oxide precursor-bonded template;

b) calcining the metal oxide precursor-bonded template obtained in step a) to form the metal oxide nanosheets.

The template used in the method above may be a sacrificial template. The template may be selected from a number of suitable templates such as two dimensional carbonaceous materials optionally having surface functional groups including graphite oxide and graphene oxide (GO).

The metal oxide precursor used in the method above may be a transition metal oxide precursor or a non-transition metal oxide precursor. Hence, when more than one metal oxide precursor is used, at least one of the metal oxide precursors is a transition metal oxide precursor.

The metal oxide precursor may be selected from metal-alkoxide, metal salt in particular metal-halide, metal-diketone (or metal-dione), metal nitrate, metal salt of a saturated fatty acid or combinations thereof.

When the metal oxide precursor is transition metal oxide precursor, the transition metal element of the transition metal oxide may be selected from groups 3, 4, 5, 6, 7, 8, 9, 10, 11 or 12 of the Periodic Table of Elements. Non-limiting examples of the transition metal include scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, or combinations thereof. When a combination of transition metals is present, the combination may include the transition metal dopant (or doping agent) in another transition metal that forms doped binary oxide nanosheets or a combination of at least two transition metals that form ternary (when two metal precursors are used) or quaternary (when three metal precursors are used) oxide phases.

The examples of the transition metals herein are not limited to the above. Hence, it may include those transition metals from the Periodic Table of elements that are not shown above. The transition metal oxide precursor described herein may be in the hydrate(s) or non-hydrate(s) form.

Non-limiting examples of the transition metal oxide precursor include $NbCl_5$, Nb(V) ethoxide, Ti(IV) ethoxide, Ti(V) butoxide, Fe(II) chloride, Fe(III) chloride, Fe(II) methoxide, Fe(III) ethoxide, Fe(II) acetylacetonate, Fe(III) acetylacetonate, tin (II) chloride, dibutyltin dilaureate, Ni(II) chloride, Ni(II) ethoxide, Ni(II) acetylacetonate, Co(II) chloride, Co(II) methoxide, Co(II) acetylacetonate, Mn(II) chloride, Mn(II) methoxide, Mn(II) acetylacetonate, Zr(IV) chloride, Zr(IV) propoxide or combinations thereof. The preferred transition metal oxide precursor used in the method above may be selected from $NbCl_5$, Nb(V) ethoxide, Ti(V) butoxide, Fe(III) acetylacetonate, dibutyltin dilaureate, Ni(II) acetylacetonate, Co(II) acetylacetonate, Mn(II) acetylacetonate, Zr(IV) propoxide and combinations thereof.

Therefore, it is also understood that the transition metal oxide precursor used herein may exist in various oxidation states with respect to transition metal. For example, when iron chloride is used as the transition metal precursor, iron chloride may be iron (II) chloride, iron (III) chloride or their combinations.

For the non-transition metal oxide precursor, the metal described herein may be selected from the alkali metal and alkaline earth metal selected from groups 1 and 2 of the Periodic Table of Elements. Hence, the non-transition metal oxide precursor used in the above method may be selected from alkali metal-alkoxide, alkali metal salt in particular alkali metal-halide, alkali metal-nitrate, alkali metal-diketone (or alkali metal-dione), alkaline earth metal-alkoxide, alkaline earth metal salt in particular alkaline earth metal-halide, alkaline earth metal-nitrate, alkaline earth metal-diketone (or alkaline earth metal-dione), combinations thereof. The above non-transition metal oxide precursor may be in the hydrate(s) or non-hydrate(s) form.

Non-limiting examples of the non-transition metal oxide precursor described herein may include sodium nitrate, sodium chloride, sodium sulfate, sodium carbonate, sodium methoxide, sodium ethoxide, sodium acetylacetonate, potassium nitrate, potassium chloride, potassium sulfate, potassium carbonate, potassium methoxide, potassium ethoxide, potassium acetylacetonate, calcium nitrate, calcium chloride, calcium sulfate, calcium carbonate, calcium methoxide, calcium ethoxide, calcium acetylacetonate, magnesium nitrate, magnesium chloride, magnesium sulfate, magnesium carbonate, magnesium methoxide, magnesium ethoxide, magnesium acetylacetonate, barium nitrate, barium chloride, barium sulfate, barium carbonate, barium methoxide, barium ethoxide, barium acetylacetonate, or combinations thereof.

Prior to mixing the metal oxide precursor and the template, the metal oxide precursor and the template may be independently or separately dispersed in a suitable solvent. Hence, the solvent used to disperse the metal oxide precursor and the template may be different or identical. The solvent used may be aqueous or non-aqueous (organic) solvent and the non-limiting examples of such solvents include water, aqueous salt solution, methanol, ethanol, 1-propanol, 2-propanol, 1-butanol, 2-butanol, tert-butyl alcohol, acetonitrile, dimethyl sulfoxide (DMSO), hexane, cyclohexane, benzene, acetic acid, chloroform, diethyl ether, diethylene glycol, ethyl acetate, N-methyl-2-pyrrolidone (NMP) and combinations thereof. The dispersion of both the metal oxide precursor and template preferably facilitates the contact between the molecules of the metal oxide precursor and the template thereby forming the metal oxide precursor-bonded template as described herein.

Hence, to ensure intimate contact between the molecules of the metal oxide precursor and the template, the solvent(s) used to disperse the metal oxide precursor and template is (are) substantially miscible. When similar solvent can be used to dissolve and disperse both metal oxide precursor and template, then this common solvent is preferably used.

The mixing as defined in step a) of the method above is undertaken in a thorough manner i.e. the mixing may be undertaken vigorously or weakly as long as the mixing process results in a substantially homogeneous mixture (or one-phase mixture) of the metal oxide precursor-bonded template. The mixing step defined herein may be undertaken in a controlled environment i.e. the temperature of the mixing process is kept substantially constant. The temperature of the mixing may be in the range of about 20° C. to 80° C., about 20° C. to 25° C., about 20° C. to 30° C., about 20° C. to 40° C., about 20° C. to 50° C., about 20° C. to 60° C., about 20° C. to 70° C., about 25° C. to 30° C., about 25° C. to 40° C., about 25° C. to 50° C., about 25° C. to 60° C., about 25° C. to 70° C., about 25° C. to 80° C., about 30° C. to 40° C., about 30° C. to 50° C., about 30° C. to 60° C., about 30° C. to 70° C., about 30° C. to 80° C., about 40° C. to 50° C., about 40° C. to 60° C., about 40° C. to 70° C., about 40° C. to 80° C., about 50° C. to 60° C., about 50° C. to 70° C., about 50° C. to 80° C., about 60° C. to 70° C., about 60° C. to 80° C., or about 70° C. to 80° C. The preferred temperature for mixing may be about at room temperature (for example from about 20° C. to 30° C.) or at about 40° C. or higher.

The mixing step as defined herein may be undertaken in a period of time in the range of about 15 minutes to 24 hours, about 15 minutes to 30 minutes, about 15 minutes to 45 minutes, about 15 minutes to 1 hour, about 15 minutes to 4 hours, about 15 minutes to 8 hours, about 15 minutes to 12 hours, about 15 minutes to 24 hours, about 30 minutes to 45 minutes, about 30 minutes to 1 hour, about 30 minutes to 4 hours, about 30 minutes to 8 hours, about 30 minutes to 12 hours, about 30 minutes to 24 hours, about 45 minutes to 1 hour, about 45 minutes to 4 hours, about 45 minutes to 8 hours, about 45 minutes to 12 hours, about 45 minutes to 24 hours, about 1 hour to 4 hours, about 1 hour to 8 hours, about 1 hour to 12 hours, about 1 hour to 24 hours, about 4 hours to 8 hours, about 4 hours to 12 hours, about 4 hours to 24 hours, about 8 hours to 12 hours, about 8 hours to 24 hours, or about 12 hours to 24 hours. Without being bound by theory, the mixing time used herein may influence the yield and the thickness of the nanosheets.

When graphene oxide (GO) is used as the template, upon mixing the GO dispersion with the metal oxide precursor, the metal oxide precursor-bonded GO may be obtained.

The initial concentration of the metal oxide precursor used in the synthesis above may be in the range of about 0.01 mmol to 4 mmol, about 0.01 mmol to 0.02 mmol, about 0.01 mmol to 0.08 mmol, about 0.01 mmol to 0.1 mmol, about 0.01 mmol to 0.5 mmol, about 0.01 mmol to 1.5 mmol, about 0.01 mmol to 2 mmol, about 0.01 mmol to 3 mmol, about 0.02 mmol to 0.08 mmol, about 0.02 mmol to 0.1 mmol, about 0.02 mmol to 0.5 mmol, about 0.02 mmol to 1.5 mmol, about 0.02 mmol to 2 mmol, about 0.02 mmol to 3 mmol, about 0.02 mmol to 4 mmol, about 0.08 mmol to 0.1 mmol, about 0.08 mmol to 0.5 mmol, about 0.08 mmol to 1.5 mmol, about 0.08 mmol to 2 mmol, about 0.08 mmol to 3 mmol, about 0.08 mmol to 4 mmol, about 0.1 mmol to 0.5 mmol, about 0.1 mmol to 1.5 mmol, about 0.1 mmol to 2 mmol, about 0.1 mmol to 3 mmol, about 0.1 mmol to 4 mmol, about 0.5 mmol to 1.5 mmol, about 0.5 mmol to 2 mmol, about 0.5 mmol to 3 mmol, about 0.5 mmol to 4 mmol, about 1.5 mmol to 2 mmol, about 1.5 mmol to 3 mmol, about 1.5 mmol to 4 mmol, about 2 mmol to 3 mmol, about 2 mmol to 4 mmol, about 3 mmol to 4 mmol, per 240 mL of solvent used to disperse the metal oxide precursor. The initial concentration of the metal oxide precursor above may be added in excess with respect to the template. Without being bound by theory, the initial concentration of the metal oxide precursor used herein may influence the yield and the thickness of the nanosheets.

The resulting metal oxide precursor-bonded template obtained from step a) may be subjected to a washing cycle to remove unbounded metal oxide precursor or the excess metal oxide precursor. The washing cycle above may require 1, 2, 3, 4, or 5 cycles of washing, preferably at least 3 cycles of washing. The number of cycles here is not limited to 5 cycles. Hence, it may be repeated as many as possible to ensure that the unbounded metal oxide precursor is substantially removed. At the completion of the washing cycle, the metal oxide precursor-bonded template may be substantially free of the metal oxide precursor that is a minimum amount of or no metal oxide precursor is found in the mixture.

The washing step above may be undertaken using a suitable solvent as described above that is similar to the one used to disperse the metal oxide precursor and/or the template. Therefore, a single solvent or a mixture of one or more solvents may be used in the washing step.

It is understood that the above washing step above may involve separating the solvent used for washing from the solid product that is metal oxide precursor-bonded template. Non-limiting examples of such separating step include centrifugation, precipitation, decantation, and filtration.

The metal oxide precursor-bonded template above may be dried prior to calcining step b). The drying step may be undertaken using a method known in the art as long as this drying step is capable of substantially removing the solvent by evaporation from the solid. Typical drying process described above may involve the supply of heat. Hence, said drying process may involve the use of a gas stream such as air, which applies the heat by convection and carries away the vapor as humidity or vacuum drying where the heat is supplied by conduction or radiation (or microwaves), while the vapor produced is removed by the vacuum system. The examples above are non-limiting and therefore other suitable drying techniques such as freeze drying may also be used.

The drying step described above may be undertaken at a temperature in the range of about 30° C. to 80° C., about 30° C. to 40° C., about 30° C. to 50° C., about 30° C. to 60° C., about 30° C. to 70° C., about 40° C. to 50° C., about 40° C. to 60° C., about 40° C. to 70° C., about 40° C. to 80° C., about 50° C. to 60° C., about 50° C. to 70° C., about 50° C. to 80° C., about 60° C. to 70° C., about 60° C. to 80° C., or about 70° C. to 80° C.

The drying step described herein may be undertaken at a period in the range of about 1 hour to 24 hours, about 1 hour to 2 hours, about 1 hour to 3 hours, about 1 hour to 6 hours, about 1 hour to 9 hours, about 1 hour to 12 hours, about 1 hour to 18 hours, about 2 hours to 3 hours, about 2 hours to 6 hours, about 2 hours to 9 hours, about 2 hours to 12 hours, about 2 hours to 18 hours, about 2 hours to 24 hours, about 3 hours to 6 hours, about 3 hours to 9 hours, about 3 hours to 12 hours, about 3 hours to 18 hours, about 3 hours to 24 hours, about 6 hours to 9 hours, about 6 hours to 12 hours, about 6 hours to 18 hours, about 6 hours to 24 hours, about 9 hours to 12 hours, about 9 hours to 18 hours, about 9 hours to 24 hours, about 12 hours to 18 hours, about 12 hours to 24 hours, or about 18 hours to 24 hours.

For some of the metal oxide precursors, the process of mixing or separating step or washing step may be undertaken at the same or different temperature depending on the nature of the metal oxide precursor. When metal acetyl acetonate is used as the metal oxide precursor, the stirring, centrifugation and washing steps may be conducted at the temperature of at least (or ≥) 40° C. to avoid metal oxide precursor precipitation.

Upon completion of drying step, the metal oxide precursor-bonded template may be subjected to a calcining step b). The calcining step as defined herein may be undertaken at a temperature in the range from about 250° C. to 900° C., about 250° C. to 275° C., about 250° C. to 300° C., about 250° C. to 325° C., about 250° C. to 350° C., about 250° C. to 375° C., about 250° C. to 400° C., about 250° C. to 450° C., about 250° C. to 500° C., about 250° C. to 550° C., about 250° C. to 600° C., about 250° C. to 650° C., about 250° C. to 700° C., about 250° C. to 750° C., about 250° C. to 800° C., about 275° C. to 300° C., about 275° C. to 325° C., about 275° C. to 350° C., about 275° C. to 375° C., about 275° C. to 400° C., about 275° C. to 450° C., about 275° C. to 500° C., about 275° C. to 550° C., about 275° C. to 600° C., about 275° C. to 650° C., about 275° C. to 700° C., about 275° C. to 750° C., about 275° C. to 800° C., about 275° C. to 900° C., about 300° C. to 325° C., about 300° C. to 350° C., about 300° C. to 375° C., about 300° C. to 400° C., about 300° C. to 450° C., about 300° C. to 500° C., about 300° C. to 550° C., about 300° C. to 600° C., about 300° C. to 650° C., about 300° C. to 700° C., about 300° C. to 750° C., about 300° C. to 800° C., about 300° C. to 900° C., about 325° C. to 350° C., about 325° C. to 375° C., about 325° C. to 400° C., about 325° C. to 450° C., about 325° C. to 500° C., about 325° C. to 550° C., about 325° C. to 600° C., about 325° C. to 650° C., about 325° C. to 700° C., about 325° C. to 750° C., about 325° C. to 800° C., about 325° C. to 900° C., about 350° C. to 375° C., about 350° C. to 400° C., about 350° C. to 450° C., about 350° C. to 500° C., about 350° C. to 550° C., about 350° C. to 600° C., about 350° C. to 650° C., about 350° C. to 700° C., about 350° C. to 750° C., about 350° C. to 800° C., about 350° C. to 900° C., about 375° C. to 400° C., about 375° C. to 450° C., about 375° C. to 500° C., about 375° C. to 550° C., about 375° C. to 600° C., about 375° C. to 650° C., about 375° C. to 700° C., about 375° C. to 750° C., about 375° C. to 800° C., about 375° C. to 900° C., about 400° C. to 450° C., about 400° C. to 500° C., about 400° C. to 550° C., about 400° C. to 600° C., about 400° C. to 650° C., about 400° C. to 700° C., about 400° C. to 750° C., about 400° C. to 800° C., about 400° C. to 900° C., about 450° C. to 500° C., about 450° C. to 550° C., about 450° C. to 600° C., about 450° C. to 650° C., about 450° C. to 700° C., about 450° C. to 750° C., about 450° C. to 800° C., about 450° C. to 900° C., about 500° C. to 550° C., about 500° C. to 600° C., about 500° C. to 650° C., about 500° C. to 700° C., about 500° C. to 750° C., about 500° C. to 800° C., about 500° C. to 900° C., about 550° C. to 600° C., about 550° C. to 650° C., about 550° C. to 700° C., about 550° C. to 750° C., about 550° C. to 800° C., about 550° C. to 900° C., about 600° C. to 650° C., about 600° C. to 700° C., about 600° C. to 750° C., about 600° C. to 800° C., about 600° C. to 900° C., about 650° C. to 700° C., about 650° C. to 750° C., about 650° C. to 800° C., about 650° C. to 900° C., about 700° C. to 750° C., about 700° C. to 800° C., about 700° C. to 900° C., about 750° C. to 800° C., about 750° C. to 900° C., or about 800° C. to 900° C.

The calcining step b) as defined herein may be undertaken for a period in the range from about 10 minutes to 1000 minutes, about 10 minutes to 15 minutes, about 10 minutes to 30 minutes, about 10 minutes to 45 minutes, about 10 minutes to 60 minutes, about 10 minutes to 90 minutes, about 10 minutes to 120 minutes, about 10 minutes to 180 minutes, about 10 minutes to 240 minutes, about 10 minutes to 600 minutes, about 15 minutes to 30 minutes, about 15 minutes to 45 minutes, about 15 minutes to 60 minutes, about 15 minutes to 90 minutes, about 15 minutes to 120 minutes, about 15 minutes to 180 minutes, about 15 minutes to 240 minutes, about 15 minutes to 300 minutes, about 15 minutes to 600 minutes, about 15 minutes to 1000 minutes, about 30 minutes to 45 minutes, about 30 minutes to 60 minutes, about 30 minutes to 90 minutes, about 30 minutes to 120 minutes, about 30 minutes to 180 minutes, about 30 minutes to 240 minutes, about 30 minutes to 300 minutes, about 30 minutes to 600 minutes, about 30 minutes to 1000 minutes, about 45 minutes to 60 minutes, about 45 minutes to 90 minutes, about 45 minutes to 120 minutes, about 45 minutes to 180 minutes, about 45 minutes to 240 minutes, about 45 minutes to 300 minutes, about 45 minutes to 600 minutes, about 45 minutes to 1000 minutes, about 60 minutes to 90 minutes, about 60 minutes to 120 minutes, about 60 minutes to 180 minutes, about 60 minutes to 240 minutes, about 60 minutes to 300 minutes, about 60 minutes to 600 minutes, about 60 minutes to 1000 minutes, about 90 minutes to 120 minutes, about 90 minutes to 180 minutes, about 90 minutes to 240 minutes, about 90 minutes to 300 minutes, about 90 minutes to 600 minutes, about 90 minutes to 1000 minutes, about 120 minutes to 180 minutes, about 120 minutes to 240 minutes, about 120 minutes to 300 minutes, about 120 minutes to 600 minutes, about 120 minutes to 1000 minutes, about 180 minutes to 240 minutes, about 180 minutes to 300 minutes, about 180 minutes to 600 minutes, about 180 minutes to 1000 minutes, about 240 minutes to 300 minutes, about 240 minutes to 600 minutes, about 240 minutes to 1000 minutes, about 300 minutes to 600 minutes, about 300 minutes to 1000 minutes, or about 600 minutes to 1000 minutes. The preferred duration for calcining step may be about 10 minutes to 30 minutes such as about 18 minutes, about 30 minutes to 60 minutes such as about 42 minutes or about 48 minutes, about 60 minutes and about 120 minutes.

The calcining step b) above may be undertaken in the presence of gas. Non-limiting examples of gas that may be used in the calcining step include air, oxygen, nitrogen, argon, hydrogen, helium, and combinations thereof. When nitrogen, argon, hydrogen and helium are used, the calcining step herein may therefore proceed under inert or reducing atmosphere. When the calcining step is undertaken in the presence of hydrogen, the calcining step may then proceed under reducing atmosphere. Hence, it is to be understood that the inert or reducing atmosphere as defined above refers to the environment in which the calcining step takes place may be substantially free of oxygen. Without being bound by theory, when the calcining step occurs in inert atmosphere, the metal oxide may be formed as closely-attached particles on the surface of the template. The template itself during the calcination may be converted to a reduced form of the template. Further, the metal oxide nanosheets may be formed when the calcination is undertaken in air, when a substantial amount of the template is removed. Typical method for preparing the metal oxide nanosheets as defined here may have at least either pre-calcining or calcining is undertaken in air.

In the calcining step above, the template may be removed and the metal oxide nanosheets may be formed. The formation of the metal oxide nanosheets here may occur simultaneously or concurrently with the removal of the template. Alternatively, the removal of the template may occur after the formation of the metal oxide nanosheets. The removal of the template above may occur partially (partly) or completely (fully). When such removal occurs partially, the reduced template may remain bonded to the layered metal oxide.

The template that has been removed after the calcination may be converted to a reduced template or a reduced residual template depending on the gas present during the calcination.

When the calcination proceeds in the presence of inert gas, the residual template may be produced. However, when the calcination proceeds in the presence of air, the reduced residual template may be formed. Hence, if graphene oxide (GO) is used as the template, the reduced template or reduced residual template may be reduced graphene oxide (rGO).

If the template is partially removed, the resulting product that is the metal oxide nanosheets may therefore contain the template. The template content may be in the range of about 2 wt % to 50 wt %, about 2 wt % to 5 wt %, about 2 wt % to 10 wt %, about 2 wt % to 15 wt %, about 2 wt % to 20 wt %, about 2 wt % to 25 wt %, about 2 wt % to 30 wt %, about 2 wt % to 35 wt %, about 2 wt % to 40 wt %, about 2 wt % to 45 wt %, about 5 wt % to 10 wt %, about 5 wt % to 15 wt %, about 5 wt % to 20 wt %, about 5 wt % to 25 wt %, about 5 wt % to 30 wt %, about 5 wt % to 35 wt %, about 5 wt % to 40 wt %, about 5 wt % to 45 wt %, about 5 wt % to 50 wt %, about 10 wt % to 15 wt %, about 10 wt % to 20 wt %, about 10 wt % to 25 wt %, about 10 wt % to 30 wt %, about 10 wt % to 35 wt %, about 10 wt % to 40 wt %, about 10 wt % to 45 wt %, about 10 wt % to 50 wt %, about 15 wt % to 20 wt %, about 15 wt % to 25 wt %, about 15 wt % to 30 wt %, about 15 wt % to 35 wt %, about 15 wt % to 40 wt %, about 15 wt % to 45 wt %, about 15 wt % to 50 wt %, about 20 wt % to 25 wt %, about 20 wt % to 30 wt %, about 20 wt % to 35 wt %, about 20 wt % to 40 wt %, about 20 wt % to 45 wt %, about 20 wt % to 50 wt %, about 25 wt % to 30 wt %, about 25 wt % to 35 wt %, about 25 wt % to 40 wt %, about 25 wt % to 45 wt %, about 25 wt % to 50 wt %, about 30 wt % to 35 wt %, about 30 wt % to 40 wt %, about 30 wt % to 45 wt %, about 30 wt % to 50 wt %, about 35 wt % to 40 wt %, about 35 wt % to 45 wt %, about 35 wt % to 50 wt %, about 40 wt % to 45 wt %, about 40 wt % to 50 wt %, or about 45 wt % to 50 wt %, based on the total weight of the metal oxide nanosheets.

Hence, when graphene oxide (GO) is used as the template, the rGO content may be in the range as defined above and is based on the total weight of the metal oxide nanosheets.

Prior to calcining the metal oxide precursor-bonded template, a pre-calcining step may be undertaken at a temperature in the range from about 250° C. to 900° C., about 250° C. to 400° C., about 250° C. to 500° C., about 250° C. to 550° C., about 250° C. to 700° C., about 250° C. to 800° C., about 400° C. to 500° C., about 400° C. to 550° C., about 400° C. to 700° C., about 400° C. to 800° C., about 400° C. to 900° C., about 500° C. to 550° C., about 500° C. to 700° C., about 500° C. to 800° C., about 500° C. to 900° C., about 550° C. to 600° C., about 550° C. to 700° C., about 550° C. to 800° C., about 550° C. to 900° C., about 700° C. to 750° C., about 700° C. to 800° C., about 700° C. to 850° C., about 700° C. to 900° C., about 800° C. to 900° C., or about 850° C. to 900° C.

The pre-calcining step as defined above may be undertaken for a period in the range from about 10 minutes to 1000 minutes, about 10 minutes to 15 minutes, about 10 minutes to 30 minutes, about 10 minutes to 45 minutes, about 10 minutes to 60 minutes, about 10 minutes to 90 minutes, about 10 minutes to 120 minutes, about 10 minutes to 180 minutes, about 10 minutes to 240 minutes, about 10 minutes to 300 minutes, about 10 minutes to 600 minutes, about 15 minutes to 30 minutes, about 15 minutes to 45 minutes, about 15 minutes to 60 minutes, about 15 minutes to 90 minutes, about 15 minutes to 120 minutes, about 15 minutes to 180 minutes, about 15 minutes to 240 minutes, about 15 minutes to 300 minutes, about 15 minutes to 600 minutes, about 15 minutes to 1000 minutes, about 30 minutes to 45 minutes, about 30 minutes to 60 minutes, about 30 minutes to 90 minutes, about 30 minutes to 120 minutes, about 30 minutes to 180 minutes, about 30 minutes to 240 minutes, about 30 minutes to 300 minutes, about 30 minutes to 600 minutes, about 30 minutes to 1000 minutes, about 45 minutes to 60 minutes, about 45 minutes to 90 minutes, about 45 minutes to 120 minutes, about 45 minutes to 180 minutes, about 45 minutes to 240 minutes, about 45 minutes to 300 minutes, about 60 minutes to 90 minutes, about 60 minutes to 120 minutes, about 60 minutes to 180 minutes, about 60 minutes to 240 minutes, about 60 minutes to 300 minutes, about 60 minutes to 600 minutes, about 60 minutes to 1000 minutes, about 90 minutes to 120 minutes, about 90 minutes to 180 minutes, about 90 minutes to 240 minutes, about 90 minutes to 300 minutes, about 90 minutes to 600 minutes, about 90 minutes to 1000 minutes, about 120 minutes to 180 minutes, about 120 minutes to 240 minutes, about 120 minutes to 300 minutes, about 120 minutes to 600 minutes, about 120 minutes to 1000 minutes, 180 minutes to 240 minutes, about 180 minutes to 300 minutes, about 180 minutes to 600 minutes, about 180 minutes to 1000 minutes, about 240 minutes to 300 minutes, about 240 minutes to 600 minutes, about 240 minutes to 1000 minutes, about 300 minutes to 600 minutes, about 300 minutes to 1000 minutes, or about 600 minutes to 1000 minutes. The duration for pre-calcining step is preferably about 60 minutes or about 120 minutes, more preferably about 120 minutes.

In the above regard, the pre-calcining step as defined above may be undertaken at the same or different temperature as the calcining step. In other words, the pre-calcining step may be undertaken at lower temperature than or the same temperature as or higher temperature than the calcining-step.

The pre-calcining step as defined above may be undertaken in the presence of gas. Non-limiting examples of gas that may be used in the pre-calcining step include air, oxygen, nitrogen, argon, hydrogen, helium, and combinations thereof. When nitrogen, argon, hydrogen and helium are used, the pre-calcining step herein may proceed under inert or reducing atmosphere. That is, the environment in which the pre-calcining step takes place may be substantially free of oxygen. The pre-calcining step as defined above may be undertaken using the same or different gas used for the calcining step.

The pre-calcining step defined herein may be undertaken after the mixing step a), but prior to step b) of the method above. Hence, the pre-calcining step may be denoted as pre-calcining step a1). Further, the conditions for calcining and pre-calcining step may be varied to achieve an optimum condition. Such optimum condition may include higher calcining temperature (than the pre-calcining temperature), calcining under air following the pre-calcining under inert gas (such as argon), and a shorter duration of calcining (than of pre-calcining). Such optimum condition may be further varied such that the optimum condition may be achieved at a lower calcining temperature (than the pre-calcining temperature), calcining under inert atmosphere (such as argon) following the pre-calcining under air, and at the same duration of calcining and pre-calcining steps. The combination of the parameters here (duration of calcining step vs. duration of pre-calcining step, temperature of calcining step vs. temperature of pre-calcining step, the type of gas used in the calcining step and the pre-calcining step) is not limited to the above.

To provide further illustrations to the above, the possible permutations of the parameters to achieve the desired process condition are provided as follow.

Exemplary Condition 1
Temperature used for calcining is higher than that for pre-calcining; calcining is undertaken in the inert atmosphere, pre-calcining is undertaken in air; duration of calcining is longer than that of pre-calcining.

Exemplary Condition 2
Temperature used for calcining is higher than that for pre-calcining; calcining is undertaken in the inert atmosphere, pre-calcining is undertaken in air; duration of calcining is shorter than that of pre-calcining.

Exemplary Condition 3
Temperature used for calcining is higher than that for pre-calcining; both calcining and pre-calcining steps are undertaken in air; duration of calcining is longer than that of pre-calcining.

Exemplary Condition 4
Temperature used for calcining is higher than that for pre-calcining; both calcining and pre-calcining steps are undertaken in air; duration of calcining is shorter than that of pre-calcining.

Exemplary Condition 5
Temperature used for calcining is higher than that for pre-calcining; calcining is undertaken in air and pre-calcining step is undertaken in reducing atmosphere; duration of calcining is longer than that of pre-calcining.

Exemplary Condition 6
Temperature used for calcining is higher than that for pre-calcining; calcining is undertaken in air and pre-calcining step is undertaken in reducing atmosphere; duration of calcining is shorter than that of pre-calcining.

Exemplary Condition 7
Temperature used for calcining is higher than that for pre-calcining; calcining is undertaken in air, pre-calcining is undertaken in the inert atmosphere; duration of calcining is longer than that of pre-calcining.

Exemplary Condition 8
Temperature used for calcining is higher than that for pre-calcining; calcining is undertaken in air, pre-calcining is undertaken in the inert atmosphere; duration of calcining is shorter than that of pre-calcining.

Exemplary Condition 9
Temperature used for calcining is lower than that for pre-calcining; calcining is undertaken in the inert atmosphere, pre-calcining is undertaken in air; duration of calcining is longer than that of pre-calcining.

Exemplary Condition 10
Temperature used for calcining is lower than that for pre-calcining; calcining is undertaken in the inert atmosphere, pre-calcining is undertaken in air; duration of calcining is shorter than that of pre-calcining.

Exemplary Condition 11
Temperature used for calcining is lower than that for pre-calcining; both calcining and pre-calcining steps are undertaken in air; duration of calcining is longer than that of pre-calcining.

Exemplary Condition 12
Temperature used for calcining is lower than that for pre-calcining; both calcining and pre-calcining steps are undertaken in air; duration of calcining is shorter than that of pre-calcining.

Exemplary Condition 13
Temperature used for calcining is lower than that for pre-calcining; calcining step is undertaken in air and pre-calcining step is undertaken in reducing atmosphere; duration of calcining is longer than that of pre-calcining.

Exemplary Condition 14
Temperature used for calcining is lower than that for pre-calcining; calcining is undertaken in air and pre-calcining step is undertaken in reducing atmosphere; duration of calcining is shorter than that of pre-calcining.

Exemplary Condition 15
Temperature used for calcining is lower than that for pre-calcining; calcining is undertaken in air, pre-calcining is undertaken in the inert atmosphere; duration of calcining is longer than that of pre-calcining.

Exemplary Condition 16
Temperature used for calcining is lower than that for pre-calcining; calcining is undertaken in air, pre-calcining is undertaken in the inert atmosphere; duration of calcining is shorter than that of pre-calcining.

Exemplary Condition 17
Same temperature is used for both calcining and pre-calcining steps; calcining is undertaken in the inert atmosphere, pre-calcining is undertaken in air; duration of calcining is longer than that of pre-calcining.

Exemplary Condition 18
Same temperature is used for both calcining and pre-calcining steps; calcining is undertaken in the inert atmosphere, pre-calcining is undertaken in air; duration of calcining is shorter than that of pre-calcining.

Exemplary Condition 19
Same temperature is used for both calcining and pre-calcining steps; both calcining and pre-calcining steps are undertaken in air; duration of calcining is longer than that of pre-calcining.

Exemplary Condition 20
Same temperature is used for both calcining and pre-calcining steps; both calcining and pre-calcining steps are undertaken in air; duration of calcining is shorter than that of pre-calcining.

Exemplary Condition 21
Same temperature is used for both calcining and pre-calcining steps; calcining is undertaken in air and pre-calcining step is undertaken in reducing atmosphere; duration of calcining is longer than that of pre-calcining.

Exemplary Condition 22
Same temperature is used for both calcining and pre-calcining steps; calcining is undertaken in air and pre-calcining step is undertaken in reducing atmosphere; duration of calcining is shorter than that of pre-calcining.

Exemplary Condition 23
Same temperature is used for both calcining and pre-calcining steps; calcining is undertaken in air, pre-calcining is undertaken in the inert atmosphere; duration of calcining is longer than that of pre-calcining.

Exemplary Condition 24

Same temperature is used for both calcining and pre-calcining steps; calcining is undertaken in air, pre-calcining is undertaken in the inert atmosphere; duration of calcining is shorter than that of pre-calcining.

The various exemplary process conditions above are provided for the purpose of illustration and therefore are not limiting. It is to be understood that when the calcining and pre-calcining steps are undertaken under substantially similar conditions (at least similar temperature, gas and duration), both steps may therefore be regarded as one single step i.e. calcining step or the method for preparing the metal oxide nanosheets proceeds in the absence of the pre-calcining step.

The temperature used in the calcining step or pre-calcining step as defined above may be constant throughout the calcining process, varied or ramped continuously or intermittently throughout the calcining process. When the temperature ramp is intermittent, the calcining step may have one or more intermediate temperatures that is, the temperature at which it is held constant for a period of time. The temperature ramp as described here may refer to the increase or decrease in temperature over a period of time. In the present disclosure, if one temperature is indicated in the process conditions, it then suggests that the calcining or pre-calcining step is undertaken at a constant temperature, unless otherwise stated.

The formation of the metal oxide nanosheets during calcination may be confined to the surface of the template. Hence, when the graphene oxide (GO) is used as the template, the formation of the metal oxide nanosheets during calcination is confined to the surface of GO thereby directing the planar growth of metal oxide into the sheet morphology.

As previously mentioned, the method of preparing the metal oxide nanosheets as defined herein may not require the use of additional steps such as subjecting the mixture of metal oxide precursor and template to a solvothermal or hydrothermal reaction. Therefore, advantageously the method described herein may proceed via a one-pot reaction and may not require the use of an autoclave. When an autoclave is used, typically the metal oxide forms first when bonded to the template. Hence, the autoclave serves to convert the metal oxide precursor to the metal oxide, followed by a second step of calcination to remove the template from the metal oxide-bonded template. This minimally is a two-step reaction. Conversely, the present disclosure shortens the reaction by having a one-pot reaction in which the metal-oxide precursor when bonded to the template, that is the metal oxide precursor-bonded template, is calcined to achieve both formation of metal oxide nanosheets and removal of the template in the same step.

A (layered) binary oxide may be produced by the method defined above, when one transition metal oxide precursor is mixed with a template. Such (layered) binary oxide may also refer to binary oxide nanosheets as the thickness of the layer of the metal oxide is within the nanometer range (refer to next section). Hence, the two terms above may be used interchangeably throughout the disclosure.

The method as described above may further comprise the step of adding a doping agent or dopant or one or more metal oxide precursor. If a doping agent is added, such that the produced oxide adopts the same crystal structure of the binary oxide of the first metal, the layered metal oxide produced is referred as a (layered) doped binary oxide or doped binary oxide nanosheets or doped metal oxide nanosheets. However, when a second metal oxide precursor is added, such that a ternary oxide phase is produced, the layered metal oxide produced is referred to a (layered) ternary oxide or ternary oxide nanosheets. Further addition of a third metal oxide precursor, which is different from the first and second metal oxide precursor, may result in the formation of quaternary oxide nanosheets or a layered quaternary oxide. It is to be understood that the second and third metal oxide precursor comprise different metal element as compared to the first metal oxide precursor.

To further distinguish the formation of the doped binary oxide nanosheets and ternary oxide nanosheets, the following may be referred to: when a second metal oxide precursor is added, such that the metal oxide product has the same phase of the metal oxide of the first metal, with the second metal doped within, the resulting metal oxide is then termed as doped binary oxide. However, when a second metal oxide precursor is added, such that the metal oxide product forms a new oxide phase comprising both first and second metals, then the metal oxide is termed as ternary oxide.

The doping agent used as above may be a transition metal precursor. The transition metal element of the transition metal precursor may be different with that in the first transition metal oxide precursor. The transition metal of the doping agent may be selected from the groups in the Periodic Table of Elements as defined above. Said doping agent may be added in a suitable doping ratio (i.e. ratio of the amount of the transition metal element in the doping agent based on the total amount of the transition metal element in the metal oxide precursor. Total amount here refers to the amount of the transition metal element in the doping agent or dopant and that of the transition metal element in the transition metal oxide precursor being doped).

The doping ratio may be in the range of about 0.01 to 0.5, about 0.01 to 0.02, about 0.01 to 0.075, about 0.01 to 0.1, about 0.01 to 0.15, about 0.01 to 0.2, about 0.01 to 0.25, about 0.01 to 0.3, about 0.01 to 0.35, about 0.01 to 0.4, about 0.01 to 0.45, about 0.02 to 0.04, about 0.02 to 0.075, about 0.02 to 0.1, about 0.02 to 0.15, about 0.02 to 0.2, about 0.02 to 0.25, about 0.02 to 0.3, about 0.02 to 0.35, about 0.02 to 0.4, about 0.02 to 0.45, about 0.02 to 0.5, about 0.075 to 0.1, about 0.075 to 0.15, about 0.075 to 0.2, about 0.075 to 0.25, about 0.075 to 0.3, about 0.075 to 0.35, about 0.075 to 0.4, about 0.075 to 0.45, about 0.075 to 0.5, about 0.1 to 0.12, about 0.1 to 0.15, about 0.1 to 0.18, about 0.1 to 0.2, about 0.1 to 0.23, about 0.1 to 0.25, about 0.1 to 0.3, about 0.1 to 0.35, about 0.1 to 0.4, about 0.1 to 0.45, about 0.1 to 0.5, about 0.15 to 0.18, about 0.15 to 0.2, about 0.15 to 0.23, about 0.15 to 0.25, about 0.15 to 0.3, about 0.15 to 0.35, about 0.15 to 0.4, about 0.15 to 0.45, about 0.15 to 0.5, about 0.2 to 0.25, about 0.2 to 0.3, about 0.2 to 0.35, about 0.2 to 0.4, about 0.2 to 0.45, about 0.2 to 0.5, about 0.25 to 0.3, about 0.25 to 0.35, about 0.25 to 0.4, about 0.25 to 0.45, about 0.25 to 0.5, about 0.3 to 0.35, about 0.3 to 0.4, about 0.3 to 0.45, about 0.3 to 0.5, about 0.35 to 0.4, about 0.35 to 0.45, about 0.35 to 0.5, about 0.4 to 0.45, about 0.4 to 0.5, or about 0.45 to 0.5.

The doped metal oxide nanosheets above may adopt the crystal structure of the host metal oxide. When the doped metal oxide nanosheets adopt the crystal structure of the host metal oxide, a new phase of crystal (or new crystal structure) may not be observed. This may indicate that the insertion of the doping agent may not alter the crystal structure of the host metal oxide, thereby suggesting that the ionic radius of the metal in the host metal may be similar to that of the metal in the doping agent. However, when the doping agent comprises the metal precursor with a larger or smaller ionic radius of the metal is used, the crystal structure of the doped metal oxide may undergo minor changes due to lattice expansion or contraction. If a larger ionic radius of the metal in the doping agent is used, the lattice of the doped metal oxide nanosheets may be expanded. Conversely, if a smaller ionic radius of the metal is used, the lattice of the doped metal oxide nanosheets may be contracted. Therefore, it can be concluded that if there is no new phase or new crystal structure is formed, albeit minor changes in the crystal structure of the doped metal oxide upon adding the doping agent, the resulting nanosheets are referred to doped binary oxide nanosheets.

In view of the above, the present disclosure thus provides a method for preparing the doped binary oxide nanosheets as defined herein that may comprise the steps of:

a) mixing a template as defined herein with first and second metal oxide precursor to form a doped metal oxide precursor-bonded template;

b) calcining the doped metal oxide precursor-bonded template obtained in step a) to form the doped binary oxide nanosheets.

It is to be understood that the template and the metal oxides of step a) are as defined in the previous section of the present disclosure. Further, the method above may also comprise the pre-calcining step as defined above.

As stated above, when the second metal oxide precursor is added and a new crystal structure is formed, the layered metal oxide produced is referred to (layered) ternary oxide or ternary oxide nanosheets. The newly formed crystal structure of the ternary oxide nanosheets above may be different from the crystal structure of the binary metal oxide nanosheets of the first or second metal oxide. The first and second metal oxide precursors may be mixed in accordance with a suitable precursor atomic ratio. The precursor atomic ratio defined herein may be in the range of 1:20 to 20:1, 1:20 to 1:1, 1:20 to 2:1, 1:20 to 5:1, 1:20 to 10:1, 1:10 to 1:1, 1:10 to 2:1, 1:10 to 5:1, 1:10 to 10:1, 1:10 to 20:1, 1:5 to 1:1, 1:5 to 2:1, 1:5 to 5:1, 1:5 to 10:1, 1:5 to 20:1, 1:2 to 1:1, 1:2 to 2:1, 1:2 to 5:1, 1:2 to 10:1, 1:2 to 20:1, 1:1 to 2:1, 1:1 to 5:1, 1:1 to 10:1, 1:1 to 20:1, 2:1 to 5:1, 2:1 to 10:1, 2:1 to 20:1, 5:1 to 10:1, 5:1 to 20:1 or 10:1 to 20:1.

When the two metal oxide precursors comprise Nb and Ti, a Ti:Nb precursor atomic ratio of 33:67 may be used. This precursor atomic ratio may vary depending on the first and second transition metal used. For example, for ternary oxide $Ni_xCo_{3-x}O_4$, it may be obtained with different x values in the range of 0.01 to 1.5, 0.01 to 0.05, 0.01 to 0.1, 0.1, 0.01 to 0.2, 0.01 to 0.3, 0.01 to 0.4, 0.01 to 0.6, 0.01 to 0.8, 0.01 to 1, 0.05 to 0.1, 0.1 to 0.2, 0.2 to 0.3, 0.3 to 0.4, 0.4 to 0.6, 0.6 to 0.8, 0.8 to 1, 1 to 1.2 or 1.2 to 1.5. The preferred x values for $Ni_xCo_{3-x}O_4$ nanosheets may be 0.22, 0.54, 0.83, or 1.29. While for $Mn_xCo_{3-x}O_4$ nanosheets, they may be synthesized with different x values in the range of 0.01 to 2.5, 0.01 to 0.2, 0.01 to 0.5, 0.01 to 1, 0.01 to 1.5, 0.01 to 2,0.2 to 0.5, 0.2 to 1, 0.2 to 1.5, 0.2 to 2, 0.2 to 2.5, 0.5 to 1, 0.5 to 1.5, 0.5 to 2, 0.5 to 2.5, 1 to 1.5, 1 to 2, 1 to 2.5, 1.5 to 2, 1.5 to 2.5, or 2 to 2.5. The preferred x values for $Mn_xCo_{3-x}O_4$ nanosheets may be 1.08, 1.58, 1.88 and 2.10. The first two x values (x values of 1.08 and 1.58) may result in nanosheets with $MnCo_2O_4$ phase; whereas, the latter two x values (x values of 1.88 and 2.10) may lead to $CoMn_2O_4$ phase.

Therefore, the present disclosure also provides a method for preparing the ternary oxide nanosheets as defined herein that may comprise the steps of:

a) mixing a template as defined herein with first and second metal oxide precursor to form a ternary metal oxide precursor-bonded template;

b) calcining the ternary metal oxide precursor-bonded template obtained in step a) to form the ternary oxide nanosheets.

It is to be understood that the template and the metal oxides of step a) are as defined in the previous section of the present disclosure. Further, the method above may also comprise the pre-calcining step as defined herein.

The metal oxide nanosheets prepared according to the method described above may comprise a wide variety of binary oxides consisting the group selected from $Nb_2O_5$, $TiO_2$, $Fe_2O_3$, $SnO_2$, NiO, $Co_3O_4$, $Mn_3O_4$ and $ZrO_2$ or doped binary oxides (for example Ti—$Nb_2O_5$ and Nb—$TiO_2$), or ternary oxides selected from the group consisting of $TiNb_2O_7$, $Ti_{0.61}Nb_{1.29}O_4$, $Ni_xCO_{3-x}O_4$, $Mn_xCo_{3-x}O_4$ and $Co_xMn_{3-x}O_4$.

Exemplary, non-limiting embodiments of metal oxide nanosheets, will now be disclosed.

The metal oxide nanosheets synthesized defined herein may have a thickness in the range of about 0.5 nm to 10 nm, about 0.5 nm to 1 nm, about 0.5 nm to 2 nm, about 0.5 nm to 3 nm, about 0.5 nm to 4 nm, about 0.5 nm to 5 nm, about 0.5 nm to 7 nm, about 0.5 nm to 9 nm, about 1 nm to 2 nm, about 1 nm to 3 nm, about 1 nm to 4 nm, about 1 nm to 5 nm, about 1 nm to 7 nm, about 1 nm to 9 nm, about 1 nm to 10 nm, about 2 nm to 3 nm, about 2 nm to 4 nm, about 2 nm to 5 nm, about 2 nm to 7 nm, about 2 nm to 9 nm, about 2 nm to 10 nm, about 3 nm to 4 nm, about 3 nm to 5 nm, about 3 nm to 7 nm, about 3 nm to 9 nm, about 3 nm to 10 nm, about 4 nm to 5 nm, about 4 nm to 7 nm, about 4 nm to 9 nm, about 4 nm to 10 nm, about 5 nm to 7 nm, about 5 nm to 9 nm, about 5 nm to 10 nm, about 7 nm to 9 nm, about 7 nm to 10 nm, or about 9 nm to 10 nm.

The metal oxide nanosheets having the range of thickness above may refer to binary oxide nanosheets, doped binary oxide nanosheets, ternary oxide nanosheets or quaternary oxide nanosheets. Since the metal oxide precursor as defined above may be a transition metal precursor, the resulting metal oxide nanosheets may therefore be transition metal oxide nanosheets. Accordingly, these transition metal oxide nanosheets may refer to binary oxide nanosheets, doped binary oxide nanosheets, ternary oxide nanosheets or quaternary oxide nanosheets.

The thickness of the metal oxide nanosheets as defined above may be determined by a suitable method or instrument known in the art such as a microscopy or imaging technique. Non-limiting examples of such microscopic analysis include atomic-force microscopy (AFM), transmission electron microscopy (TEM) and scanning electron microscopy (SEM).

The metal oxide nanosheets as defined herein may be amorphous, crystalline or combinations thereof. When the metal oxide nanosheets as defined above are crystalline, the crystal family (or crystalline phase) or the lattice system is selected from the group consisting of triclinic, monoclinic, orthorhombic, tetragonal, hexagonal (including rhombohedral and hexagonal), cubic and combinations thereof. The existence of one or more crystal family obtained from the method described herein may be referred to polymorphism. Therefore, the metal oxide nanosheets produced via the method described above may be in their polymorphic form.

The metal oxide nanosheets as defined herein may be porous or mesoporous. When the metal oxide nanosheets are mesoporous, they may have a disordered or ordered mesostructure. The pore size and the structure of the metal oxide nanosheets may be altered by the nature of the metal oxide precursor used and the calcining conditions.

The metal oxide nanosheets as defined herein may have a crystallite size in the range of about 3 nm to 100 nm, about 3 nm to 5 nm, about 3 nm to 10 nm, about 3 nm to 15 nm, about 3 nm to 20 nm, about 3 nm to 25 nm, about 3 nm to 30 nm, about 3 nm to 35 nm, about 3 nm to 40 nm, about 3 nm to 50 nm, about 3 nm to 70 nm, about 3 nm to 90 nm, about 3 nm to 100 nm, about 5 nm to 10 nm, about 5 nm to 15 nm, about 5 nm to 20 nm, about 5 nm to 25 nm, about 5 nm to 30 nm, about 5 nm to 35 nm, about 5 nm to 40 nm, about 5 nm to 50 nm, about 5 nm to 70 nm, about 5 nm to 90 nm, about 5 nm to 100 nm, about 10 nm to 15 nm, about 10 nm to 20 nm, about 10 nm to 25 nm, about 10 nm to 30 nm, about 10 nm to 35 nm, about 10 nm to 40 nm, about 10 nm to 50 nm, about 10 nm to 70 nm, about 10 nm to 90 nm, about 10 nm to 100 nm, about 15 nm to 20 nm, about 15 nm to 25 nm, about 15 nm to 30 nm, about 15 nm to 35 nm, about 15 nm to 40 nm, about 15 nm to 50 nm, about 15 nm to 70 nm, about 15 nm to 90 nm, about 15 nm to 100 nm, about 20 nm to 25 nm, about 20 nm to 30 nm, about 20 nm to 35 nm, about 20 nm to 40 nm, about 20 nm to 45 nm, about 20 nm to 50 nm, about 20 nm to 70 nm, about 20 nm to 90 nm, about 20 nm to 100 nm, about 25 nm to 30 nm, about 25 nm to 35 nm, about 25 nm to 40 nm, about 25 nm to 50 nm, about 25 nm to 70 nm, about 25 nm to 90 nm, about 25 nm to 100 nm, about 30 nm to 35 nm, about 30 nm to 40 nm, about 30 nm to 50 nm, about 30 nm to 70 nm, about 30 nm to 90 nm, about 30 nm to 100 nm, about 35 nm to 40 nm, about 35 nm to 50 nm, about 35 nm to 70 nm, about 35 nm to 90 nm, about 35 nm to 100 nm, about 40 nm to 50 nm, about 40 nm to 70 nm, about 40 nm to 90 nm, about 40 nm to 100 nm, about 50 nm to 70 nm, about 50 nm to 90 nm, about 50 nm to 100 nm, about 70 nm to 90 nm, about 70 nm to 100 nm, or about 90 nm to 100 nm.

The metal oxide nanosheets as defined herein may have a Brunauer-Emmett-Teller (BET) surface area in the range of about 15 $m^2/g$ to 350 $m^2/g$, about 15 $m^2/g$ to 25 $m^2/g$, about 15 $m^2/g$ to 50 $m^2/g$, about 15 $m^2/g$ to 75 $m^2/g$, about 15 $m^2/g$ to 100 $m^2/g$, about 15 $m^2/g$ to 125 $m^2/g$, about 15 $m^2/g$ to 150 $m^2/g$, about 15 $m^2/g$ to 200 $m^2/g$, about 15 $m^2/g$ to 250 $m^2/g$, about 15 $m^2/g$ to 300 $m^2/g$, about 25 $m^2/g$ to 50 $m^2/g$, about 25 $m^2/g$ to 75 $m^2/g$, about 25 $m^2/g$ to 100 $m^2/g$, about 25 $m^2/g$ to 125 $m^2/g$, about 25 $m^2/g$ to 150 $m^2/g$, about 25 $m^2/g$ to 200 $m^2/g$, about 25 $m^2/g$ to 250 $m^2/g$, about 25 $m^2/g$ to 300 $m^2/g$, about 25 $m^2/g$ to 350 $m^2/g$, about 50 $m^2/g$ to 75 $m^2/g$, about 50 $m^2/g$ to 100 $m^2/g$, about 50 $m^2/g$ to 125 $m^2/g$, about 50 $m^2/g$ to 150 $m^2/g$, about 50 $m^2/g$ to 200 $m^2/g$, about 50 $m^2/g$ to 250 $m^2/g$, about 50 $m^2/g$ to 300 $m^2/g$, about 50 $m^2/g$ to 350 $m^2/g$, about 75 $m^2/g$ to 100 $m^2/g$, about 75 $m^2/g$ to 125 $m^2/g$, about 75 $m^2/g$ to 150 $m^2/g$, about 75 $m^2/g$ to 200 $m^2/g$, about 75 $m^2/g$ to 250 $m^2/g$, about 75 $m^2/g$ to 300 $m^2/g$, about 75 $m^2/g$ to 350 $m^2/g$, about 100 $m^2/g$ to 125 $m^2/g$, about 100 $m^2/g$ to 150 $m^2/g$, about 100 $m^2/g$ to 200 $m^2/g$, about 100 $m^2/g$ to 250 $m^2/g$, about 100 $m^2/g$ to 300 $m^2/g$, about 100 $m^2/g$ to 350 $m^2/g$, about 125 $m^2/g$ to 150 $m^2/g$, about 125 $m^2/g$ to 200 $m^2/g$, about 125 $m^2/g$ to 250 $m^2/g$, about 125 $m^2/g$ to 300 $m^2/g$, about 125 $m^2/g$ to 350 $m^2/g$, about 150 $m^2/g$ to 200 $m^2/g$, about 150 $m^2/g$ to 250 $m^2/g$, about 150 $m^2/g$ to 300 $m^2/g$, about 150 $m^2/g$ to 350 $m^2/g$, about 200 $m^2/g$ to 300 $m^2/g$, about 200 $m^2/g$ to 350 $m^2/g$, about 250 $m^2/g$ to 300 $m^2/g$, about 250 $m^2/g$ to 350 $m^2/g$, or about 300 $m^2/g$ to 350 $m^2/g$.

The metal oxide nanosheets defined herein may be prepared or synthesized using the method for preparing the metal oxide nanosheets as defined above. Such method comprises the steps of:

a) mixing a template with at least one metal oxide precursor to form a metal oxide precursor-bonded template;

b) calcining the metal oxide precursor-bonded template obtained in step a) to form the metal oxide nanosheets; wherein the synthesis conditions may be similar to or adapted from the method described above.

The thickness of the metal oxide nanosheets prepared by the method above may be determined by a suitable method or instrument known in the art such as a microscopy or imaging technique. Non-limiting examples of such microscopic analysis include atomic-force microscopy (AFM), transmission electron microscopy (TEM) and scanning electron microscopy (SEM).

The metal oxide nanosheets prepared using the above method may be amorphous, crystalline or combinations thereof. When the metal oxide nanosheets as defined above are crystalline, the crystal family or the lattice system is selected from the group consisting of triclinic, monoclinic, orthorhombic, tetragonal, hexagonal (including rhombohedral and hexagonal), cubic and combinations thereof. The existence of one or more crystal family obtained from the method described herein may be referred to polymorphism. Therefore, the metal oxide nanosheets produced via the method described above may be in its polymorphic form.

The metal oxide nanosheets prepared according to the method as defined above may be porous or mesoporous. When the metal oxide nanosheets are mesoporous, they may have a disordered or ordered mesostructure. The pore size and the structure of the metal oxide nanosheets may be altered by the nature of the metal oxide precursor used and the calcining conditions.

Exemplary, non-limiting embodiments of a battery anode comprising metal oxide nanosheets comprising at least one transition metal, will now be disclosed.

In this disclosure, there is provided a battery anode comprising metal oxide nanosheets comprising at least one transition metal. The metal oxide nanosheets here may have a thickness in the range of about 0.5 nm to 10 nm, about 0.5 nm to 1 nm, about 0.5 nm to 2 nm, about 0.5 nm to 3 nm, about 0.5 nm to 4 nm, about 0.5 nm to 5 nm, about 0.5 nm to 7 nm, about 0.5 nm to 9 nm, about 1 nm to 2 nm, about 1 nm to 3 nm, about 1 nm to 4 nm, about 1 nm to 5 nm, about 1 nm to 7 nm, about 1 nm to 9 nm, about 1 nm to 10 nm, about 2 nm to 3 nm, about 2 nm to 4 nm, about 2 nm to 5 nm, about 2 nm to 7 nm, about 2 nm to 9 nm, about 2 nm to 10 nm, about 3 nm to 4 nm, about 3 nm to 5 nm, about 3 nm to 7 nm, about 3 nm to 9 nm, about 3 nm to 10 nm, about 4 nm to 5 nm, about 4 nm to 7 nm, about 4 nm to 9 nm, about 4 nm to 10 nm, about 5 nm to 7 nm, about 5 nm to 9 nm, about 5 nm to 10 nm, about 7 nm to 9 nm, about 7 nm to 10 nm, or about 9 nm to 10 nm.

The thickness of the metal oxide nanosheets comprising at least one metal oxide as defined above may be determined by a suitable method or instrument known in the art such as a microscopy or imaging technique. Non-limiting examples of such microscopic analysis include atomic-force microscopy (AFM), transmission electron microscopy (TEM) and scanning electron microscopy (SEM).

The metal oxide nanosheets having the range of thickness above may refer to binary oxide nanosheets, doped binary oxide nanosheets, ternary oxide nanosheets or quaternary oxide nanosheets. Since the metal oxide precursor as defined above may be a transition metal precursor, the resulting metal oxide nanosheets may therefore be transition metal oxide nanosheets. Accordingly, these transition metal oxide nanosheets may refer to binary oxide nanosheets, doped binary oxide nanosheets, ternary oxide nanosheets or quaternary oxide nanosheets.

The metal oxide nanosheets comprising at least one metal oxide as defined herein may be amorphous, crystalline or combinations thereof. When the metal oxide nanosheets as defined above are crystalline, the crystal family or the lattice system may be selected from the group consisting of triclinic, monoclinic, orthorhombic, tetragonal, hexagonal (including rhombohedral and hexagonal), cubic and combinations thereof. The existence of one or more crystal family obtained from the method described herein may be referred to polymorphism. Therefore, the metal oxide nanosheets produced via the method described above may be in their polymorphic form.

The metal oxide nanosheets as defined above may be porous or mesoporous. When the metal oxide nanosheets are mesoporous, they may have a disordered or ordered mesostructure. The pore size and the structure of the metal oxide nanosheets comprising at least one metal oxide as defined above may be altered by the nature of the metal oxide precursor used and the calcining conditions.

The layered metal oxide as defined herein may further comprise a template. The template may be similar to or different from the template as defined previously. Such template may be a two-dimensional carbonaceous material with surface functional groups such as graphene oxide (GO) and graphite oxide. The template as defined above may be a functionalized or a reduced template. When graphene oxide (GO) is used as the template, the metal oxide nanosheets may comprise reduced graphene oxide (rGO). If graphite oxide is used as the template, the metal oxide nanosheets may comprise reduced graphite oxide.

The metal oxide nanosheets comprising at least one metal oxide may have a crystallite size in the range of about 3 nm to 100 nm, about 3 nm to 5 nm, about 3 nm to 10 nm, about 3 nm to 15 nm, about 3 nm to 20 nm, about 3 nm to 25 nm, about 3 nm to 30 nm, about 3 nm to 35 nm, about 3 nm to 40 nm, about 3 nm to 50 nm, about 3 nm to 70 nm, about 3 nm to 90 nm, about 5 nm to 10 nm, about 5 nm to 15 nm, about 5 nm to 20 nm, about 5 nm to 25 nm, about 5 nm to 30 nm, about 5 nm to 35 nm, about 5 nm to 40 nm, about 5 nm to 50 nm, about 5 nm to 70 nm, about 5 nm to 90 nm, about 5 nm to 100 nm, about 10 nm to 15 nm, about 10 nm to 20 nm, about 10 nm to 25 nm, about 10 nm to 30 nm, about 10 nm to 35 nm, about 10 nm to 40 nm, about 10 nm to 50 nm, about 10 nm to 70 nm, about 10 nm to 90 nm, about 10 nm to 100 nm, about 15 nm to 20 nm, about 15 nm to 25 nm, about 15 nm to 30 nm, about 15 nm to 35 nm, about 15 nm to 40 nm, about 15 nm to 50 nm, about 15 nm to 70 nm, about 15 nm to 90 nm, about 15 nm to 100 nm, about 20 nm to 25 nm, about 20 nm to 30 nm, about 20 nm to 35 nm, about 20 nm to 40 nm, about 20 nm to 50 nm, about 20 nm to 70 nm, about 20 nm to 90 nm, about 20 nm to 100 nm, about 25 nm to 30 nm, about 25 nm to 35 nm, about 25 nm to 40 nm, about 25 nm to 50 nm, about 25 nm to 70 nm, about 25 nm to 90 nm, about 25 nm to 100 nm, about 30 nm to 35 nm, about 30 nm to 40 nm, about 30 nm to 50 nm, about 30 nm to 70 nm, about 30 nm to 90 nm, about 30 nm to 100 nm, about 35 nm to 40 nm, about 35 nm to 50 nm, about 35 nm to 70 nm, about 35 nm to 90 nm, about 35 nm to 100 nm, about 40 nm to 50 nm, about 40 nm to 70 nm, about 40 nm to 90 nm, about 40 nm to 100 nm, about 50 nm to 70 nm, about 50 nm to 90 nm, about 50 nm to 100 nm, about 70 nm to 90 nm, about 70 nm to 100 nm, or about 90 nm to 100 nm.

The metal oxide nanosheets comprising at least one metal oxide as defined herein may have a Brunauer-Emmett-Teller (BET) surface area in the range of about 15 $m^2/g$ to 350 $m^2/g$, about 15 $m^2/g$ to 25 $m^2/g$, about 15 $m^2/g$ to 50 $m^2/g$, about 15 $m^2/g$ to 75 $m^2/g$, about 15 $m^2/g$ to 100 $m^2/g$, about 15 $m^2/g$ to 125 $m^2/g$, about 15 $m^2/g$ to 150 $m^2/g$, about 15 $m^2/g$ to 200 $m^2/g$, about 15 $m^2/g$ to 250 $m^2/g$, about 15 $m^2/g$ to 300 $m^2/g$, about 25 $m^2/g$ to 50 $m^2/g$, about 25 $m^2/g$ to 75 $m^2/g$, about 25 $m^2/g$ to 100 $m^2/g$, about 25 $m^2/g$ to 125 $m^2/g$, about 25 $m^2/g$ to 150 $m^2/g$, about 25 $m^2/g$ to 200 $m^2/g$, about 25 $m^2/g$ to 250 $m^2/g$, about 25 $m^2/g$ to 300 $m^2/g$, about 25 $m^2/g$ to 350 $m^2/g$, about 50 $m^2/g$ to 75 $m^2/g$, about 50 $m^2/g$ to 100 $m^2/g$, about 50 $m^2/g$ to 125 $m^2/g$, about 50 $m^2/g$ to 150 $m^2/g$, about 50 $m^2/g$ to 200 $m^2/g$, about 50 $m^2/g$ to 250 $m^2/g$, about 50 $m^2/g$ to 300 $m^2/g$, about 50 $m^2/g$ to 350 $m^2/g$, about 75 $m^2/g$ to 100 $m^2/g$, about 75 $m^2/g$ to 125 $m^2/g$, about 75 $m^2/g$ to 150 $m^2/g$, about 75 $m^2/g$ to 200 $m^2/g$, about 75 $m^2/g$ to 250 $m^2/g$, about 75 $m^2/g$ to 300 $m^2/g$, about 75 $m^2/g$ to 350 $m^2/g$, about 100 $m^2/g$ to 125 $m^2/g$, about 100 $m^2/g$ to 150 $m^2/g$, about 100 $m^2/g$ to 200 $m^2/g$, about 100 $m^2/g$ to 250 $m^2/g$, about 100 $m^2/g$ to 300 $m^2/g$, about 100 $m^2/g$ to 350 $m^2/g$, about 125 $m^2/g$ to 150 $m^2/g$, about 125 $m^2/g$ to 200 $m^2/g$, about 125 $m^2/g$ to 250 $m^2/g$, about 125 $m^2/g$ to 300 $m^2/g$, about 125 $m^2/g$ to 350 $m^2/g$, about 150 $m^2/g$ to 200 $m^2/g$, about 150 $m^2/g$ to 250 $m^2/g$, about 150 $m^2/g$ to 300 $m^2/g$, about 150 $m^2/g$ to 350 $m^2/g$, about 200 $m^2/g$ to 250 $m^2/g$, about 200 $m^2/g$ to 300 $m^2/g$, about 200 $m^2/g$ to 350 $m^2/g$, about 250 $m^2/g$ to 300 $m^2/g$, about 250 $m^2/g$ to 350 $m^2/g$, or about 300 $m^2/g$ to 350 $m^2/g$.

Exemplary, non-limiting embodiments of a method for preparing the battery anode comprising metal oxide nanosheets comprising at least one transition metal, will now be disclosed.

The battery anode comprising metal oxide nanosheets comprising at least one transition metal defined herein may be prepared or synthesized using the method comprising the steps of:

a) mixing a template with at least one metal oxide precursor to form a metal oxide precursor-bonded template;

b) calcining the metal oxide precursor-bonded template obtained in step a) to form the metal oxide nanosheets;

c) mixing the layered metal oxide obtained in step b) with at least one inert material and a solvent to form a slurry; and d) coating the slurry obtained in step c) on a support thereby forming the battery anode;

Steps a) and b) of the method above may be similar to those as described in the previous section i.e. method for preparing the metal oxide nanosheets.

The metal oxide precursor used in the method above may be a transition metal oxide precursor. Non-limiting examples of the transition metal oxide precursor are provided in the previous section.

The metal oxide nanosheets used for preparing the battery anode here may refer to binary oxide nanosheets, doped binary oxide nanosheets, ternary oxide nanosheets or quaternary oxide nanosheets as defined in the previous section. Since the metal oxide precursor as defined above may be a transition metal precursor, the resulting metal oxide nanosheets may therefore be transition metal oxide nanosheets. Accordingly, these transition metal oxide nanosheets may refer to binary oxide nanosheets, doped binary oxide nanosheets, ternary oxide nanosheets or quaternary oxide nanosheets.

The properties of the metal oxide nanosheets used for preparing the battery anode may be similar to those of the previously disclosed metal oxide nanosheets including the thickness of the nanosheets, crystallinity, porous or mesoporous characteristics, crystallite size and Brunauer-Emmett-Teller (BET) surface area.

As stated above, the calcining step may remove the template partially or completely. For the metal oxide nanosheets where the removal of the template is complete, the metal oxide nanosheets may be further incorporated with a conductive two-dimensional carbonaceous material such as graphene using graphene oxide as a precursor.

When graphene oxide is used, such graphene oxide may be functionalized using a polyionic compound. In this case, the polyionic compound may be positively charged. An example of polyionic compound is poly(diallyldimethylammonium chloride) (PDDA). In the method to prepare the metal oxide/GO, an amount of graphene oxide may be dispersed in a solvent as defined above. The dispersion may involve ultrasonicating the mixture. Next, a salt may be added to the resulting dispersion, followed by the addition of PDDA. The mixture may be further mixed continuously, washed and dried. The positively charged GO-PDDA may be mixed with negatively charged metal oxide nanosheets to form a composite. The composite may then be washed, dried and calcined. The method described above may refer to "opposite-charged method" since the positively charged (functionalized) graphene oxide is incorporated to the negatively charged metal oxide and therefore this method relies on the electrostatic attraction (or coulombic forces).

The mixing step c) above involves the mixing of the metal oxide nanosheets obtained in step b) with at least one inert material and a solvent to form a slurry. Such inert material may be selected from vapor-grown carbon fibers (VGCFs) and polyvinylidene fluoride (PVDF) dispersed in a solvent or a mixture of solvents. The vapor-grown carbon fibers (VGCFs) and polyvinylidene fluoride (PVDF) may be used concurrently as the inert material. When they are used together, the ratio of active material:VGCFs:PVDF may be 7:2:1. The solvent used are defined as above.

Next, the coating step d) may involve coating the slurry obtained in step c) on a support thereby forming the battery anode. Upon the completion of coating step, the battery anode above may be dried and pressed. The battery anode may be then used in an electrochemical cell assembly to evaluate the performance of the anode material. In the electrochemical cell assembly above, the cell may comprise a counter electrode and an electrolyte. When Li metal is used as the counter electrode, 1 M $LiPF_6$ in ethylene carbonate and diethyl carbonate (1:1) may be used as the electrolyte. The galvanostatic charge-discharge measurements may be then performed at a voltage in the range of 0.005 to 3 Volts.

The battery anode comprising the metal oxide nanosheets having the characteristics as defined above may relatively have a high capacity, stability and/or rate capability. The high capacity and rate capability achieved by the battery anode comprising the metal oxide nanosheets may be attributed to the nanosheet or layered structure, whose small thickness may facilitate $Li^+$ and electron transport, and improve the contact with electrolyte. The micron-sized lateral dimensions of the metal oxide nanosheets as defined herein may provide continuous charge-transfer path, thus improving rate capability, and may help to sustain structural integrity over cycling.

For some of the metal oxides of the battery anode as defined in the present disclosure, in particular the transition metal oxides, such transition metal oxide may store $Li^+$ by intercalation, conversion and/or alloying-dealloying mechanisms. The presence of relatively large residual template such as reduced graphene oxide (rGO) content may be essential for good performance of the battery anode. The residual template may serve as a conductive support that prevents disconnection from the current collector, and as a buffer against the severe volume change during cycling. The battery anode as defined herein may show an activation step, whereby an initial capacity decline is followed by an increase in capacity over cycling.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1

FIG. 1 is a number of images and curves related to characterization of $Nb_2O_5$ nanosheets prepared according to Example 1a. FIG. 1a is the transmission electron microscopy (TEM) image and selected area electron diffraction (SAED) pattern (inset) of $Nb_2O_5$ nanosheets obtained after calcination in air at 500° C./one hour; FIG. 1b is the TEM image and SAED pattern (inset) of $Nb_2O_5$ nanosheets obtained after calcination in air at 550° C./3 hours; FIG. 1c shows the TEM image and SAED pattern (inset) of $Nb_2O_5$ nanosheets obtained after calcination in air at 600° C./one hour. FIGS. 1d-1f show the high-resolution TEM (HRTEM) images of $Nb_2O_5$ nanosheets obtained after calcination in air at 500° C./one hour, 550° C./3 hours and 600° C./one hour, respectively. FIG. 1g depicts the X-ray diffraction (XRD) patterns. FIG. 1h describes the thermal gravimetric analysis (TGA) profiles of $Nb_2O_5$ nanosheets in air (ramp=2° C./min).

FIG. 2

FIG. 2a shows nitrogen adsorption-desorption isotherms and Barrett-Joyner-Halenda (BJH) pore size distribution curves (inset) of $Nb_2O_5$ nanosheets synthesized in air at 500° C./one hour and 550° C./3 hours as described in Example 1a. FIG. 2b describes the effect of increasing calcination temperature and duration on specific surface area and pore volume of the same samples as FIG. 2a.

FIG. 3

FIG. 3 is a number of images and graphs related to the characterization of $Nb_2O_5$ nanosheets synthesized using Nb-ethoxide according to Example 1b. FIGS. 3a-3d are the TEM images of the nanosheets obtained at different calcining temperatures, at 350° C./one hour (FIG. 3a), at 450° C./one hour (FIG. 3b), at 500° C./one hour (FIG. 3c), and at 600° C./one hour (FIG. 3d). FIG. 3e describes the atomic force microscopy (AFM) analysis of the same sample of nanosheets as FIG. 3c. FIG. 3f depicts the XRD patterns of nanosheets obtained according to Example 1b.

FIG. 4

FIG. 4 is a number of images and graphs related to characterization of $TiO_2$ nanosheets calcined in air for one hour according to Example 1c. FIGS. 4a-4c are the TEM images of the nanosheets calcined at different temperature, at 350° C. (FIG. 4a), at 500° C. (FIG. 4b), at 550° C. (FIG. 4c). FIG. 4e describes the XRD patterns of nanosheets calcined at different temperatures (at 350° C., 500° C. and 550° C.). FIG. 4d describes the HRTEM image of the nanosheets calcined at 500° C. Inset: SAED pattern. FIG. 4f depicts the nitrogen adsorption-desorption isotherms of the nanosheets calcined at 350° C. and 500° C. FIG. 4g shows the AFM analysis of nanosheets calcined at 500° C.

FIG. 5

FIG. 5 is a number of graphs and images related to characterization of doped binary oxide nanosheets as described in Example 2. FIGS. 5a and 5b show the XRD patterns of Ti-doped $Nb_2O_5$ and Nb-doped $TiO_2$ nanosheets at the specified doping levels. FIG. 5e shows the magnified (001) XRD peak in FIG. 5a. FIG. 5f shows the magnified (101) peak in FIG. 5b. FIGS. 5c and 5d are the TEM images of doped binary oxide nanosheets Ti—$Nb_2O_5$-0.02 and Nb—$TiO_2$-0.1, respectively; FIGS. 5g and 5h are the HRTEM images; FIGS. 5i and 5n are the X-ray photoelectron spectroscopy (XPS) Nb 3d spectra; FIGS. 5j and 5m are the XPS Ti 2p spectra; FIGS. 5k, 5l, 5o, and 5p are the energy dispersive X-ray spectroscopy (EDX) elemental maps of FIGS. 5c, 5g, 5i, 5m, 5k, 5o, 0.02 at % Ti-doped $Nb_2O_5$ and FIGS. 5d, 5h, 5j, 5n, 5l, 5p, 0.1 at % Nb-doped $TiO_2$ nanosheets.

FIG. 6

FIG. 6 is a number of images and graphs related to characterization of ternary nanosheets prepared according to Example 3. FIG. 6a is the TEM image of $TiNb_2O_7$ nanosheets, FIGS. 6c and 6d are the EDX elemental maps of $TiNb_2O_7$ nanosheets, FIG. 6g is the XRD pattern of $TiNb_2O_7$ nanosheets, FIG. 6i is the XPS Nb 3d spectrum of $TiNb_2O_7$ nanosheets and FIG. 6k is the XPS Ti 2p spectrum of $TiNb_2O_7$ nanosheets. FIG. 6b is the TEM image of $Ti_{0.61}Nb_{1.29}O_4$/rGO nanosheets, FIGS. 6e and 6f are the EDX elemental maps of $Ti_{0.61}Nb_{1.29}O_4$ nanosheets. Inset in FIG. 6b is the TEM image of $Ti_{0.61}Nb_{1.29}O_4$/rGO. FIG. 6h is the XRD patterns of $Ti_{0.61}Nb_{1.29}O_4$ and $Ti_{0.61}Nb_{1.29}O_4$/rGO nanosheets. FIG. 6j is the XPS Nb 3d spectrum of $Ti_{0.61}Nb_{1.29}O_4$/rGO nanosheets and FIG. 6l is the XPS Ti 2p spectrum of $Ti_{0.61}Nb_{1.29}O_4$/rGO nanosheets.

FIG. 7

FIG. 7 is a number of images and graphs related to characterization of a range of nanosheet materials synthesized according to Example 4. FIGS. 7a-7c, 7e-7g, 7i-7p are the TEM images of $Fe_2O_3$ (FIG. 7a), $SnO_2$ (FIG. 7b), NiO (FIG. 7c), $Co_3O_4$ (FIG. 7e), $Mn_3O_4$ (FIG. 7f), $ZrO_2$ (FIG. 7g), $Ni_xCo_{3-x}O_4$ (FIGS. 7i-7l), and $Mn_xCo_{3-x}O_4$ (FIGS. 7m-7p), nanosheets, respectively. FIGS. 7d, 7h, 7q, 7r are the XRD patterns of $Fe_2O_3$, $SnO_2$ and NiO (FIG. 7d), $Co_3O_4$, $Mn_3O_4$ and $ZrO_2$ (FIG. 7h), $Ni_xCo_{3-x}O_4$ (FIG. 7q) and $Mn_xCo_{3-x}O_4$ (FIG. 7r) nanosheets.

FIG. 8

FIG. 8 is a histogram for comparing the Zeta potential of GO, GO-PDDA, $Nb_2O_5$, $TiO_2$ and $TiNb_2O_7$ nanosheets. GO-PDDA was prepared according to Example 5.

FIG. 9

FIG. 9 is a number of images and graphs related to ex-situ analysis of $Nb_2O_5$ and $TiO_2$ nanosheets after cycling according to Example 6. FIG. 9a is the TEM image of $Nb_2O_5$ after the first discharge, FIG. 9b is the TEM image of $Nb_2O_5$ after the first charging, FIG. 9c, is the TEM image of $Nb_2O_5$ after 200 cycles. FIGS. 9d and 9e are the HRTEM images; FIG. 9f is the XRD patterns (Al refers to Al current collector, *indicates carbon additives peak) of $Nb_2O_5$ nanosheets after (FIGS. 9a, 9d, 9f) 1st discharge, (FIGS. 9b, 9e, 9f) 1st charge and (FIGS. 9c, 9f) 200 cycles. FIG. 9g, is the TEM image of $TiO_2$ after 200 cycles and FIG. 9h. shows the HRTEM image of sample FIG. 9g; FIG. 9i is the XRD patterns (Cu refers to Cu current collector, *indicates carbon additives peak, arrows indicate $TiO_2$ peaks) of $TiO_2$ nanosheets after 200 cycles.

FIG. 10

FIG. 10 is a number of graphs related to the cycling stability and rate capability of high-voltage-anode nanosheets according to Example 6. FIGS. 10a, 10b, 10e, 10f describe the cycling stability and FIGS. 10c, 10d, 10g, 10h show the rate capability of FIGS. 10a, 10c, pure and doped $Nb_2O_5$ (assuming 1 C =150 mA/g), FIGS. 10b, 10d pure and doped $TiO_2$ (assuming 1 C=168 mA/g), e, g, $TiNb_2O_7$ (assuming 1 C=387.6 mA/g) and FIGS. 10f, 10h $Ti_{0.61}Nb_{1.29}O_4$ nanosheets.

FIG. 11

FIG. 11 is a number of graphs related to the cycling stability and rate capability of high-capacity anodes according to Example 7. FIGS. 11a-11c, 11g-11i show the cycling stability and FIGS. 11d-11f, 11j-11l describe the rate capability of FIGS. 11a, 11d, iron oxide, FIGS. 11b, 11e, $SnO_2$, FIGS. 11c, 11f, NiO, FIGS. 11g, 11j, $Co_3O_4$, FIGS. 11h, 11k, $Ni_{1.29}Co_{1.71}O_4$ and FIGS. 11i, 11l, $Mn_{1.08}Co_{1.92}O_4$ nanosheets.

EXAMPLES

Non-limiting examples of the invention and a comparative example will be further described in greater detail by reference to specific Examples, which should not be construed as in any way limiting the scope of the invention.

Example 1: Synthesis of Binary Oxide

1a. Preparation of $Nb_2O_5$ Nanosheets Using $NbCl_5$ as Precursor

In the synthesis of $Nb_2O_5$ as the binary oxide, metal oxide precursor $NbCl_5$ (purchased from Sigma-Aldrich of Saint Louis, Mo. of the United States of America) was thoroughly mixed with graphene oxide (GO) dispersion and washed, leaving only those strongly bonded to GO surface. The $NbCl_5$-bonded GO was pre-calcined in Ar for 2 hours at 550° C., and then calcined in a temperature range of 500-600° C. in air to remove the template and form the nanosheets simultaneously. $Nb_2O_5$ synthesized herein was used to demonstrate the synthetic process and the tunability of the nanosheets' attributes.

FIGS. 1a-1c illustrate the transmission electron microscopy (TEM) images of the $Nb_2O_5$ nanosheets synthesized at different temperature i.e. at 500° C. for one hour, at 550° C. for 3 hours and at 600° C. for one hour, respectively. The nanosheets were mesoporous structures that were composed of interconnected primary nanoparticles, as revealed by high-resolution TEM (HRTEM) as shown in FIGS. 1d-f. The crystal structures were determined to be orthorhombic $Nb_2O_5$ (JCPDS #00-030-0873) by X-ray diffraction (XRD) (refer to FIG. 1g).

The nanosheet crystallinity, crystallite size, surface area, porosity and reduced graphene oxide (rGO) content were modified by varying the calcination temperature and duration. At a lower calcination temperature and a shorter calcination duration (500° C. and one hour), weakly crystalline nanosheets were obtained, as revealed by HRTEM FIG. 1d, selected area electron diffraction (SAED) FIG. 1a (inset) and XRD FIG. 1g (graph labelled as 500° C./one hour).

As calcination temperature and duration increased, crystallinity increased as shown by XRD FIG. 1g (graph labelled as 550° C./3 hours), and the crystallites grew in size, as observed in HRTEM images (refer to FIGS. 1e and 1f). This was accompanied by a decreased Brunauer-Emmett-Teller (BET) specific surface area and increased porosity as a result of particle coarsening (refer to FIGS. 2a and 2b, respectively). The growth of the nanocrystallites along [001] direction increased with calcination temperature and duration, as demonstrated by HRTEM as shown in FIGS. 1d-f. This was confirmed by the increase in (001)/(180) XRD peak intensity ratio from 0.74 to 0.77 and 0.93, as calcination temperature/duration increased from 500° C./one hour to 550° C./3 hours and 600° C./one hour, respectively (refer to FIG. 1g). This enhanced $Nb_2O_5$'s performance as Li-ion battery anode since $Li^+$ ions were expected to move freely along the natural tunnels between (001) planes.

The GO template was not completely removed by calcination. Residual rGO of 44.7 wt %, 29.0 wt % and 17.0 wt % was detected for samples calcined at 500° C./1 h, 550° C./3 h and 600° C./1 h, respectively (FIG. 1h). The residual rGO was also detected as a characteristic XRD peak at $2\theta=26.6°$, the intensity of which decreased as calcination temperature/duration increased.

1b. Preparation of $Nb_2O_5$ Nanosheets Using Niobium (V) Ethoxide as Precursor

Nanosheets of $Nb_2O_5$ metal oxides can also be produced with different types of precursors following similar procedure as described in example 1a above, except that different metal oxide precursor and/or the calcination temperature was used and no pre-calcination was employed. For example, using niobium (V) ethoxide (Nb-eth) (purchased from Sigma-Aldrich of Saint Louis, Mo. of the United States of America) as precursor, $Nb_2O_5$ nanosheets were also obtained, as confirmed by TEM (refer to FIGS. 3a-3d).

The experimental results suggest that the nanosheets' crystallinity can be controlled by calcination temperature. $Nb_2O_5$ nanosheets were amorphous when calcination temperatures of <500° C. were used, and they were crystalline when calcined at ≥500° C. as shown by XRD patters in FIG. 3f. Compared to $NbCl_5$ precursor as shown in example 1a above, synthesis with Nb-eth precursor yielded $Nb_2O_5$ nanosheets with almost 4-fold increase in weight (refer to FIG. 3f). The higher yield was probably due to a better interaction between the alkoxide precursor and GO. The thickness of $Nb_2O_5$ nanosheets was determined to be about 2 nm by atomic force microscopy (AFM) (refer to FIG. 3e), demonstrating the effectiveness of our strategy to derive ultrathin metal oxide nanosheets.

1c. Preparation of $TiO_2$ nanosheets using Ti(IV) butoxide as precursor $TiO_2$ nanosheets were also obtained using the GO planar-confined growth method similar to examples 1a and 1b.

$TiO_2$ nanosheets were synthesized using GO template and Ti(IV) butoxide (purchased from Sigma-Aldrich of Saint Louis, Mo. of the United States of America) as precursor, followed by calcination in air. The nanosheet structure is shown by TEM images (refer to FIGS. 4a-4c). $TiO_2$ nanosheets adopted anatase crystal structure (JCPDS #00-021-1272), as shown by XRD (FIG. 4e). SAED pattern (FIG. 4d: inset) confirmed the anatase phase, whose (101) and (200) planes were identified by HRTEM (refer to FIG. 4d). $TiO_2$ nanosheets are mesoporous as shown by the BJH pore size distribution as shown in FIG. 4f: inset. Specific surface area (FIG. 4f) and crystallite size (Table 1) of $TiO_2$ nanosheets decreased with the increase in calcination temperature and duration. The thickness of $TiO_2$ (500° C./1 h) was found to be about 1.3 nm using AFM analysis (FIG. 4g).

The effects of synthesis and calcination parameters on the characteristics of $Nb_2O_5$ and $TiO_2$ nanosheets are summarized in Table 1 below.

TABLE 1

Synthesis conditions and properties of binary oxide nanosheets

| Metal oxide | Calcination conditions | Precursor | Phase | Crystallite size (nm)[a] | rGO content (wt %) | BET specific surface area (m²/g) |
| --- | --- | --- | --- | --- | --- | --- |
| $Nb_2O_5$ | 500° C./1 h/air [b] | $NbCl_5$ | Orthorhombic | 14.3 | 45 | 74.7 |
| $Nb_2O_5$ | 550° C./3 h/air [b] | $NbCl_5$ | Orthorhombic | 22.3 | 29 | 64.5 |
| $Nb_2O_5$ | 350° C./1 h/air | Nb(V) ethoxide | Amorphous | — | 3.0 | 113 |
| $Nb_2O_5$ | 500° C./1 h/air | Nb(V) ethoxide | Orthorhombic | 28.9 | 0 | 69.4 |
| $Nb_2O_5$ | 600° C./1 h/air | Nb(V) ethoxide | Orthorhombic | 35.4 | 0 | 26.2 |
| $TiO_2$ | 350° C./1 h/air | Ti(IV) butoxide | Tetragonal | 8.6 | 3.0 | 98.7 |
| $TiO_2$ | 500° C./1 h/air | Ti(IV) butoxide | Tetragonal | 12.6 | 0 | 42.8 |

[a] Based on (001) peak of $Nb_2O_5$ or (101) peak of $TiO_2$.
[b] Pre-calcined at 550° C./2 h/Ar.

Example 2: Synthesis of Doped Binary Oxide Nanosheets

The synthesis strategy presented in example 1 can also be adapted to prepare doped binary oxide nanosheets, such as Ti-doped $Nb_2O_5$ and Nb-doped $TiO_2$ (refer to Table 2). The doped metal oxide nanosheets adopted the crystal structure of the host metal oxide, with no new phase observed (FIGS. 5a and 5b). The successful doping was confirmed by XRD peak shifts. For Ti-doped $Nb_2O_5$ nanosheets, diffraction peaks shifted to higher 2θ angles as Ti doping increased (refer to FIG. 5e, and Table 2), due to the incorporation of $Ti^{4+}$, which has a smaller ionic radius, in the $Nb_2O_5$ crystal lattice.

In contrast, the XRD peaks shifted to lower 2θ angles as Nb doping increased in Nb-doped $TiO_2$ nanosheets (Refer to FIG. 5f and Table 2), due to the incorporation of $Nb^{5+}$, which has a larger ionic radius, in the $TiO_2$ crystal lattice. TEM confirmed the nanosheet morphology of Ti-doped $Nb_2O_5$ and Nb-doped $TiO_2$ (FIGS. 5c and 5d). These doped nanosheets showed similar lattice spacing as the host oxide in the HRTEM images of FIGS. 5g and 5h. EDX elemental mapping of Ti-doped $Nb_2O_5$ as shown in FIGS. 5k and 5o, and Nb-doped $TiO_2$ (refer to FIGS. 5L and 5p) showed homogeneous distributions of Ti and Nb within the nanosheets. XPS confirmed the doping, and illustrated the main oxidation states as $Nb^{5+}$ and $Ti^{4+}$, respectively (refer to FIGS. 5i, 5m, 5j, and 5n).

TABLE 2

XRD peak shift in doped Ti—$Nb_2O_5$ and Nb—$TiO_2$ nanosheets

| Metal oxide | Dopant | Doping atomic % | (001) peak position 2θ (°) | (101) peak position 2θ (°) |
|---|---|---|---|---|
| $Nb_2O_5$ | Ti | 0 | 22.72 | — |
| $Nb_2O_5$ | Ti | 2 | 22.74 | — |
| $Nb_2O_5$ | Ti | 7.5 | 22.76 | — |
| $Nb_2O_5$ | Ti | 25 | 22.85 | — |
| $TiO_2$ | Nb | 0 | — | 25.38 |
| $TiO_2$ | Nb | 4 | — | 25.38 |
| $TiO_2$ | Nb | 8 | — | 25.34 |
| $TiO_2$ | Nb | 10 | — | 25.33 |
| $TiO_2$ | Nb | 20 | — | 25.27 |

Example 3: Synthesis of Ternary Oxide Nanosheets

Ternary oxide nanosheets were synthesized using metal oxide precursors at the appropriate ratios. The experimental results suggest that the phase of ternary oxide nanosheets can be modified by the calcination conditions. For example, with a Ti:Nb precursor atomic ratio of 1:2, $TiNb_2O_7$ nanosheets were obtained when calcined in air, while oxygen-deficient $Ti_{0.61}Nb_{1.29}O_4$/rGO nanosheets were obtained when calcined in argon.

$Ti_{0.61}Nb_{1.29}O_4$ nanosheets were obtained by removing rGO from $Ti_{0.61}Nb_{1.29}O_4$/rGO via calcination in air, with no phase change observed. The nanosheet morphology was confirmed by TEM (FIGS. 6a and 6b). EDX elemental mapping showed homogeneous Ti and Nb distributions as can be seen from FIGS. 6c-6f. The crystalline phases were determined to be monoclinic $TiNb_2O_7$ (JCPDS #01-077-1374) and tetragonal $Ti_{0.95}Nb_{0.95}O_4$ (JCPDS #00-047-0024) (FIGS. 6g and 6h). XPS Nb 3d and Ti 2p peaks showed that $Nb^{5+}$ and $Ti^{4+}$ were the main species in $TiNb_2O_7$ nanosheets (refer to FIGS. 6i and 6k).

The XPS peaks of $Ti_{0.61}Nb_{1.29}O_4$/rGO nanosheets were shifted to higher binding energies, which could be attributed to residual rGO that could not be removed in argon (FIGS. 6j and 6L). The appearance of a second peak for Nb 3d5/2 and Ti 2p3/2 at lower binding energies indicated the presence of $Nb^{4+}$ and $Ti^+$, which corresponded to the oxygen-deficient phase. Synthesis conditions and properties of $TiNb_2O_7$ and $Ti_{0.61}Nb_{1.29}O_4$ nanosheets are shown in Table 3.

TABLE 3

Synthesis conditions and properties of ternary oxide nanosheets

| Metal oxide | Calcination conditions | Phase | Crystallite size (nm)$^a$ | rGO content (wt %) | BET specific surface area (m$^2$/g) |
|---|---|---|---|---|---|
| $TiNb_2O_7$ | 700° C./1 h/air | Monoclinic | 14.9 | 0.0 | 23.8 |
| $Ti_{0.61}Nb_{1.29}O_4$ | 700° C./2 h/Ar | Tetragonal | 7.5 | 36.1 | 217.4 |
| $Ti_{0.61}Nb_{1.29}O_4$ | 500° C./1 h/air $^b$ | Tetragonal | 8.0 | 0.0 | 98.7 |

$^a$Based on (020) peak of $TiNb_2O_7$ or (110) peak of $Ti_{0.61}Nb_{1.29}O_4$.
$^b$Pre-calcined at 700° C./2 h/Ar.

Example 4: Synthesis of Other Metal Oxide Nanosheets

The GO planar-confined growth strategy as shown in examples 1, 2 and 3 above can also be extended to other types of metal oxides. Binary oxides, e.g., $Fe_2O_3$, $SnO_2$, NiO, $Co_3O_4$, $Mn_3O_4$ and $ZrO_2$ were synthesized as nanosheets (FIGS. 7a-7h). Doped and ternary oxide nanosheets with tunable compositions and crystalline phases were also prepared. $Ni_xCo_{3-x}O_4$ nanosheets were derived with different Ni/Co atomic ratios of 0.08, 0.22, 0.38 and 0.75 (FIGS. 7i-7l).

The experimental results suggest that the ratio of Ni/Co affected the nanosheet crystal structure (FIG. 7q). At a low Ni/Co ratio of 0.08 (i.e. $Ni_{0.22}Co_{2.78}O_4$), $Co_3O_4$ phase was obtained (JCPDS #00-042-1467) with Ni ions only replaced a portion of the cobalt ions in the $Co_3O_4$ phase. As the Ni/Co ratio increased, a phase change to $Co_2NiO_4$ (JCPDS #00-002-1074) was necessary to accommodate more Ni ions. $Mn_xCo_{3-x}O_4$ and $Co_xMn_{3-x}O_4$ nanosheets (refer to FIGS. 7m-7p) were synthesized with Mn/Co atomic ratios of 0.56, 1.11, 1.68 and 2.33. The first two ratios resulted in nanosheets with $Co_2MnO_4$ or $MnCo_2O_4$ phase (JCPDS #00-001-1130 and #00-023-1237, respectively) (see FIG. 7r). The latter two ratios led to $CoMn_2O_4$ phase (JCPDS #00-055-0685). The synthesis strategy described herein has been shown to be capable of deriving a wide variety of metal oxide nanosheets with tunable composition and phase. The experimental results revealed that the calcination conditions can be further manipulated to control the crystallite size, rGO content and specific surface area of the nanosheets (refer to Table 4).

TABLE 4

Synthesis conditions and properties of various metal oxide nanosheets

| Metal oxide | Calcination conditions (in air) | Phase | Crystallite size (nm)[a] | rGO content (wt %) | BET specific surface area (m$^2$/g) |
|---|---|---|---|---|---|
| Iron Oxide | 300° C./1 h | Amorphous | — | 38.3 | 44.20 |
| Iron Oxide | 325° C./1 h | Amorphous | — | 7.40 | 118.4 |
| SnO$_2$ | 375° C./1 h | Orthorhombic | [b] | 40.3 | 78.0 |
| SnO$_2$ | 400° C./1 h | Orthorhombic | 4.9 | 3.30 | 93.6 |
| NiO | 325° C./1 h | Rhombohedral | [b] | 42.9 | 87.4 |
| NiO | 350° C./1 h | Rhombohedral | 8.4 | 2.70 | 70.1 |
| Co$_3$O$_4$ | 325° C./0.7 h | Cubic | 10.5 | 21.9 | 31.9 |
| Co$_3$O$_4$ | 350° C./1 h | Cubic | 11.8 | 4.90 | 28.1 |
| Mn$_3$O$_4$ | 325° C./1 h | Amorphous | — | 25.0 | 74.4 |
| Mn$_3$O$_4$ | 350° C./1 h | Tetragonal | 17.5 | 3.60 | 34.7 |
| Ni$_{1.29}$Co$_{1.71}$O$_4$ | 325° C./0.8 h | Cubic | 4.2 | 31.3 | 85.9 |
| Ni$_{1.29}$Co$_{1.71}$O$_4$ | 350° C./1 h | Cubic | 4.5 | <3 | 67.8 |
| Mn$_{1.08}$Co$_{1.92}$O$_4$ | 325° C./0.3 h | Cubic | 5.3 | 38.4 | 49.4 |
| Mn$_{1.08}$Co$_{1.92}$O$_4$ | 500° C./1 h | Cubic | 6.8 | 2.9 | 41.5 |

[a]Based on strongest XRD peak.
[b]Crystallite size could not be calculated due to low XRD peak intensity.

Further, as indicated above that the reaction conditions for preparing the metal oxides above can be further optimized by for example varying the precursor concentration, processing temperature, the temperature of calcining step as well as the duration of calcining step. Table 5 below shows the optimized conditions for the synthesis of metal oxide nanosheets including binary oxide nanosheets, doped binary oxide nanosheets and ternary oxide nanosheets.

Example 5: Synthesis of Metal Oxide/rGO Nanosheets Using Opposite-Charge Method To further enhance the electrochemical properties of the metal oxides, a reduced graphene oxide was incorporated to the metal oxide nanosheets to afford a composite material. This incorporation is outlined below.

Positively charged GO was prepared by non-covalent functionalization using

TABLE 5

Optimized conditions for synthesis of metal oxide nanosheets

| Metal Oxide | Metal Oxide Precursor | Precursor Conc.[a] | Stirring Temperature (° C.) | Calcination Temperature (° C.)[b] | Calcination Duration (h) |
|---|---|---|---|---|---|
| Nb$_2$O$_5$ | NbCl$_5$ | 2.96 | RT[c] | 500-600[d] | 1 |
|  | Nb(OC$_2$H$_5$)$_5$ |  |  |  |  |
| TiO$_2$ | Ti(OC$_4$H$_9$)$_4$ | 2.96 | RT | 500 | 1 |
| TiNb$_2$O$_7$ | Ti(OC$_4$H$_9$)$_4$ | 0.89 | RT | 700 | 1 |
|  | Nb(OC$_2$H$_5$)$_5$ | 2.07 |  |  |  |
| Ti$_{0.61}$Nb$_{1.29}$O$_4$ | Ti(OC$_4$H$_9$)$_4$ | 0.9 | RT | 500[e] | 1 |
|  | Nb(OC$_2$H$_5$)$_5$ | 2.1 |  |  |  |
| ZrO$_2$ | Zr(OC$_3$H$_7$)$_4$ (Alfa Aesar) | 2.96 | RT | 400 | 1 |
| SnO$_2$ | Dibutyltin dilaurate (Sigma-Aldrich) | 2.96 | RT | 400 | 1 |
| Fe$_2$O$_3$ | Fe(III) acetylacetonate (Merck) | 2.96 | 45 | 400 | 1 |
| NiO | Ni(II) acetylacetonate (Merck) | 2.96 | 45 | 350 | 1 |
| Co$_3$O$_4$ | Co(II) acetylacetonate (Sigma-Aldrich) | 2.96 | 45 | 350 | 1 |
| Mn$_3$O$_4$ | Mn(II) acetylacetonate (Merck) | 2.96 | 45 | 350 | 1 |
| Ni$_{1.29}$Co$_{1.71}$O$_4$ | Ni(II) acetylacetonate | 2.37 | 45 | 350 | 1 |
|  | Co(II) acetylacetonate | 0.59 |  |  |  |
| Mn$_{1.08}$Co$_{1.92}$O$_4$ | Mn(II) acetylacetonate | 0.14 | 45 | 500 | 1 |
|  | Co(II) acetylacetonate | 2.82 |  |  |  |
| Co$_{0.9}$Mn$_{2.1}$O$_4$ | Co(II) acetylacetonate | 2.46 | 45 | 500 | 1 |
|  | Mn(II) acetylacetonate | 0.50 |  |  |  |

[a]In mmol per 240 mL of absolute ethanol.
[b]Calcined in air.
[c]RT: room temperature.
[d]GO/NbCl$_5$ was pre-calcined at 550° C./2 h/Ar.
[e]Pre-calcined at 700° C./2 h/Ar.

Poly(diallyldimethylammonium chloride) (PDDA) (purchased from Sigma-Aldrich of Saint Louis, Mo. of the United States of America) Briefly, 60 mg of GO was dispersed in 150 mL distilled water by ultrasonication. This was followed by the dissolution of 3.9 g NaCl in the GO dispersion. Subsequently, 7.8 mL of PDDA (20 wt % in $H_2O$, MW: 100,000-200,000) was added to the dispersion, followed by ultrasonication for 1.5 hours and stirring overnight.

The resulting dispersion was centrifuged, washed three times with distilled water, freeze dried, and finally dried at 60° C. overnight. Positively charged GO-PDDA (zeta potential shown in FIG. 8) was dispersed in distilled water at a concentration of 0.5 mg/mL (dispersion A). Negatively charged metal oxide nanosheets (zeta potential shown in FIG. 8) were dispersed in a separate tube at a concentration of 0.4 mg/mL (dispersion B). Dispersions A and B were mixed rapidly, ultrasonicated briefly and vortexed. The aggregated nanocomposite was collected by centrifugation, dried at 60° C. overnight, and calcined at 400° C. in Ar for one hour.

Example 6: Transition Metal Oxides as Li-ion Battery Anodes: High-voltage Anodes The transition metal oxides prepared as above used as Li-ion battery anodes was investigated. The first category is high-voltage anodes, which include $Nb_2O_5$, $TiO_2$ and titanium niobium oxide. This category has the advantage of higher safety profile and low volume change.

A stable performance was demonstrated by $Nb_2O_5$, $TiO_2$ and $TiNb_2O_7$ nanosheets, achieving 99.3, 172.0 and 143.6 mAh/g, respectively, after 100 cycles at 1 C (FIGS. 9a, 9b, and 9e). $Ti_{0.61}Nb_{1.29}O_4$ nanosheets also showed stable performance, attaining 148.9 mAh/g after 100 cycles at 0.5 C (FIG. 9f). This is the first report of using $Ti_{0.95}Nb_{0.95}O_4$ phase as Li-ion battery anode. The good stability profiles of the high-voltage-anode nanosheets can be attributed to the low volume change during cycling, and the stability of the nanosheet structure. Ex situ electrode analysis of $Nb_2O_5$ and $TiO_2$ after cycling confirmed the stability of the nanosheet morphology and phase over prolonged cycling (FIGS. 9a-9i).

The nanosheets were modified to enhance their electrochemical performance by incorporating rGO within the nanosheets and by doping. rGO was incorporated by adjusting the synthesis conditions to retain residual rGO within the nanosheets (metal oxide/rGO), or by introducing rGO after nanosheet synthesis using the opposite-charge method (metal oxide/rGO-OCM). Synthesis conditions and rGO contents of bare and modified nanosheets are summarized in Table 6.

TABLE 6

Synthesis conditions and rGO content of high-voltage-anode nanosheets

| Nanosheet | Precursor | Calcination conditions | rGO content (wt %) |
|---|---|---|---|
| $Nb_2O_5$ | Nb(V) ethoxide | 500° C./1 h/air | 0 |
| $Nb_2O_5$/rGO | $NbCl_5$ | 550° C./2 h/Ar 550° C./3 h/air | 29.0 |
| $Nb_2O_5$/rGO-OCM | Nb(V) ethoxide | 500° C./1 h/air 400° C./1 h/Ar | 22.9 |
| Ti—$Nb_2O_5$ (2 at % Ti) | Ti(IV) butoxide Nb(V) ethoxide | 600° C./1 h/air | 0 |
| $TiO_2$ | Ti(IV) butoxide | 500° C./1 h/air | 0 |
| $TiO_2$/rGO-OCM | Ti(IV) butoxide | 500° C./1 h/air 400° C./1 h/Ar | 23.6 |
| Nb—$TiO_2$ (10 at % Nb) | Nb(V) ethoxide Ti(IV) butoxide | 500° C./1 h/air | 0 |
| $TiNb_2O_7$ | Ti(IV) butoxide Nb(V) ethoxide | 700° C./1 h/air | 0 |
| $TiNb_2O_7$/rGO-OCM | Ti(IV) butoxide Nb(V) ethoxide | 700° C./1 h/air 400° C./1 h/Ar | 23.8 |
| $Ti_{0.61}Nb_{1.29}O_4$ | Ti(IV) butoxide Nb(V) ethoxide | 700° C./2 h/Ar 500° C./1 h/air | 0 |
| $Ti_{0.61}Nb_{1.29}O_4$/rGO-OCM | Ti(IV) butoxide Nb(V) ethoxide | 700° C./2 h/Ar 500° C./1 h/air 400° C./1 h/Ar | 27.0 |

After modification, the performance of $Nb_2O_5$ nanosheets was significantly enhanced at 1 C, reaching 137.5, 143.3 and 130.9 mAh/g for $Nb_2O_5$/rGO, $Nb_2O_5$/rGO-OCM and doped Ti—$Nb_2O_5$-0.02, respectively, after 100 cycles (refer to FIG. 10a). This could be attributed to enhanced conductivity. As for $TiO_2$, $TiNb_2O_7$ and $Ti_{0.61}Nb_{1.29}O_4$, the modified nanosheets had comparable performance to the bare ones (refer to FIGS. 10b, 10e and 10f). This could be due to the ability of the bare nanosheets to tolerate the relatively lower rates of 1 C and 0.5 C.

Rate capability was varied among the high-voltage anode nanosheets. Bare $Nb_2O_5$ nanosheets achieved only 8.4 mAh/g at 20 C (refer to FIG. 10c). However, its rate performance was enhanced by the modified nanosheets, especially $Nb_2O_5$/rGO, which achieved a remarkable specific capacity of 120.3 mAh/g at 20 C. The excellent rate capability of $Nb_2O_5$/rGO can be attributed to the very good contact between residual rGO and $Nb_2O_5$ nanosheets.

$TiO_2$, $TiNb_2O_7$ and $Ti_{0.61}Nb_{1.29}O_4$ nanosheets showed very good rate capability, achieving 74.9, 72.8 and 46.7 mAh/g at 20 C, 15 C and 15 C, respectively (refer to FIGS. 10d, 10g and 10h). Their rate performance was further enhanced by modification, reaching 102.3, 85.7 and 40.3 mAh/g for doped Nb—$TiO_2$ (10 at % Nb), $TiNb_2O_7$/rGO-OCM and $Ti_{0.61}Nb_{1.29}O_4$/rGO-OCM nanosheets, at 20 C, 15 C and 25 C, respectively.

The performance of the optimized $Nb_2O_5$, $TiO_2$ and $TiNb_2O_7$ nanosheets was compared to the literature (refer to Table 7 below), demonstrating their high energy storage capabilities. The high performance achieved by the nanosheets could be attributed to the 2D nanostructure, whose thinness facilitated $Li^+$ and electron transport, and improved contact with the electrolyte. The micron-sized lateral dimensions provided continuous charge-transfer path, thus improving rate capability, and helped to sustain structural integrity during cycling. Doping and rGO introduction have been demonstrated to be successful strategies to improve Li-ion battery performance, especially at high current densities.

TABLE 7

Comparison of $Nb_2O_5$, $TiO_2$ and $TiNb_2O_7$ nanosheet battery performance to literature

| Material | Morphology | Current Density (mA/g) | Specific Capacity (mAh/g) | Reference |
|---|---|---|---|---|
| $Nb_2O_5$/rGO | Nanosheets | 150 | 216 | This work |
|  |  | 3000 | 120 |  |
| $Nb_2O_5$/C [a] | Nanocrystals | 200 | 160 | Previous |
|  |  | 3000 | 100 | work |
| $Nb_2O_5$ | Nanosheets | 200 | 184 | Previous |
|  |  | 1000 | 90 | work |
| $Nb_2O_5$ | 3D nanowire superstructure | 200 | 165 | Previous |
|  |  | 500 | 135 | work |
| $Nb_2O_5$ | Nanowires | 100 | 209 | Previous |
|  |  | 2000 | 175 | work |
| $Nb_2O_5$/C [a] | Mesoporous nanocomposite | 100 | 180 | Previous |
|  |  | 5000 | 115 | work |
| Nb—$TiO_2$ (10 at % Nb) | Nanosheets | 85 | 338 | This work |
|  |  | 168 | 268 |  |
|  |  | 3360 | 105 |  |
| $TiO_2$ | Microboxes | 168 | 205 | Previous |
|  |  | 3360 | 63 | work |
| $TiO_2$ | Cubes | 85 | 201 | Previous |
|  |  | 336 | 96 | work |
| $TiO_2$ | Hollow microspheres | 85 | 215 | Previous |
|  |  | 3360 | 88 | work |
| $TiO_2$ | Mesoporous microspheres | 85 | 160 | Previous |
|  |  | 1680 | 100 | work |
| $TiO_2$/G [b] | 3D network | 200 | 185 | Previous |
|  |  | 2000 | 105 | work |
| $TiO_2$ | Porous microspheres | 168 | 166 | Previous |
|  |  | 3360 | 130 | work |
| $TiNb_2O_7$/rGO-OCM | Nanosheets | 194 | 263 [c] | This work |
|  |  | 1940 | 150 |  |
|  |  | 5810 | 89 |  |
| $TiNb_2O_7$/G [b] | Nanoparticles | 1550 | 156 | Previous |
|  |  | 3100 | 136 | work |
| $TiNb_2O_7$ | Nanofibers | 200 | 240 | Previous |
|  |  | 1000 | 150 | work |
| $TiNb_2O_7$@C [a] | Microwires | 2000 | 140 | Previous |
|  |  | 6000 | 75 | work |
| $TiNb_2O_7$ | Microspheres | 194 | 270 [c] | Previous |
|  |  | 7750 | 100 | work |
| $TiNb_2O_7$ | Nanoporous framework | 1940 | 236 | Previous |
|  |  | 7740 | 195 | work |

[a] C: carbon.
[b] G: graphene.
[c] Second cycle.

Example 7: Transition Metal Oxides as Li-ion Battery Anodes: High-Capacity Anodes The second category includes iron oxide, $SnO_2$, NiO, $Co_3O_4$, $Ni_{1.29}Co_{1.71}O_4$ and $Mn_{1.08}Co_{1.92}O_4$, which operate by conversion and/or alloying-dealloying mechanisms; they are discharged until very low potentials and have high capacities.

Iron oxide, $SnO_2$, NiO, $Co_3O_4$, $Ni_{1.29}Co_{1.71}O_4$ and $Mn_{1.08}Co_{1.92}O_4$ nanosheets were tested as high-capacity Li-ion battery anodes. For each metal oxide, two samples were selected, one with <8 wt % rGO (designated as metal oxide) and the other with around 22-43 wt % rGO (designated as metal oxide/rGO). Calcination conditions and rGO contents of all tested samples are shown in Table 8 below.

TABLE 8

Synthesis conditions, rGO content and battery performance of high-capacity-anode nanosheets

| Nanosheet | Calcination conditions (in air) | rGO content (wt %) | Current density (A/g) | Number of cycles | Specific capacity (mAh/g) |
|---|---|---|---|---|---|
| Iron oxide - Iron oxide/rGO | 325° C./1 h-300° C./1 h | 7.4-38.3 | 1 | 300 | 129.2-1394.4 |
|  |  |  | 7 | 45 [a] | [b]-346.1 |
| $SnO_2$—$SnO_2$/rGO | 400° C./1 h-375° C./1 h | 3.30-40.3 | 0.8 | 300 | 129.0-1271.0 |
|  |  |  | 4 | 35 [a] | 56.9-694.7 |
| NiO—NiO/rGO | 350° C./1 h-325° C./1 h | 2.7-42.9 | 1 | 300 | 138.6-1624.3 |
|  |  |  | 5 | 33 [a] | 23.6-311.1 |
| $Co_3O_4$—$Co_3O_4$/rGO | 350° C./1 h-325° C./0.7 h | 4.9-21.9 | 1 | 300 | 982.2-1509.9 |
|  |  |  | 5 | 33 [a] | 20.8-112.5 |
| $Ni_{1.29}Co_{1.71}O_4$—$Ni_{1.29}Co_{1.71}O_4$/rGO | 350° C./1 h-325° C./0.8 h | <3-31.3 | 1 | 300 | 534.5-1594.9 |
|  |  |  | 5 | 35 [a] | 34.8-109.6 |
| $Mn_{1.08}Co_{1.92}O_4$—$Mn_{1.08}Co_{1.92}O_4$/rGO | 500° C./1 h-325° C./0.3 h | 2.9-38.4 | 1 | 300 | 264.9-1497.3 |
|  |  |  | 5 | 35 [a] | 44.5-159.8 |

[a] In the rate study shown in FIG. 11.
[b] iron oxide nanosheets were not cycled at 7 A/g because they lost almost all capacity at lower rates, reaching 22.2 mAh/g at 5 A/g (40 cycles).

It was found that for these transition metal oxides, which store $Li^+$ by conversion and/or alloying-dealloying mechanisms, the presence of relatively large rGO content was essential for good performance rGO served as a conductive support that prevented disconnection from the current collector, and as a buffer against the severe volume change during cycling. High-capacity anodes have also shown an activation step, whereby an initial capacity decline was followed by an increase in capacity over cycling.

Specific capacities as high as 1394, 1271, 1624, 1510, 1595 and 1497 mAh/g were achieved by iron oxide/rGO, $SnO_2$/rGO, NiO/rGO, $Co_3O_4$/rGO, $Ni_{1.29}CO_{1.71}O_4$/rGO and $Mn_{1.08}Co_{1.92}O_4$/rGO nanosheets, respectively, after 300 cycles at 1 A/g (FIGS. 11a-11c, 11g-11i). Excellent rate capabilities were also obtained; iron oxide/rGO, $SnO_2$/rGO and NiO/rGO achieved 346.1, 694.7 and 311.1 mAh/g at 7, 4 and 5 A/g, respectively (refer to FIGS. 11d-11f). $Co_3O_4$/ rGO and $Ni_{1.29}Co_{1.71}O_4$/rGO had similar capacity of ~110 mAh/g (FIGS. 11j and 11k), while $Mn_{1.08}Co_{1.92}O_4$/rGO retained 159.8 mAh/g (see $Mn_{1.08}Co_{1.92}O_4$/rGO in FIG. 11l), at 5 A/g. The results are summarized in Table 8 above.

Capacity increase over cycling was observed in the case of high-capacity anodes. This phenomenon has been studied previously, and it was concluded that capacity increase would occur due to catalytically enhanced electrolyte decomposition at low potential, leading to the formation of a gel-like polymer that would dissolve during charging. Another hypothesis was that irreversible $Li_2O$ formation would take place during the initial cycles, which would be followed by gradual $Li_2O$ activation over cycling, leading to capacity increase. The activation of $Li_2O$ has been attributed to the metallic nanoparticles generated during the initial cycles.

In comparison to the literature, rGO-incorporated nanosheets have demonstrated excellent performance as high-capacity anodes (Tables 9, 10 and 11 below), demonstrating the enhanced electrochemical properties of the nanocomposites.

TABLE 9

Comparison of optimized iron oxide and $SnO_2$ nanosheet battery performance with literature.

| Material | Morphology | Current Density (mA/g) | Specific Capacity (mAh/g) | Reference |
|---|---|---|---|---|
| Iron Oxide/rGO | Nanosheets | 500 | 1070 | This work |
| | | 4000 | 480 | |
| | | 5000 | 450 | |
| $Fe_2O_3$/MWCNTs [a] | Nanoparticles | 500 | 400 | Previous work |
| | | 2000 | 320 | |
| Iron oxide@C | Yolk-shell | 200 | 820 | Previous work |
| | | 4000 | 370 | |
| Iron oxide/G | Nanoparticles | 1000 | 730 | Previous work |
| | | 5000 | 500 | |
| $Fe_2O_3$/C | Bubble nanorods | 500 | 913 | Previous work |
| | | 5000 | 491 | |
| $Fe_3O_4$@C | Yolk-shelled boxes | 500 | 890 | Previous work |
| | | 5000 | 575 | |
| $SnO_2$/rGO | Nanosheets | 400 | 1131 | This work |
| | | 1600 | 918 | |
| | | 4000 | 713 | |
| $SnO_2$/G | Nanoparticles in 3D foam | 500 | 672 | Previous work |
| | | 3000 | 480 | |
| $SnO_2$/G | Nanoparticles | 500 | 1090 | Previous work |
| | | 1000 | 790 | |
| $SnO_2$/G/polyaniline | Nanoparticles | 500 | 530 | Previous work |
| | | 2000 | 240 | |
| $SnO_2$@C | Submicroboxes | 1000 | 583 | Previous work |
| | | 5000 | 372 | |
| $SnO_2$/G | Quantum dots | 780 | 1100 | Previous work |
| | | 3900 | 932 | |

[a] Multi-walled carbon nanotubes.

TABLE 10

Comparison of optimized NiO and $Co_3O_4$ nanosheet battery performance with literature.

| Material | Morphology | Current Density (mA/g) | Specific Capacity (mAh/g) | Reference |
|---|---|---|---|---|
| NiO/rGO | Nanosheets | 500 | 952 | This work |
| | | 2000 | 503 | |
| | | 5000 | 311 | |
| NiO/C | Nanosheets | 200 | 1043 | Previous work |
| | | 800 | 824 | |
| NiO/G | Nanosheets | 700 | 872 | Previous work |
| | | 3600 | 492 | |
| NiO/G | Nanoparticles | 400 | 509 | Previous work |
| | | 800 | 369 | |
| NiO/G | Nanoparticles | 450 | 400 | Previous work |
| | | 3000 | 200 | |
| $Co_3O_4$/rGO | Nanosheets | 500 | 986 | This work |
| | | 2000 | 304 | |
| | | 4000 | 150 | |
| $Co_3O_4$/G | Nanoparticles | 500 | 484 | Previous work |
| $Co_3O_4$/G | Nanoparticles | 500 | 800 | Previous work |
| | | 1000 | 600 | |
| $Co_3O_4$/G | Fibers | 300 | 754 | Previous work |
| | | 1000 | 295 | |
| $Co_3O_4$/G | Hollow spheres | 1000 | 692 | Previous work |
| | | 5000 | 259 | |

TABLE 11

Comparison of optimized $Ni_{1.29}Co_{1.71}O_4$ and $Mn_{1.08}Co_{1.92}O_4$ nanosheet battery performance with literature.

| Material | Morphology | Current Density (mA/g) | Specific Capacity (mAh/g) | Reference |
|---|---|---|---|---|
| $Ni_{1.29}Co_{1.71}O_4$/rGO | Nanosheets | 500 | 913 | This work |
| | | 2000 | 291 | |
| $NiCo_2O_4$/MWCNTs | Nanosheets | 100 | 836 | Previous work |
| | | 1000 | 392 | |
| $NiCo_2O_4$/rGO | Nanoplates | 500 | 521 | Previous work |
| | | 800 | 396 | |
| $NiCo_2O_4$/rGO | Nanosheets | 100 | 1200 | Previous work |
| | | 1000 | 437 | |
| $NiCo_2O_4$ | Nanowire arrays on carbon textiles | 1000 | 800 | Previous work |
| | | 3000 | 600 | |
| $Mn_{1.08}Co_{1.92}O_4$/rGO | Nanosheets | 500 | 1020 | This work |
| | | 2000 | 372 | |
| | | 4000 | 196 | |
| $MnCo_2O_4$ | Spheres | 800 | 571 | Previous work |
| $MnCoO_x$ | Microspheres | 500 | 698 | Previous work |
| | | 1500 | 417 | |
| $MnCo_2O_4$ | Microspheres | 400 | 814 | Previous work |
| | | 1800 | 513 | |
| $MnCo_2O_4$/G | Nanoparticles | 1000 | 853 | Previous work |
| | | 4000 | 462 | |

Materials Characterization

The nanosheets were characterized using TEM (FEI Tecnai F20) fitted with EDX analyzer (OXFORD X-Max[N]), XRD (Bruker D8 ADVANCE), TGA (PerkinElmer Pyris 1 TGA), $N_2$ adsorption (Micromeritics ASAP 2020), FT-IR (PerkinElmer Spectrum 100) and XPS (VG ESCALAB 220i-XL). Zeta potential was determined using Zetasizer Nano-SZ (Malvern Instruments). Nanosheet thickness was determined by AFM (Bruker Dimension ICON AFM, non-contact/tapping mode). Raman spectroscopy (Witec Alpha 300S) was performed using 532-nm laser source.

Electrochemical Measurements

The active materials were mixed with vapor-grown carbon fibers (VGCFs) and polyvinylidene fluoride (PVDF) at a weight ratio of 7:2:1, and dispersed in N-methyl-2-pyrrolidone (NMP) to form a slurry. The slurry was coated on copper or aluminum foil, dried at 90° C. overnight, and then pressed. Coin cells were assembled in an argon glove box using Li metal as the counter electrode and 1 M LiPF$_6$ in ethylene carbonate and diethyl carbonate (1:1) as the electrolyte. Galvanostatic charge-discharge measurements were conducted at various current densities at a voltage range of 1.1-3 V for Nb$_2$O$_5$, 1-3 V for TiO$_2$, TiNb$_2$O$_7$ and Ti$_{0.61}$Nb$_{1.29}$O$_4$, and 0.005-3 V for all other metal oxide nanosheets.

INDUSTRIAL APPLICABILITY

The synthesis method for preparing the metal oxide nanosheets described herein can be used for the industrial production of metal oxide nanosheets with different variations, such as binary, doped binary, ternary or more complex oxide nanosheets. The resulting metal oxide nanosheets have many potential industrial applications, such as in the fields of energy storage, catalysis and sensors.

The metal oxides nanosheets described in the present disclosure can be used as active material for the anode in the Lithium-ion battery. Since, the anodes are shown to exhibit high capacity, excellent rate capacity, and/or long-term cycling stability, they therefore allow a broader application of lithium-ion battery using the anode comprising the layered metal oxide as described herein. The application of the present technology will allow the use of lithium-ion battery in many applications such as electronics (including communication, healthcare and transportation).

The lithium-ion batteries that use the metal oxide nanosheets as the active material as described in the present disclosure may be used as high density power sources for a wide variety of applications for example in automobile (electric vehicles including electric cars, hybrid vehicles, electric bicycles, personal transporters and advanced electric wheelchairs, radio-controlled models, model aircraft, aircraft), portable devices (mobile phone/smartphone, laptops, tablets, digital cameras and camcorders), in power tools (including cordless drills, sanders, and saws), or in healthcare (portable medical equipment such as monitoring devices, ultrasound equipment, and infusion pumps).

Further, the metal oxide nanosheets produced by the method described in the present disclosure may also be used as sensor such as gas sensor for domestic, commercial and industrial applications with many advantages such as low cost, easy production and compact size. Another potential application of the metal oxide nanosheets is their use as catalyst for various chemical reactions such as oxidation reaction.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A method of preparing metal oxide nanosheets comprising:
    a) mixing a template with at least one metal oxide precursor at a temperature between 20° C. to 50° C. to form a metal oxide precursor-bonded template, wherein the at least one metal oxide precursor is selected from the group consisting of metal halide, metal alkoxide, metal nitrate, metal diketone (metal dione), metal salt of a saturated fatty acid and combinations thereof; and wherein the at least one metal oxide precursor comprises a metal selected from groups 3, 4, 5, 6, 7, 8, 9, 10, 11 or 12 of the Periodic Table of Elements; and
    b) calcining the metal oxide precursor-bonded template obtained in operation a) to form the metal oxide nanosheets, wherein the metal oxide nanosheets have a thickness of 0.5 nm to 10 nm.

2. The method according to claim 1, wherein the template is a two-dimensional carbonaceous material with surface functional groups selected from graphite oxide and graphene oxide (GO).

3. The method according to claim 1, wherein the at least one metal oxide precursor is selected from the group consisting of NbCl$_5$, Nb(V) ethoxide, Ti(IV) ethoxide, Ti(V) butoxide, Fe(II) chloride, Fe(III) chloride, Fe(II) methoxide, Fe(III) ethoxide, Fe(II) acetylacetonate, Fe(III) acetylacetonate, tin(II) chloride, dibutyltin dilaureate, Ni(II) chloride, Ni(II) ethoxide, Ni(II) acetylacetonate, Co(II) chloride, Co(II) methoxide, Co(II) acetylacetonate, Mn(II) chloride, Mn(II) methoxide, Mn(II) acetylacetonate, Zr(IV) chloride, Zr(IV) propoxide and combinations thereof.

4. The method according to claim 1, wherein the calcining operation is undertaken at a temperature in the range from 250° C. to 900° C. or wherein the calcining step is undertaken in the presence of a gas selected from the group consisting of air, oxygen, nitrogen, argon, helium, hydrogen, nitrogen and combinations thereof.

5. The method according to claim 1, further comprising the operation of a1) pre-calcining the metal oxide precursor-bonded template.

6. The method according to claim 5, wherein the pre-calcining operation a1) is undertaken at a temperature in the range from 250° C. to 900° C.

7. The method according to claim 5, wherein the pre-calcining operation a1) is undertaken in the presence of gas that is selected from the group consisting of air, oxygen, nitrogen, argon, helium, hydrogen, nitrogen and combinations thereof.

8. The method according to claim 1, further comprising the operation of adding a doping agent in said mixing step a) to form the metal oxide precursor-bonded template or wherein the metal oxide nanosheets obtained in operation b) are doped binary oxide nanosheets.

9. The method according to claim 8, wherein the doping agent is a transition metal precursor and wherein the transition metal element of said transition metal precursor is selected from groups 3, 4, 5, 6, 7, 8, 9, 10, 11 or 12 of the Periodic Table of Elements or wherein the doping agent is present in a doping ratio in the range of 0.01 to 0.5.

10. The method according to claim 1, comprising mixing a template with two metal oxide precursors in said mixing operation a) in a precursor atomic ratio to form the metal oxide precursor-bonded template or wherein the metal oxide nanosheets obtained in operation b) are ternary oxide nanosheets.

11. The method according to claim 10, wherein the precursor atomic ratio of transition metals in the ternary oxide nanosheets is in the range of 1:20 to 20:1.

* * * * *